(12) United States Patent
Koponen et al.

(10) Patent No.: US 9,137,052 B2
(45) Date of Patent: Sep. 15, 2015

(54) FEDERATING INTERCONNECTION SWITCHING ELEMENT NETWORK TO TWO OR MORE LEVELS

(75) Inventors: Teemu Koponen, San Francisco, CA (US); Martin Casado, Portola Valley, CA (US); Pankaj Thakkar, Santa Clara, CA (US); Ronghua Zhang, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 123 days.

(21) Appl. No.: 13/589,049

(22) Filed: Aug. 17, 2012

(65) Prior Publication Data
US 2013/0044641 A1 Feb. 21, 2013

Related U.S. Application Data

(60) Provisional application No. 61/524,755, filed on Aug. 17, 2011, provisional application No. 61/524,756, filed on Aug. 17, 2011, provisional application No. 61/671,664, filed on Jul. 13, 2012, provisional application No. 61/675,807, filed on Jul. 25, 2012.

(51) Int. Cl.
*H04L 12/28* (2006.01)
*H04L 12/56* (2006.01)
(Continued)

(52) U.S. Cl.
CPC .............. *H04L 12/66* (2013.01); *H04L 41/044* (2013.01); *H04L 45/04* (2013.01); *H04L 12/2613* (2013.01)

(58) Field of Classification Search
CPC ......... H04L 12/66; H04L 45/04; H04L 45/00; H04L 45/42; H04L 45/44; H04L 45/586; H04L 45/74; H04L 45/745; H04L 41/12; H04L 41/044; H04L 49/70; H04L 49/15; H04L 12/46; H04L 12/2613; H04L 12/5696; H04L 29/12028; H04L 29/12047; H04L 29/12207; H04Q 2213/13349; H04B 10/271
USPC ......... 370/255, 401, 389, 392, 351, 230, 235, 370/408; 709/238, 252
See application file for complete search history.

(56) References Cited

U.S. PATENT DOCUMENTS

| 5,504,921 A | 4/1996 | Dev et al. |
| 5,550,816 A | 8/1996 | Hardwick et al. |

(Continued)

FOREIGN PATENT DOCUMENTS

| AU | 2012296330 | 3/2014 |
| EP | 1635506 | 3/2006 |

(Continued)

OTHER PUBLICATIONS

Andersen, David, et al., "Resilient Overlay Networks," Oct. 2001, 15 pages, 18th ACM Symp. on Operating Systems Principles (SOSP), Banff, Canada, ACM.

(Continued)

*Primary Examiner* — Alpus H Hsu
*Assistant Examiner* — Elton Williams
(74) *Attorney, Agent, or Firm* — Adeli LLP

(57) ABSTRACT

A network control system for interconnecting several separate networks. The system includes i) several interconnection switching elements, each of which is for connecting one of the separate networks to a common interconnecting network, ii) a first set of network controllers for managing a first set of the interconnection switching elements at a first set of separate networks in order for machines at different networks within the first set to communicate with each other, iii) a second set of network controllers for managing a second set of interconnection switching elements at a second set of separate networks in order for machines at different networks within the second set to communicate with each other, and iv) a third set of network controllers for managing the first and second sets of network controllers in order for machines at networks in the first set to communicate with machines at networks in the second set.

20 Claims, 52 Drawing Sheets

(51) Int. Cl.
 *G06F 15/16* (2006.01)
 *G06F 15/173* (2006.01)
 *H04L 12/66* (2006.01)
 *H04L 12/715* (2013.01)
 *H04L 12/24* (2006.01)
 *H04L 12/26* (2006.01)

(56) References Cited

U.S. PATENT DOCUMENTS

| | | |
|---|---|---|
| 5,729,685 A | 3/1998 | Chatwani et al. |
| 5,751,967 A | 5/1998 | Raab et al. |
| 6,006,275 A | 12/1999 | Picazo, Jr. et al. |
| 6,104,699 A | 8/2000 | Holender et al. |
| 6,108,304 A | 8/2000 | Abe et al. |
| 6,219,699 B1 | 4/2001 | McCloghrie et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,862,263 B1 | 3/2005 | Simmons |
| 7,046,630 B2 | 5/2006 | Abe et al. |
| 7,079,544 B2 | 7/2006 | Wakayama et al. |
| 7,096,228 B2 | 8/2006 | Theimer et al. |
| 7,126,923 B1 | 10/2006 | Yang et al. |
| 7,197,572 B2 | 3/2007 | Matters et al. |
| 7,209,439 B2 | 4/2007 | Rawlins et al. |
| 7,209,977 B2 | 4/2007 | Acharya et al. |
| 7,263,290 B2 | 8/2007 | Fortin et al. |
| 7,283,473 B2 | 10/2007 | Arndt et al. |
| 7,286,490 B2 | 10/2007 | Saleh et al. |
| 7,342,916 B2 | 3/2008 | Das et al. |
| 7,369,852 B2 | 5/2008 | Newberg et al. |
| 7,391,771 B2 | 6/2008 | Orava et al. |
| 7,406,540 B2 | 7/2008 | Acharya et al. |
| 7,450,598 B2 | 11/2008 | Chen et al. |
| 7,463,579 B2 | 12/2008 | Lapuh et al. |
| 7,478,173 B1 | 1/2009 | Delco |
| 7,512,744 B2 | 3/2009 | Banga et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,808,983 B2 | 10/2010 | Joly |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,899,027 B2 | 3/2011 | Castagnoli et al. |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 * | 11/2011 | Shukla et al. .................. 370/389 |
| 8,055,789 B2 | 11/2011 | Richardson et al. |
| 8,060,875 B1 | 11/2011 | Lambeth |
| 8,089,904 B2 | 1/2012 | Balasubramaniam et al. |
| 8,131,852 B1 | 3/2012 | Miller et al. |
| 8,149,734 B2 * | 4/2012 | Lu ................................ 370/254 |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,166,205 B2 | 4/2012 | Farinacci et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,265,075 B2 | 9/2012 | Pandey |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,479,275 B1 | 7/2013 | Naseh |
| 8,504,718 B2 | 8/2013 | Wang et al. |
| 8,538,919 B1 | 9/2013 | Nielsen et al. |
| 8,565,597 B2 | 10/2013 | Zheng |
| 8,611,351 B2 | 12/2013 | Gooch et al. |
| 8,611,352 B2 | 12/2013 | Mizrahi et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 * | 1/2014 | Vobbilisetty et al. ......... 370/401 |
| 8,627,313 B2 | 1/2014 | Edwards et al. |
| 8,644,188 B1 | 2/2014 | Brandwine et al. |
| 8,762,501 B2 | 6/2014 | Kempf et al. |
| 8,830,835 B2 | 9/2014 | Casado et al. |
| 8,964,767 B2 | 2/2015 | Koponen et al. |
| 2002/0093952 A1 | 7/2002 | Gonda |
| 2002/0131414 A1 | 9/2002 | Hadzic |
| 2002/0161867 A1 | 10/2002 | Cochran et al. |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0065711 A1 | 4/2003 | Acharya et al. |
| 2003/0069972 A1 | 4/2003 | Yoshimura et al. |
| 2003/0185152 A1 | 10/2003 | Nederveen et al. |
| 2004/0049701 A1 | 3/2004 | Le Pennec et al. |
| 2004/0052257 A1 | 3/2004 | Abdo et al. |
| 2004/0054680 A1 | 3/2004 | Kelley et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0132044 A1 | 6/2005 | Guingo et al. |
| 2006/0002370 A1 | 1/2006 | Rabie et al. |
| 2006/0026225 A1 | 2/2006 | Canali et al. |
| 2006/0092976 A1 | 5/2006 | Lakshman et al. |
| 2006/0221961 A1 | 10/2006 | Basso et al. |
| 2007/0076719 A1 | 4/2007 | Allan et al. |
| 2007/0140128 A1 | 6/2007 | Klinker et al. |
| 2007/0239987 A1 | 10/2007 | Hoole et al. |
| 2008/0002579 A1 | 1/2008 | Lindholm et al. |
| 2008/0002683 A1 | 1/2008 | Droux et al. |
| 2008/0002727 A1 | 1/2008 | Yamane |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0071900 A1 | 3/2008 | Hecker et al. |
| 2008/0159301 A1 | 7/2008 | de Heer |
| 2008/0225853 A1 * | 9/2008 | Melman et al. ................ 370/392 |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0031041 A1 | 1/2009 | Clemmensen |
| 2009/0083445 A1 | 3/2009 | Ganga |
| 2009/0089625 A1 | 4/2009 | Kannappan et al. |
| 2009/0092137 A1 | 4/2009 | Haigh et al. |
| 2009/0122710 A1 | 5/2009 | Bar-Tor et al. |
| 2009/0161547 A1 | 6/2009 | Riddle et al. |
| 2009/0249473 A1 | 10/2009 | Cohn |
| 2009/0279545 A1 | 11/2009 | Moonen |
| 2009/0292858 A1 | 11/2009 | Lambeth et al. |
| 2009/0296726 A1 | 12/2009 | Snively et al. |
| 2009/0303880 A1 | 12/2009 | Maltz et al. |
| 2010/0046531 A1 | 2/2010 | Louati et al. |
| 2010/0061231 A1 | 3/2010 | Harmatos et al. |
| 2010/0107162 A1 | 4/2010 | Edwards et al. |
| 2010/0115101 A1 | 5/2010 | Lain et al. |
| 2010/0153554 A1 | 6/2010 | Anschutz et al. |
| 2010/0153701 A1 | 6/2010 | Shenoy et al. |

(56) References Cited

U.S. PATENT DOCUMENTS

| | | | |
|---|---|---|---|
| 2010/0165877 A1 | 7/2010 | Shukla et al. | |
| 2010/0169467 A1 | 7/2010 | Shukla et al. | |
| 2010/0214949 A1 | 8/2010 | Smith et al. | |
| 2010/0250784 A1* | 9/2010 | Henry et al. | 709/252 |
| 2010/0257263 A1 | 10/2010 | Casado et al. | |
| 2010/0306408 A1 | 12/2010 | Greenberg et al. | |
| 2010/0322255 A1 | 12/2010 | Hao et al. | |
| 2011/0022695 A1 | 1/2011 | Dalal et al. | |
| 2011/0032843 A1 | 2/2011 | Papp et al. | |
| 2011/0051714 A1 | 3/2011 | Somes | |
| 2011/0075674 A1 | 3/2011 | Li et al. | |
| 2011/0085559 A1 | 4/2011 | Chung et al. | |
| 2011/0142053 A1 | 6/2011 | Van Der Merwe et al. | |
| 2011/0206053 A1 | 8/2011 | Henry et al. | |
| 2011/0261825 A1 | 10/2011 | Ichino | |
| 2011/0268118 A1 | 11/2011 | Schlansker et al. | |
| 2011/0271007 A1 | 11/2011 | Wang et al. | |
| 2011/0283017 A1 | 11/2011 | Alkhatib et al. | |
| 2011/0299413 A1 | 12/2011 | Chatwani et al. | |
| 2011/0299534 A1 | 12/2011 | Koganti et al. | |
| 2011/0310899 A1 | 12/2011 | Alkhatib et al. | |
| 2012/0014386 A1 | 1/2012 | Xiong et al. | |
| 2012/0014387 A1 | 1/2012 | Dunbar et al. | |
| 2012/0044943 A1 | 2/2012 | Hinz et al. | |
| 2012/0236734 A1 | 9/2012 | Sampath et al. | |
| 2013/0024579 A1 | 1/2013 | Zhang et al. | |
| 2013/0044751 A1 | 2/2013 | Casado et al. | |
| 2013/0044752 A1 | 2/2013 | Koponen et al. | |
| 2013/0044761 A1 | 2/2013 | Koponen et al. | |
| 2013/0044762 A1 | 2/2013 | Casado et al. | |
| 2013/0044763 A1 | 2/2013 | Koponen et al. | |
| 2013/0044764 A1 | 2/2013 | Casado et al. | |
| 2013/0103834 A1 | 4/2013 | Dzerve et al. | |
| 2013/0142203 A1 | 6/2013 | Koponen et al. | |
| 2013/0163427 A1 | 6/2013 | Beliveau et al. | |
| 2013/0163475 A1 | 6/2013 | Beliveau et al. | |
| 2013/0227097 A1 | 8/2013 | Yasuda et al. | |
| 2013/0332602 A1 | 12/2013 | Nakil et al. | |
| 2014/0029451 A1 | 1/2014 | Nguyen | |
| 2014/0036730 A1 | 2/2014 | Nellikar et al. | |
| 2014/0195666 A1 | 7/2014 | Dumitriu et al. | |

FOREIGN PATENT DOCUMENTS

| | | |
|---|---|---|
| EP | 1653688 | 5/2006 |
| EP | 1855420 | 11/2007 |
| EP | 1868318 | 12/2007 |
| EP | 2745473 | 6/2014 |
| JP | 2003-069609 | 3/2003 |
| JP | 2003-124976 | 4/2003 |
| JP | 2003-318949 | 11/2003 |
| WO | WO 2006/095391 | 9/2006 |
| WO | WO 2013/026050 | 2/2013 |
| WO | WO 2013/184846 | 12/2013 |

OTHER PUBLICATIONS

Anderson, Thomas, et al., "Overcoming the Internet Impasse through Virtualization," Apr. 2005, pp. 34-41, IEEE Computer Society.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Author Unknown, "Cisco Nexis 1000V Series Switches," Date Unknown but prior to Jul. 29, 2010, 2 pages, Cisco Systems, Inc., http://web.archive.org/web/20100729045626/http://www.cisco.com/en/US/Products/ps9902/index.html.
Author Unknown, "Virtual Machine Device Queues," White Paper, Month Unknown, 2007, pp. 1-4, Intel Corporation.
Bavier, Andy, et. al., "In VINI Veritas: Realistic and Controlled Network Experimentation," SIGCOMM'06, Sep. 2006, pp. 1-14, Pisa, Italy.
Bhatia, Sapan, et al., "Trellis: A Platform for Building Flexible, Fast Virtual Networks on Commodity Hardware," ROADS'08, Dec. 9, 2008, pp. 1-6, Madrid, Spain, ACM.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," Seventh ACM SIGCOMM' HotNets Workshop, Nov. 2008, pp. 1-6, ACM.
Casado, Martin, et al., "SANE: A Protection Architecture for Enterprise Networks," In proceedings of Usenix Security, Aug. 2006, pp. 1-15.
Casado, Martin, et al., "Scaling Out: Network Virtualization Revisited," Month Unknown, 2010, pp. 1-8.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Farrel, A., "A Path Computation Element (PCS)—Based Architecture," Aug. 2006, pp. 1-41, RFC 4655.
Fischer, Anna, "[PATCH][RFC] net/bridge: add basic VEPA support," Jun. 2009, pp. 1-5, GMANE Org.
Greenberg, Albert, et al., "A Clean Slate 4D Approach to Network Control and Management," ACM SIGCOMM Computer Communication Review, Oct. 2005, 12 pages, vol. 35, No. 5.
Greenberg, Albert, et al., "VL2: A Scalable and Flexible Data Center Network," SIGCOMM'09, Aug. 17-21, 2009, pp. 51-62, ACM, Barcelona, Spain.
Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.
Kamath, Daya, et. al., "Edge virtual Bridge Proposal, Version 0. Rev. 0.1," Apr. 23, 2010, pp. 1-72, IEEE.
Koponen, Teemu, et al., "Onix: A Distributed Control Platform for Large-scale Production Networks," In Proc. OSDI, Oct. 2010, pp. 1-14.
Lakshminarayanan, Karthik, et al., "Routing as a Service," Month Unknown, 2004, pp. 1-15, Berkeley, California.
Luo, Jianying, et al., "Prototyping Fast, Simple, Secure Switches for Ethane," Month Unknown, 2007, pp. 1-6.
McKeown, Nick, et al., "OpenFlow: Enabling Innovation in Campus Networks," ACS SIGCOMM Computer communication Review, Apr. 2008, pp. 69-74, vol. 38, No. 2.
Mogul, Jeffrey C., et al., "API Design Challenges for Open Router Platforms on Proprietary Hardware," Oct. 2008, pp. 1-6.
Turner, Jonathan S., "A Proposed Architecture for the GENI Backbone Platform," ANCS'06, Dec. 3-5, 2006, 10 pages, ACM, San Jose, California, USA.
Yang, L., et al., "Forwarding and Control Element Separation (ForCES) Framework," Apr. 2004, pp. 1-40, The Internet Society.
Davie, B., et al., A Stateless Transport Tunneling Protocol for Network Virtualization (STT), Mar. 5, 2012, pp. 1-19, Nicira Networks, Inc., available at http://tools.ietf.org/html/draft-davie-stt-01.
Foster, Nate, et al., "Frenetic: A Network Programming Language," ICFP '11, Sep. 19-21, 2011, 13 pages, Tokyo, Japan.
Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 1 of 2, pp. 1-79.
Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 2 of 2, pp. 80-167.
Loo, Boon Thau, et al., "Declarative Routing: Extensible Routing with Declarative Queries," In Proc. of SIGCOMM, Aug. 21-26, 2005, 14 pages, Philadelphia, PA, USA.
Loo, Boon Thau, et al., "Implementing Declarative Overlays," In Proc. of SOSP, Oct. 2005, 16 pages, Brighton, UK.
Shenker, Scott, et al., "The Future of Networking, and the Past of Protocols," Dec. 2, 2011, pp. 1-30, USA.
Al-Fares, Mohammad, et al., "A Scalable, Commodity Data Center Network Architecture," Aug. 17-22, 2008, pp. 63-74, Seattle, Washington, USA.
Das, Suarav, et al., "Unifying Packet and Circuit Switched Networks with OpenFlow," Dec. 7, 2009, 10 pages.

(56) References Cited

OTHER PUBLICATIONS

Das, Suarav, et al. "Simple Unified Control for Packet and Circuit Networks," Month Unknown, 2009, pp. 147-148, IEEE.
Portions of prosecution history of U.S. Appl. No. 13/589,035, Feb. 17, 2015, Koponen, Teemu, et al.
Portions of prosecution history of U.S. Appl. No. 13/589,044, Jan. 23, 2015, Koponen, Teemu, et al.
Portions of prosecution history of U.S. Appl. No. 13/589,042, Feb. 13, 2015, Casado, Martin, et al.
Portions of prosecution history of U.S. Appl. No. 13/589,040, Oct. 16, 2014, Casado, Martin et al.
Portions of prosecution history of U.S. Appl. No. 13/589,046, Aug. 12, 2014, Casado, Martin, et al.
Portions of prosecution history of EP12823387.1, Mar. 17, 2015 (mailing date), Nicira, Inc.
Dumitriu, Dan Mihai, et al., U.S. Appl. No. 61/514,990, filed Aug. 4, 2011.
International Preliminary Report on Patentability for PCT/US2012/051506, Feb. 27, 2014 (mailing date), Nicira, Inc.
Wang, Wei-Ming, et al., "Analysis and Implementation of an Open Programmable Router Based on Forwarding and Control Element Separation," Sep. 2008, pp. 769-779, Journal of Computer Science and Technology.

* cited by examiner

FEDERATING INTERCONNECTION SWITCHING ELEMENT NETWORK TO TWO OR MORE LEVELS

CLAIM OF BENEFIT TO PRIOR APPLICATIONS

This application claims the benefit of U.S. Provisional Application 61/524,755, entitled "Interconnecting Logical Datapaths at Multiple Failure Domains", filed Aug. 17, 2011; U.S. Provisional Application 61/524,756, entitled "Virtual Interconnect for Binding Together Differently Segmented Site Networks", filed Aug. 17, 2011; U.S. Provisional Application 61/671,664, entitled "Hierarchical Logical Switching Structure", filed Jul. 13, 2012; and U.S. Provisional Application 61/675,807, entitled "Interconnection of Networks", filed Jul. 25, 2012. U.S. Applications 61/524,755, 61/524,756, 61/671,664, and 61/675,807 are incorporated herein by reference.

BACKGROUND

Many current enterprises have large and sophisticated networks comprising switches, hubs, routers, servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across multiple users.

In response, there is a growing movement towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals results in hampering at least one of the others. For instance, one can easily provide network mobility for virtual machines within a layer 2 ("L2") domain, but L2 domains cannot scale to large sizes. Furthermore, retaining tenant isolation greatly complicates mobility. As such, improved solutions that can satisfy the scalability, mobility, and multi-tenancy goals are needed.

BRIEF SUMMARY

Some embodiments of the invention provide different mechanisms for connecting two or more networks together in order to achieve communication between machines (e.g., virtual machines or physical machines) located within the different networks. In some embodiments, the networks connected together are located at different sites (e.g., different data centers), each of which consists of several end machines. Some embodiments utilize interconnection switching elements located at the edges of the different networks that are specifically programmed to enable packets from a source network to be read by a destination network. In some embodiments, the connection of the networks forms a larger logical network that includes the individual site networks.

In some embodiments, the individual networks logically connected together are themselves logical networks. Each logical network is managed by a network control system that enables the specification of a logical datapath set for the logical network. The network control system configures a set of shared switching elements to implement the specified logical datapath set, thereby virtualizing the switching elements. In order to interconnect multiple logical networks, some embodiments provide a hierarchical control system that includes a hierarchical arrangement of network controllers. A set of higher-level network controllers receives a specification of a higher-level logical datapath set that includes the machines of all of the lower-level logical networks. The higher-level network controllers generate flow entries that are passed down to the lower-level network controllers. These lower-level network controllers configure the shared switching elements within their respective networks in order to implement the higher-level logical datapath set on top of their own respective lower-level logical datapath sets. In this case, the higher-level logical datapath set serves to interconnect the lower-level logical datapath sets, thereby interconnecting the networks.

The hierarchical controller arrangement in turn results in hierarchical processing of packets by the switching elements within the network. As stated, the higher-level network controllers generate flow tables that implement the highest-level logical datapath set that governs packet forwarding between end machines of the network, then pass these tables down to the lower-level network controllers. The lower-level network controllers then incorporate the received higher-level flow entries into their own flow tables that implement the lower-level logical datapath sets. Each set of lowest-level network controllers generates flow tables for the physical managed switching elements within the network of the controller set, and passes these generated flow tables to the physical switching elements. These flow tables specify lookup entries that the managed switching elements use to process packets within the logical network. When a managed switching element receives a packet on a physical port, the managed switching element maps the packet to logical ports of the hierarchical data paths, makes a forwarding decision to an egress port at the highest level, and maps the identified egress port back down through the hierarchy of data paths to a physical egress port.

In some embodiments, the networks logically connected together may include unmanaged segmented networks. In some cases, a network manager will want to provide connections between a first network segmented using a first tagging or tunneling technique (e.g., VLAN, MAC-in-MAC, L2 over L3, MPLS, etc.) and a second network segmented using a second tagging or tunneling technique. Even when the two networks use the same technique (e.g., both networks using VLANs), the implementation of that technique (e.g., the structure of the tags used in packet headers) may be different between the two networks such that they are effectively using two different techniques. Some embodiments provide a mechanism for connecting such differently-segmented networks across a common interconnecting network (e.g., a layer 3 ("L3") network) that can forward traffic between the different networks.

To connect such networks, some embodiments use a single managed interconnection switching element or cluster thereof at the edge of each of the segmented networks, then manage these interconnection switching elements with a network controller that defines a logical datapath set between the sites. The network controller generates flow tables that implement the logical datapath set and passes these flow tables to the set of physical interconnection switching elements, the forwarding tables of which implement the various levels of logical flow. Rather than corresponding to individual end machines of the network segments, the ports of the logical switching element instead correspond to the network segments themselves (e.g., a particular VLAN corresponding to a particular port).

The managed interconnection switching elements are programmed to be able to remove and add the local context tags (e.g., VLAN tags) of their local site network. Therefore, these switching elements have the ability to receive a local packet, strip the packet of its local context, and use the logical switching element implementation to add a context for the interconnecting network that identifies the interconnection switching element local to the destination site network for the packet.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
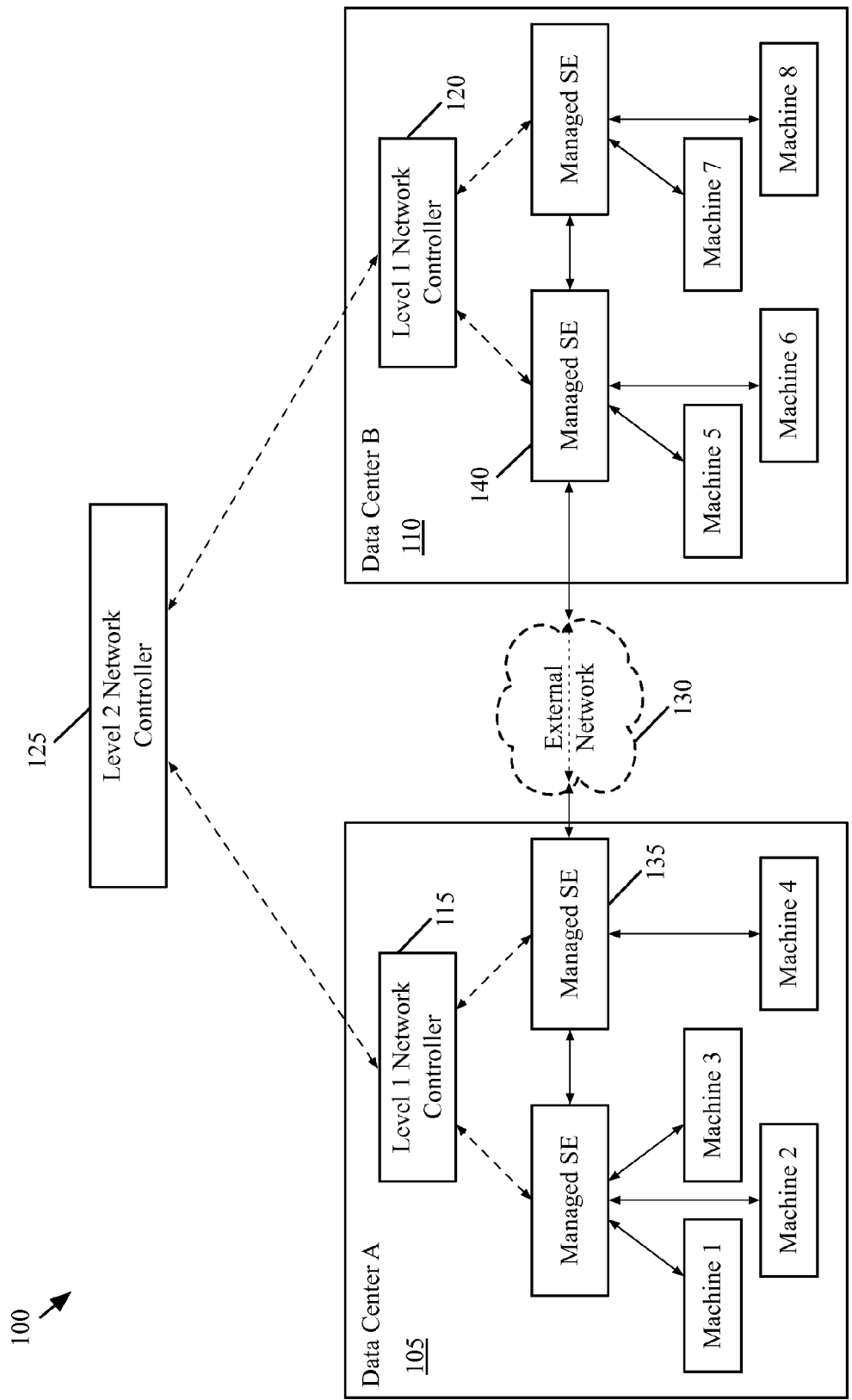
FIG. 1 illustrates an example of a hierarchically-controlled network.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a network control system that allows several different logical datapath sets to be specified for several different users through one or more shared forwarding elements without allowing the different users to control or even view each other's forwarding logic. The shared forwarding elements in some embodiments can include virtual or physical network switches, software switches (e.g., Open vSwitch), routers, and/or other switching devices, as well as any other network elements (such as load balancers, etc.) that establish connections between these switches, routers, and/or other switching devices. Such forwarding elements (e.g., physical switches or routers) are also referred to below as switching elements. In contrast to an off the shelf switch, a software forwarding element is a switching element that in some embodiments is formed by storing its switching table(s) and logic in the memory of a standalone device (e.g., a standalone computer or a device (e.g., a computer) that also executes a hypervisor and one or more virtual machines on top of that hypervisor.

More specifically, the network control system of some embodiments manages networks over which machines (e.g. virtual machines) belonging to several different users (i.e., several different users in a private or public hosted environment with multiple hosted computers and managed forwarding elements that are shared by multiple different related or unrelated tenants) may exchange data packets for separate logical datapath sets. That is, machines belonging to a particular user may exchange data with other machines belonging to the same user over a logical datapath set for that user, while machines belonging to a different user exchange data with each other over a different logical datapath set implemented on the same physical managed network. In some embodiments, a logical datapath set (also referred to as a logical forwarding element, logical switching element (e.g., logical switch, logical router), or logical network in some cases) is a logical construct that provides switching fabric to interconnect several logical ports, to which a particular user's machines (physical or virtual) may attach.

These managed, shared switching elements are referred to below as managed switching elements or managed forwarding elements as they are managed by the network control system in order to implement the logical datapath sets. In some embodiments described below, the control system manages these switching elements by pushing physical control plane data to them, as further described below. Switching elements generally receive data (e.g., a data packet) and perform one or more processing operations on the data, such as dropping a received data packet, passing a packet that is received from one source device to another destination device, processing the packet and then passing it to a destination device, etc. In some embodiments, the physical control plane data that is pushed to a switching element is converted by the switching element (e.g., by a general purpose processor of the switching element) to physical forwarding plane data that specify how the switching element (e.g., how a specialized switching circuit of the switching element) processes data packets that it receives.

In some embodiments, the network control system includes one or more network controllers (also called controller instances below) that allow the system to accept logical datapath sets from users and to configure the switching elements to implement these logical datapath sets. These controllers allow the system to virtualize control of the shared switching elements and the logical networks that are defined by the connections between these shared switching elements, in a manner that prevents the different users from viewing or controlling each other's logical datapath sets and logical networks while sharing the same switching elements.

In some embodiments, each controller instance is a device (e.g., a general-purpose computer) that executes one or more modules that transform the user input from a logical control plane to a logical forwarding plane, and then transform the logical forwarding plane data to physical control plane data. These modules in some embodiments include a control module and a virtualization module. A control module allows a user to specify and populate logical datapath sets, while a virtualization module implements the specified logical datapath sets by mapping the logical datapath sets onto the physical switching infrastructure. In some embodiments, the control and virtualization modules are two separate applications, while in other embodiments they are part of the same application.

In some embodiments described below, the virtualization module converts logical forwarding plane data directly to physical control plane data that is pushed to the managed switches. While some embodiments perform this conversion directly from the logical forwarding plane to the physical control plane (providing data that is customized specifically for each managed switching element), other embodiments improve the scalability of the system by introducing an intermediate universal forwarding state that provides data at the physical control plane level that is not customized to any particular managed switching element.

In such embodiments, from the logical forwarding plane data for a particular logical datapath set, the virtualization module of some embodiments generates universal physical control plane (UPCP) data that is generic for any managed switching element that implements the logical datapath set. In some embodiments, this virtualization module is part of a controller instance that is a master controller for the particular logical datapath set. This controller is referred to as the logical controller.

In some embodiments, the UPCP data is then converted to customized physical control plane (CPCP) data for each particular managed switching element by a controller instance that is a master physical controller instance for the particular managed switching element, or by a chassis controller for the particular managed switching element, as further described in concurrently filed U.S. patent application Ser. No. 13/589,077, now published as U.S. Patent Publication 2013/0103817, entitled "Chassis Controller,". When the chassis controller generates the CPCP data, the chassis controller obtains the UPCP data from the virtualization module of the logical controller through the physical controller.

Irrespective of whether the physical controller or chassis controller generates the CPCP data, the CPCP data for a particular managed switching element needs to be propagated to the managed switching element. In some embodiments, the CPCP data is propagated through a network information base (NIB) data structure, which in some embodiments is an object-oriented data structure. Several examples of using the NIB data structure are described in U.S. patent application Ser. Nos. 13/177,529 and 13/177,533, which are incorporated herein by reference. As described in these applications, the NIB data structure is also used in some embodiments to may serve as a communication medium between different controller instances, and to store data regarding the logical datapath sets (e.g., logical switching elements) and/or the managed switching elements that implement these logical datapath sets.

However, other embodiments do not use the NIB data structure to propagate CPCP data from the physical controllers or chassis controllers to the managed switching elements, to communicate between controller instances, and to store data regarding the logical datapath sets and/or managed switching elements. For instance, in some embodiments, the physical controllers and/or chassis controllers communicate with the managed switching elements through OpenFlow entries and updates over the configuration protocol. Also, in some embodiments, the controller instances use one or more direct communication channels (e.g., RPC calls) to exchange data. In addition, in some embodiments, the controller instances (e.g., the control and virtualization modules of these instance) express the logical and/or physical data in terms of records that are written into the relational database data structure. In some embodiments, this relational database data structure is part of the input and output tables of a table mapping engine (called nLog) that is used to implement one or more modules of the controller instances.

Several embodiments described below provide network control systems that completely separate the logical forwarding space (i.e., the logical control and forwarding planes) from the physical forwarding space (i.e., the physical control and forwarding planes). These control systems achieve such separation by using a mapping engine to map the logical forwarding space data to the physical forwarding space data. By completely decoupling the logical space from the physical space, the control systems of such embodiments allow the logical view of the logical forwarding elements to remain unchanged while changes are made to the physical forwarding space (e.g., virtual machines are migrated, physical switches or routers are added, etc.).

In some embodiments, the network control system manages more than a single network. The network control system of some embodiments provides different mechanisms for connecting two or more networks together in order to achieve communication between machines (e.g., virtual machines or physical machines) located within the different networks. In some embodiments, the networks connected together are located at different sites (e.g., different data centers), each of which consists of several end machines. Some embodiments utilize interconnection switching elements located at the edges of the different networks that are specifically programmed to enable packets from a source network to be read by a destination network. In some embodiments, the connection of the networks forms a larger logical network that includes the individual site networks.

In some embodiments, the individual networks logically connected together are themselves logical networks. Each logical network is managed by a network control system that enables the specification of a logical datapath set for the logical network. The network control system configures a set of shared switching elements to implement the specified logical datapath set, thereby virtualizing the switching elements.

In order to interconnect multiple logical networks, some embodiments provide a hierarchical control system that includes a hierarchical arrangement of network controllers. A set of higher-level network controllers receives a specification of a higher-level logical datapath set that includes the machines of all of the lower-level logical networks. The higher-level network controllers generate flow entries that are passed down to the lower-level network controllers. These lower-level network controllers configure the shared switching elements within their respective networks in order to implement the higher-level logical datapath set on top of their own respective lower-level logical datapath sets. In this case, the higher-level logical datapath set serves to interconnect the lower-level logical datapath sets, thereby interconnecting the networks.

The hierarchical controller arrangement in turn results in hierarchical processing of packets by the switching elements within the network. As stated, the higher-level network controllers generate flow tables that implement the highest-level logical datapath set that governs packet forwarding between end machines of the network, then pass these tables down to the lower-level network controllers. The lower-level network controllers then incorporate the received higher-level flow entries into their own flow tables that implement the lower-level logical datapath sets. Each set of lowest-level network controllers generates flow tables for the physical managed switching elements within the network of the controller set, and passes these generated flow tables to the physical switching elements. These flow tables specify lookup entries that the managed switching elements use to process packets within the logical network. When a managed switching element receives a packet on a physical port, the managed switching element maps the packet to logical ports of the hierarchical data paths, makes a forwarding decision to an egress port at the highest level, and maps the identified egress port back down through the hierarchy of data paths to a physical egress port.

FIG. 1 illustrates an example of such a hierarchically-controlled network 100. This figure illustrates a first data center 105 and a second data center 110. Located at each of the data centers are four end machines, which could be virtual machines or physical machines, depending on the setups of the particular data centers. These end machines are connected to managed switching elements, which in some embodiments are physical switching elements that implement logical datapath sets (also referred to as logical switching elements) generated by the network controllers. The managed switching elements include software switching elements, dedicated hardware switching elements, or a combination thereof in different embodiments. As shown, a managed switching element 135 at the first data center 105 and a managed switching element 140 at the second data center 110 connect through an external network 130 (e.g., via a tunnel). These two managed switching elements 135 and 140 function as interconnecting switching elements for the networks.

Additionally, the first data center 105 includes a first level network controller 115 while the second data center 110 includes a different first level network controller 120. The first level network controller 115 generates a first level logical switching element that connects the four machines located within data center 105, while the first level network controller 120 generates a first level logical switching element that connects the four machines located within the data center 110. These logical switching elements are conceptually illustrated in FIG. 2, described below.

In addition to the network controllers shown within the data centers 105 and 110, the network 100 includes a second level network controller 125. The network controller 125 generates a second level logical switching element that connects together the logical switching elements generated by the first level network controllers 115 and 120. In this way, a single point of control can be used to managed the entire network 100, while the networks in each of the separate data centers 105 and 110 can operate on their own, should their connection to each other or the second level network controller 125 be disrupted.

Figure 2:
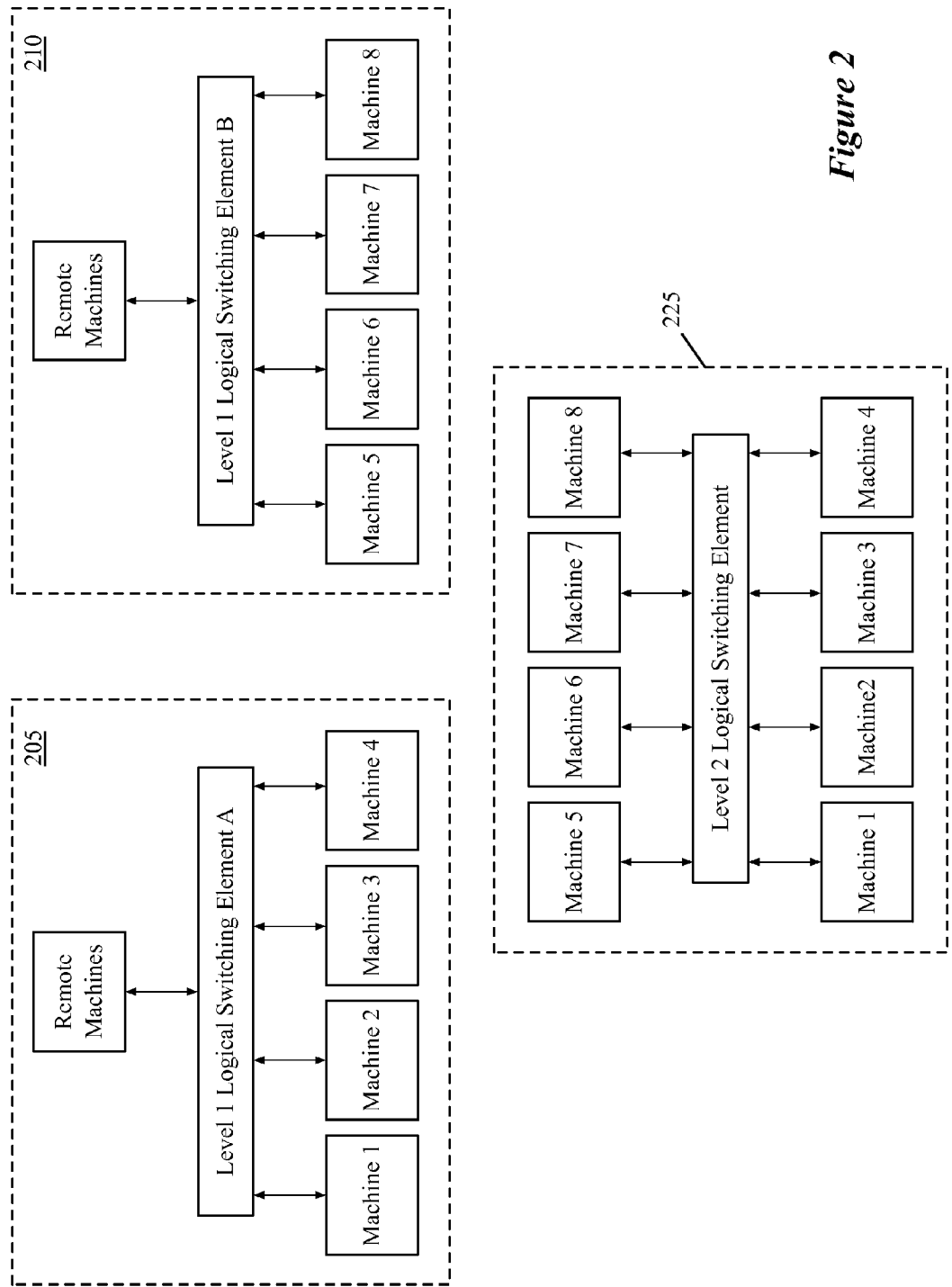
FIG. 2 conceptually illustrates the logical switches generated by the three network controllers in FIG. 1.

As mentioned, FIG. 2 conceptually illustrates the logical switching elements generated by the three network controllers in FIG. 1, and implemented by the managed switching elements. A first logical switching element 205 for the first data center 105 has five logical ports, four of which connect to the machines in the data center. The fifth logical port connects to the remote machines at the second data center 110 (logically connecting to a port on the logical switching element 210). The second logical switching element 210 for the second data center 110 is similarly arranged, with four ports connecting to machines at the local data center and a fifth port connecting to the remote machines at the first data center 105 (logically connecting to a port on the logical switching element 205). The second level logical switching element 225 includes eight ports for logically connecting to the eight machines (through the logical ports at the first level logical switching elements).

When a machine in the first data center 105 sends a packet to a machine in the second data center 110, these logical switching elements are implemented by the physical switching elements of the network in order to transport the packet. The first managed switching element that receives the packet initially performs ingress context mapping operations to identify the ingress port on the logical switching element 205 that corresponds to the physical ingress port from which the packet is received. The switching element then maps this identified first level logical ingress port to a second level logical ingress port of the second level logical switching element 225. The flow tables in the managed switching element implementing the second level logical switching element use the packet destination information to make a forwarding decision to a second level egress port, which is then mapped to a logical egress port in the logical switching element 210 that corresponds to the destination machine. The generation and operation of these logical switching elements will be described in detail in the sections below.

The above description relates to the situation in which the networks logically connected together are all managed networks governed by logical controllers that implement logical switching elements within the managed switching elements of the networks, and use those same managed switching elements to implement the interconnection between the networks. In some embodiments, the networks logically connected together may include unmanaged segmented networks. In some cases, a network manager will want to provide connections between a first network segmented using a first tagging or tunneling technique (e.g., VLAN, Mac-in-Mac, L2 over L3, MPLS, etc.) and a second network segmented using a second tagging or tunneling technique. Even when the two networks use the same technique (e.g., both networks using VLANs), the implementation of that technique (e.g., the structure of the tags used in packet headers) may be different between the two networks such that they are effectively using two different techniques. Some embodiments provide a mechanism for connecting such differently-segmented networks across a common interconnecting network (e.g., an L3 network) that can forward traffic between the different networks.

To connect such networks, some embodiments use a single managed interconnection switching element (e.g., an extender) or cluster thereof at the edge of each of the segmented networks, then manage these interconnection switching elements with a network controller that defines a logical datapath set between the sites. The network controller generates flow tables that implement the logical datapath set and passes these flow tables to the set of physical interconnection switching elements, the forwarding tables of which implement the various levels of logical flow. Rather than corresponding to individual end machines of the network segments, the ports of the logical switching element instead correspond to the network segments themselves (e.g., a particular VLAN corresponding to a particular port).

The managed interconnection switching elements are programmed to be able to remove and add the local context tags (e.g., VLAN tags) of their local site network. Therefore, these switching elements have the ability to receive a local packet, strip the packet of its local context, and use the logical switching element implementation to add a context for the interconnecting network that identifies the interconnection switching element local to the destination site network for the packet.

Figure 3:
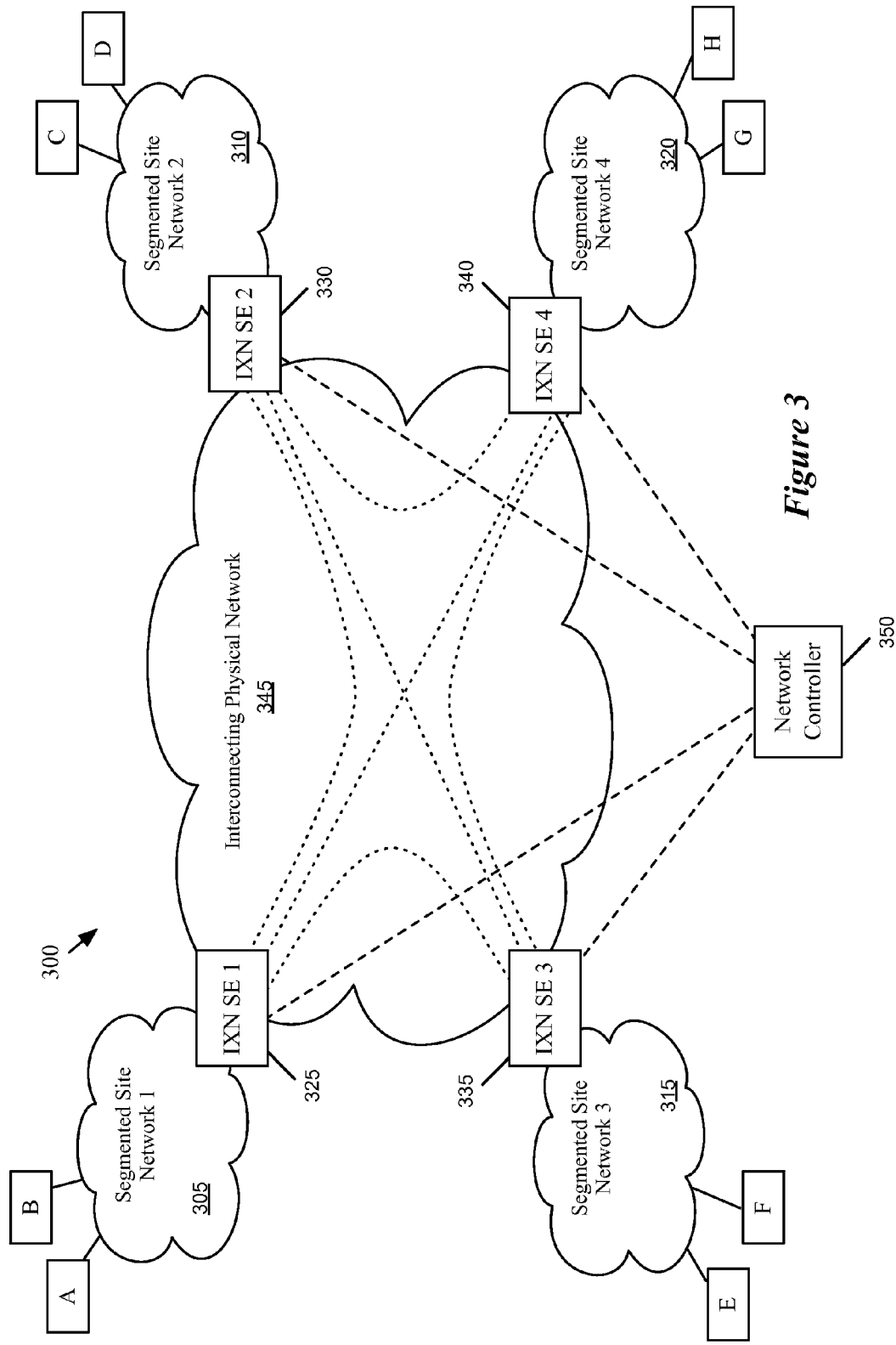
FIG. 3 illustrates an example of such an interconnected network.

FIG. 3 illustrates an example of such an interconnected network 300. This figure illustrates four segmented site networks 305-320. Located at each of the site networks are several machines belonging to a network segment (e.g., VLAN, MPLS label, etc.) at that site network. In each of these networks, machines on one network segment can communicate with other machines on the same network segment (e.g., machine A and machine B). However, without the provision of interconnecting services, machines on a segment of site network 305 cannot communicate with machines on a segment of one of the other site networks (e.g., machine A and machine G cannot communicate).

In this situation, however, interconnection switching elements 325-340 are located at the edge of each site network 305-320, connecting the site networks to an interconnecting physical network 345. This interconnecting physical network acts as a common substrate for the four site networks (i.e., all four site networks attach to the network 345). As shown, a network controller 350 connects to each of the four interconnection switching elements 325-340. The network controller 350 (which may be a controller cluster or a single controller instance) generates flow tables for implementing a logical switching element that connects the four site networks, then passes the flow tables to the four interconnection switching elements 225-340.

Figure 4:
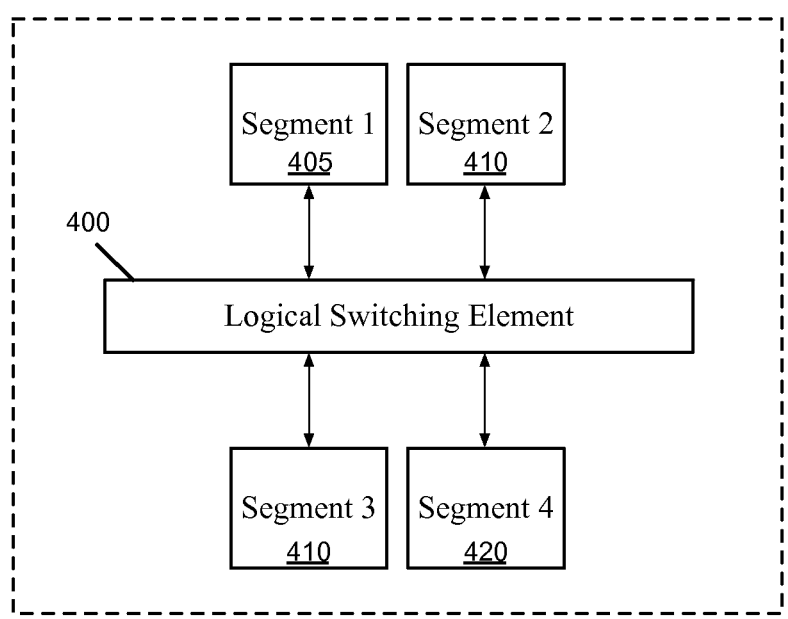
FIG. 4 conceptually illustrates the logical switching element generated by the network controller of FIG. 3.

FIG. 4 conceptually illustrates this logical switching element 400 generated by the network controller 350. The logical switching element 400 includes four ports, one for each network segment connected by the switching element. The segments include a first segment 405 located at the first segmented network 305, a second segment 410 located at the second segmented network 310, a third segment 415 located at the third segmented network 315, and a fourth segment 420 located at the fourth segmented network 320. Whereas the ports in the logical switching element of FIG. 2 above correspond to specific machines, here the ports correspond to network segments (e.g., VLANs).

The above FIG. 3 illustrates a managed network between the sites that has a single network controller at a single level. In addition, some embodiments enable the site networks to be grouped via a hierarchical structure such as that described above for FIG. 1. That is, several site networks are interconnected with a first lower-level network controller, while several additional site networks are interconnected with a second lower-level network controller. These two groups of site networks can then be themselves interconnected with a higher-level network controller that communicates with the lower-level network controller.

FIGS. 2-4 illustrate examples of the interconnection of site networks. Several more detailed embodiments are described below. First, Section I describes the environment of a managed network of end machines of some embodiments. Section II then describes the hierarchical use of network controllers to create a hierarchical logical network. Next, Section III describes the interconnection of unmanaged network segments through the use of both single-level and hierarchical logical interconnection networks. Finally, Section IV describes an electronic system with which some embodiments of the invention are implemented.

I. Environment

The following section will describe the environment in which some embodiments of the inventions are implemented. In the present application, switching elements and machines may be referred to as network elements, switches, or other terms. In addition, a network managed by one or more network controllers may be referred to as a managed network in the present application. In some embodiments, the managed network includes only managed switching elements (e.g., switching elements that are controlled by one or more network controllers) while, in other embodiments, the managed network includes managed switching elements as well as unmanaged switching elements (e.g., switching elements that are not controlled by a network controller).

Figure 5:
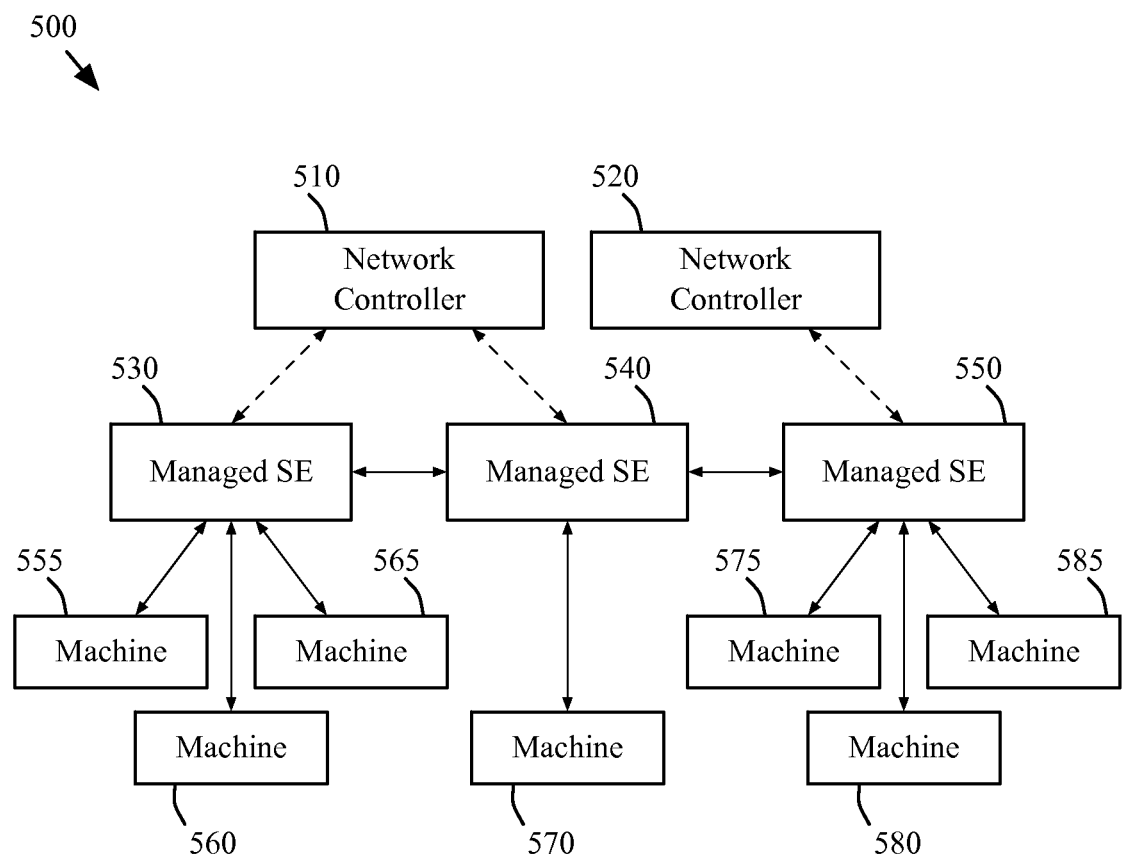
FIG. 5 conceptually illustrates a network architecture of some embodiments.

FIG. 5 conceptually illustrates a network architecture 500 of some embodiments. As shown, the network architecture 500 includes network controllers 510 and 520, managed switching elements 530-550, and machines 555-585.

In some embodiments, the managed switching elements 530-550 route (i.e., process and/or forward) network data (e.g., packets) between network elements in the network that are coupled to the managed switching elements 530-550. For instance, the managed switching element 530 routes network data between the machines 555-565 and the managed switching element 540. Similarly, the managed switching element 540 routes network data between the machine 570 and the managed switching elements 530 and 550, and the managed switching element 550 routes network data between the machines 575-585 and the managed switching element 540.

The managed switching elements 530-550 of some embodiments can be configured to route network data according to defined rules. In some embodiments, the managed switching elements 530-550 route network data based on routing criteria defined in the rules. Examples of routing criteria include source media access control (MAC) address, destination MAC address, packet type, source Internet Protocol (IP) address, destination IP address, source port, destination port, and/or network segment identifier (e.g., virtual local area network (VLAN) identifier, multi-protocol label switching (MPLS) label, etc.), among other routing criteria.

In some embodiments, the managed switching elements 530-550 can include standalone physical switching elements, software switching elements that operate within a computer, or any other type of switching element. For example, each of the managed switching elements 530-550 may be implemented as a hardware switching element, a software switching element, a virtual switching element, a network interface controller (NIC), or any other type of network element that can route network data. Moreover, the software or virtual switching elements may operate on a dedicated computer, or on a computer that also performs non-switching operations.

The machines 555-585 send and receive network data between each other over the network (and, in some cases, with other machines outside the network). In some embodiments, the machines 555-585 are referred to as network hosts that are each assigned a network layer host address (e.g., IP address). In some cases, the machines 555-585 are referred to as end systems because the machines 555-585 are located at the edge of the network. In some embodiments, each of the machines 555-585 can be a desktop computer, a laptop computer, a smartphone, a virtual machine (VM) running on a computing device, a terminal, or any other type of network host.

In some embodiments, each of the network controllers 510 and 520 controls one or more managed switching elements 530-550 that are located at the edge of a network (e.g., edge switching elements or edge devices). In this example, the managed switching elements 530-550 are edge switching elements. That is, the managed switching elements 530-550 are switching elements that are located at or near the edge of the network. In some embodiments, an edge switching element is the last switching element before one or more end machines (the machines 555-585 in this example) in a network. That is, an edge switching element is the first switching element that receives network data sent from one or more end machines and is the last switching element that receives network data sent to the one or more end machines. As indicated by dashed arrows in FIG. 5, the network controller 510 controls (i.e., manages) switching elements 530 and 540 and the network controller 520 controls switching element 550. In this application, a switching element that is controlled by a network controller of some embodiments may be referred to as a managed switching element.

In addition to controlling edge switching elements, the network controllers 510 and 520 of some embodiments also utilize and control non-edge switching elements (e.g., pool nodes and extenders, which are described in further detail below) that are inserted in the network to simplify and/or facilitate the operation of the managed edge switching elements. For instance, in some embodiments, the network controllers 510 and 520 require that the managed switching elements be interconnected in a hierarchical switching architecture that has several edge switching elements as the leaf nodes in the hierarchical switching architecture and one or more non-edge switching elements as the non-leaf nodes in this architecture. In some such embodiments, each edge switching element connects to one or more of the non-leaf switching elements, and uses such non-leaf switching elements to facilitate the communication of the edge switching element with other edge switching elements. Examples of such communications with an edge switching elements in some embodiments include (1) routing of a packet with an unknown destination address (e.g., unknown MAC address) to the non-leaf switching element so that the non-leaf switching element can route the packet to the appropriate edge switching element, (2) routing a multicast or broadcast packet to the non-leaf switching element so that the non-leaf switching element can distribute the multicast or broadcast packet to the desired destinations, and (3) routing packets to destination machines external to the network 500.

Some embodiments employ one level of non-leaf (non-edge) switching elements that connect to edge switching elements and in some cases to other non-leaf switching elements. Other embodiments, on the other hand, employ multiple levels of non-leaf switching elements, with each level of non-leaf switching elements after the first level serving as a mechanism to facilitate communication between lower level non-leaf switching elements and leaf switching elements. In some embodiments, the non-leaf switching elements are software switching elements that are implemented by storing forwarding tables in the memory of a standalone computer instead of an off the shelf switch. In some embodiments, the standalone computer may also be executing a hypervisor and one or more virtual machines on top of that hypervisor. Irrespective of the manner by which the leaf and non-leaf switching elements are implemented, the network controllers 510 and 520 of some embodiments store switching state information regarding the leaf and non-leaf switching elements.

As mentioned above, the switching elements 530-550 of some embodiments route network data between network elements in the network. In some embodiments, the network controllers 510 and 520 configure the routing of network data between the network elements in the network by the managed switching elements 530-550. In this manner, the network controllers 510 and 520 can control the flow (i.e., specify the data path) of network data between network elements.

For example, the network controller 510 might instruct the managed switching elements 530 and 540 to route network data from the machine 555 to the machine 570 (and vice versa) and to not route (e.g., drop) network data from other machines to the machines 555 and 570. In such case, the network controller 510 controls the flow of network data through the managed switching elements 530 and 540 such that network data transmitted to and from the machine 555 is only routed to the machine 570. Thus, the machines 555 and 570 cannot send and receive network data to and from the machines 560, 565, and 575-585.

In some embodiments, the network controllers 510 and 520 store physical network information and logical network information. The physical network information specifies the physical components in the managed network and how the physical components are physically connected one another in the managed network. For example, the physical network information may include the number of machines, managed switching elements, pool nodes, and extenders (the latter two are described in further detail in the following sections), and how the components are physically connected to one another in the managed network. The logical network information may specify the logical connections between a set of physical components in the managed network (e.g., machines) and a mapping of the logical connections across the physical components of the managed network.

Some embodiments of the network controllers 510 and 520 implement a logical switching element across the managed switching elements 530-550 based on the physical network information and the logical switching element information described above. A logical switching element can be defined to function any number of different ways that a switching element might function. The network controllers 510 and 520 implement the defined logical switching element through control of the managed switching elements 530-550. In some embodiments, the network controllers 510 and 520 implement multiple logical switching elements across the managed switching elements 530-550. This allows multiple different logical switching elements to be implemented across the managed switching elements 530-550 without regard to the network topology of the network.

In some embodiments, a logical datapath set (LDPS) defines a logical switching element. A logical datapath set, in some embodiments, is a set of network data paths through the managed switching elements 530-550 that implement the logical switching element and the logical switch's defined functionalities. In these embodiments, the network controllers 510 and 520 translate (e.g., map) the defined logical datapath set into network configuration information for implementing the logical switching element. The network controllers 510 and 520 translate the defined logical datapath set into a corresponding set of data flows (i.e., data paths) between network elements in the network, in some embodiments. In these instances, the network controllers 510 and 520 instruct the managed switching elements 530-550 to route network data according to the data flows and, thus, implement the functionalities of the defined logical switching element. Within this application, logical datapath set, logical switch, logical switching element, and logical datapath may be used interchangeably.

Different embodiments of the network controllers 510 and 520 are implemented differently. For example, some embodiments implement the network controllers 510 and 520 in software as instances of a software application. In these cases, the network controllers 510 and 520 may be executed on different types of computing devices, such as a desktop computer, a laptop computer, a smartphone, etc. In addition, the software application may be executed on a virtual machine that runs on a computing device in some embodiments. In some embodiments, the network controllers 510 and 520 are implemented in hardware (e.g., circuits). In some embodiments, the network controllers 510 and 520 communicate with each other, in order to distribute information. In fact, in some embodiments, the network controllers that govern a logical network act as a controller cluster that behaves as a single network controller distributed across multiple machines.

Figure 6:
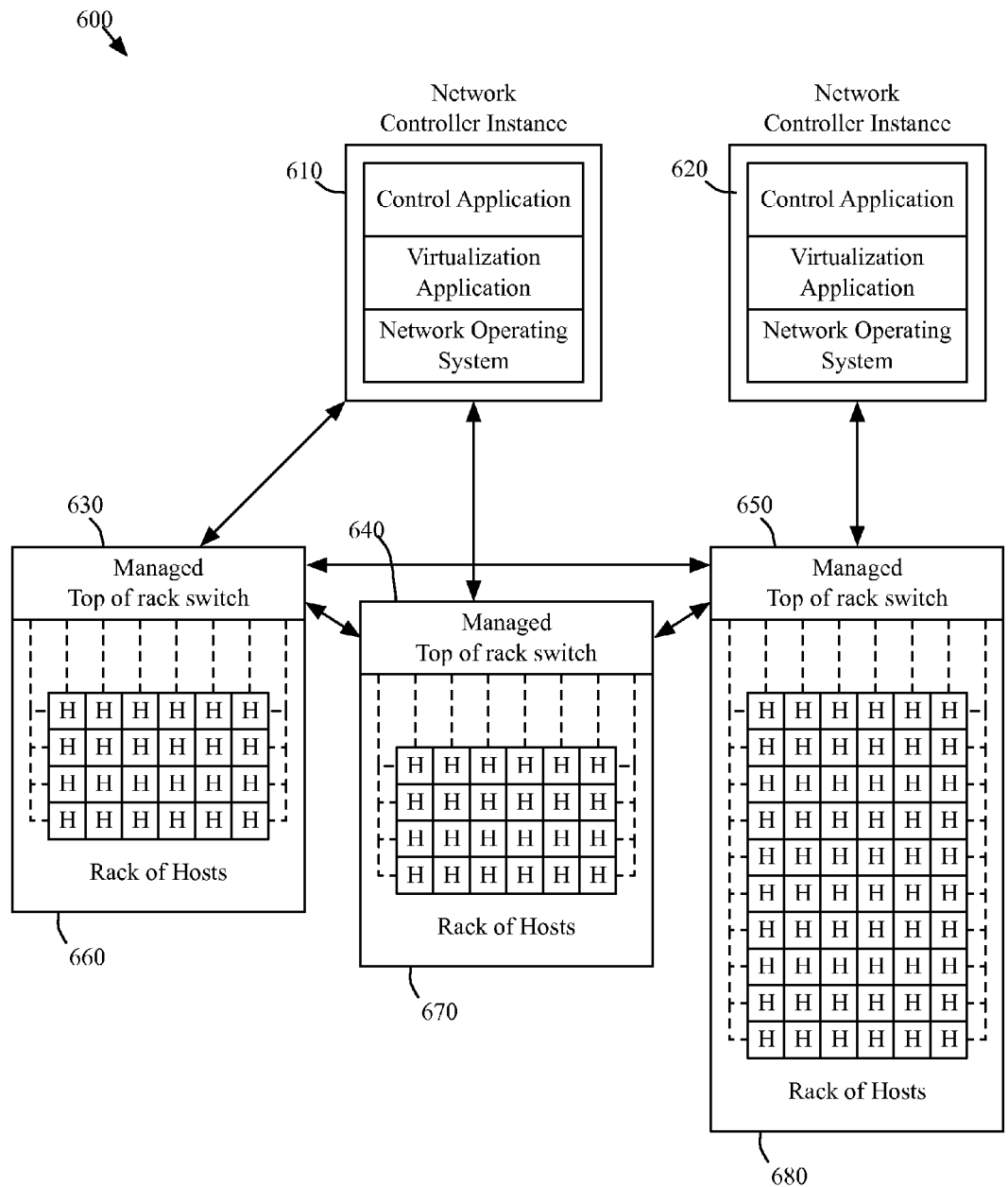
FIG. 6 illustrates an example of a set of managed switching elements managed by a network controller.

As mentioned above by reference to FIG. 5, the managed switching elements controlled by network controllers of some embodiments may be physical switching elements. FIG. 6 illustrates an example of a network control system that includes physical switching elements. This figure conceptually illustrates a network control system 600 of some embodiments for managing physical switching elements. Specifically, the network control system 600 manages network data in a data center that includes top of the rack (TOR) switching elements 630-650 and racks of hosts 660-680. Network controllers 610 and 620 manage the network by controlling the TOR switching elements 630-650.

A TOR switching element, in some embodiments, routes network data between hosts in the TOR switch's rack and network elements coupled to the TOR switching element. In the example illustrated in FIG. 6, the TOR switching element 630 routes network data between the rack of hosts 660 and TOR switching elements 640 and 650, the TOR switching element 640 routes network data between the rack of hosts 670 and TOR switching elements 630 and 650, and the TOR switching element 650 routes network data between the rack of hosts 680 and TOR switching elements 630 and 640.

As shown, each rack of hosts 660-680 includes multiple hosts. The hosts of some embodiments in the racks of hosts 660-680 are physical computing devices. In some embodiments, each host is a computing device that is assigned a network layer host address (e.g., IP address). The hosts of some embodiments send and receive network data to and from each other over the network.

As mentioned above, the network controller of some embodiments can be implemented in software as an instance of an application. As illustrated in FIG. 6, the network controllers 610 and 620 are instances of a software application. As shown, each of the network controllers 610 and 620 includes several software layers: a control application layer, a virtualization application layer, and a networking operating system layer.

In some embodiments, the control application layer receives input (e.g., from a user) that specifies a network switching element. The control application layer may receive the input in any number of different interfaces, such as a graphical user interface (GUI), a command line interfaces, a web-based interface, a touchscreen interface, through an application programming interface (API) exposed to other network controller instances, etc. In some embodiments, the input specifies characteristics and behaviors of the network switching element, such as the number of switching element ports, access control lists (ACLs), network data forwarding, port security, or any other network switching element configuration options.

The control application layer of some embodiments defines a logical datapath set based on user input that specifies a network switching element. As noted above, a logical datapath set is a set of network data paths through managed switching elements that are used to implement the user-specified network switching element. In other words, the logical datapath set is a logical representation of the network switching element and the network switch's specified characteristics and behaviors.

Some embodiments of the virtualization application layer translate the defined logical datapath set into network configuration information for implementing the logical network switching element across the managed switching elements in the network. For example, the virtualization application layer of some embodiments translates the defined logical datapath set into a corresponding set of data flows. In some of these cases, the virtualization application layer may take into account various factors (e.g., logical switching elements that are currently implemented across the managed switching elements, the current network topology of the network, etc.), in determining the corresponding set of data flows.

The network operating system layer of some embodiments configures the managed switching elements' routing of network data. In some embodiments, the network operating system instructs the managed switching elements to route network data according to the set of data flows determined by the virtualization application layer.

In some embodiments, the network operating system layer maintains several views of the network based on the current network topology. One view that the network operating system layer of some embodiments maintains is a logical view. The logical view of the network includes the different logical switching elements that are implemented across the managed switching elements, in some embodiments. Some embodiments of the network operating system layer maintain a managed view of the network. Such managed views include the different managed switching elements in the network (i.e., the switching elements in the network that the network controllers control). In some embodiments, the network operating system layer also maintains relationship data that relate the logical switching elements implemented across the managed switching elements to the managed switching elements.

The network controller of some embodiments is described in greater detail in U.S. application Ser. No. 13/177,533, filed on Jul. 6, 2011 and entitled "Network Virtualization Apparatus and Method", which is incorporated herein by reference. As explained in further detail in this application, the control application of some embodiments performs a table-mapping operation (e.g., using an nLog table mapping engine) to transform tables in a logical control plane to tables in a logical forwarding plane. The logical control plane, in some embodiments, includes a collection of constructs that allow the control application and its users to specify one or more logical datapath sets within the logical control plane. The logical forwarding plane, in some embodiments, includes one or more data path sets of one or more users. Thus, the control application transforms the collection of constructs (e.g., as specified by a user) into the logical datapath sets. The virtualization application transforms logical forwarding plane data into physical control plane data (e.g., also using an nLog table mapping engine) that can be pushed down to the physical managed switching elements.

While FIG. 6 (and other figures in this application) may show a set of managed switching elements managed by a network controller, some embodiments provide several network controllers (also referred to as a cluster of network controllers or a control cluster) for managing the set of managed switching elements. In other embodiments, different control clusters may manage different sets of managed switching elements. Employing a cluster of network controllers in such embodiments to manage a set of managed switching elements increases the scalability of the managed network and increases the redundancy and reliability of the managed network. In some embodiments, the network controllers in a control cluster share (e.g., through the network operating system layer of the network controllers) data related to the state of the managed network in order to synchronize the network controllers.

Figure 7:
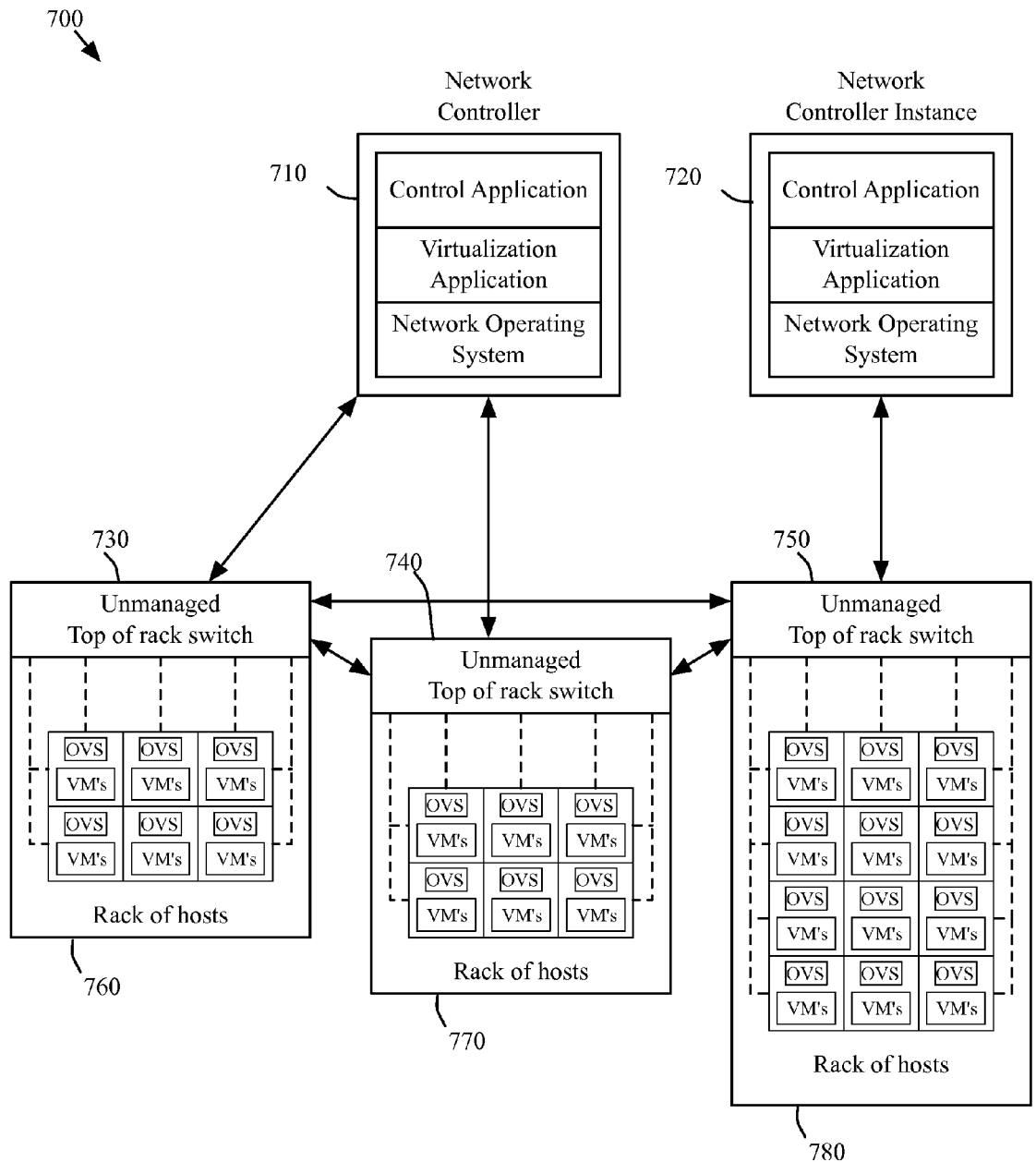
FIG. 7 conceptually illustrates a network control system of some embodiments for managing software switching elements.

FIG. 7 conceptually illustrates a network control system 700 of some embodiments for managing software switching elements. As shown, the network control system 700 includes network controllers 710 and 720, TOR switching elements 730-750, and racks of hosts 760-780.

The TOR switching elements 730-750 are similar to the TOR switching elements 630-650. The TOR switching elements 730-750 route network data between network elements in the network that are coupled to the TOR switching elements 730-750. In this example, the TOR switching element 730 routes network data between the rack of hosts 760 and TOR switching elements 740 and 750, the TOR switching element 740 routes network data between the rack of hosts 770 and TOR switching elements 730 and 750, and the TOR switching element 750 routes network data between the rack of hosts 780 and TOR switching elements 730 and 740. Since the TOR switching elements 730-750 are not managed switching elements, the network controllers 710 and 720 do not control these switching elements. Thus, the TOR switching elements 730-750 rely on the switching elements' pre-configured functionalities to route network data.

As illustrated in FIG. 7, each host in the racks of hosts 760-780 includes a software switching element (an open virtual switch (OVS) in this example) and several VMs. The VMs are virtual machines that are each assigned a set of network layer host addresses (e.g., a MAC address for network layer 2, an IP address for network layer 3, etc.) and can send and receive network data to and from other network elements over the network.

The OVSs of some embodiments route network traffic between network elements coupled to the OVSs. For example, in this example, each OVS routes network data between VMs that are running on the host on which the OVS is running, OVSs running on other hosts in the rack of hosts, and the TOR switching element of the rack.

By running a software switching element and several VMs on a host, the number of end machines or network hosts in the network may increase. Moreover, when a software switching element and several VMs are run on hosts in the racks of hosts 760-780, the network topology of the network is changed. In particular, the TOR switching elements 730-750 are no longer edge switching elements. Instead, the edge switching elements in this example are the software switching elements running on the hosts since these software switching elements are the last switching elements before end machines (i.e., VMs in this example) in the network. While the examples of software switching elements are open virtual switches (OVSs) in this example, in some embodiments different types of software switching elements might be used in order to implement the logical switching elements.

The network controllers 710 and 720 perform similar functions as the network controllers 610 and 620, described above by reference to FIG. 6, and also are for managing edge switching elements. As such, the network controllers 710 and 720 manage the software switches that are running on the hosts in the rack of hosts 760-780.

Figure 8:
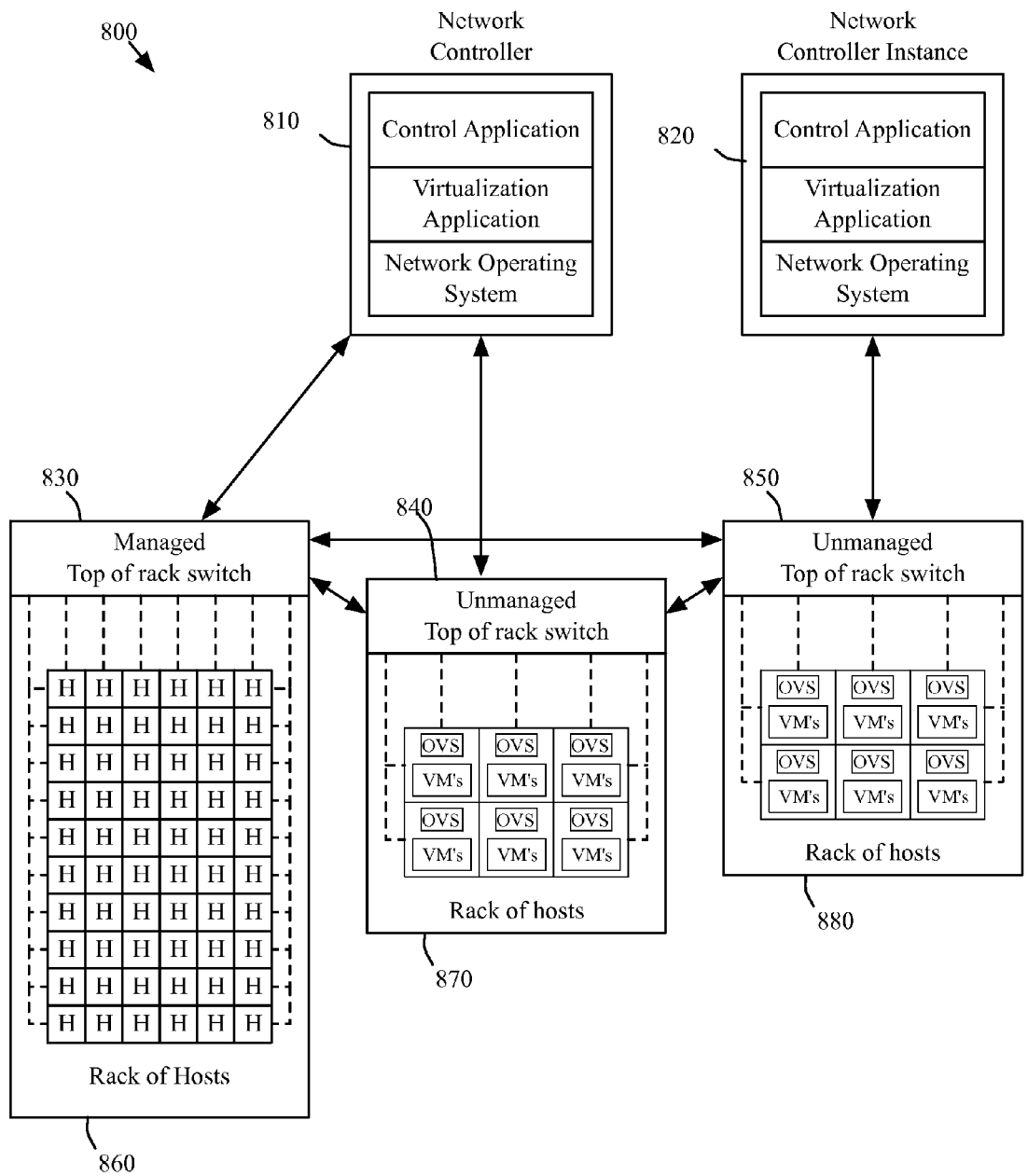
FIG. 8 illustrates an example of a network control system for managing both physical switching elements and software switching elements.

The above FIGS. 6 and 7 illustrate a network control system for managing physical switching elements and a network control system for managing software switching elements, respectively. However, the network control system of some embodiments can manage both physical switching elements and software switching elements. FIG. 8 illustrates an example of such a network control system. In particular, this figure conceptually illustrates a network control system 800 of some embodiments for managing TOR switching element 830 and software switching elements running on hosts in the racks of hosts 870 and 880.

The network controllers 810 and 820 perform similar functions as the network controllers 610 and 620, which described above by reference to FIG. 6, and also are for managing edge switching elements. In this example, the managed switching element 830 and the software switching elements running on the hosts in the racks of hosts 870 and 880 are edge switching elements because they are the last switching elements before end machines in the network. In particular, the network controller 810 manages the TOR switching element 830 and the OVSs that are running on the hosts in the rack of hosts 870, and the network controller 820 manages the OVSs that are running on the hosts in the rack of hosts 880.

Figure 9:
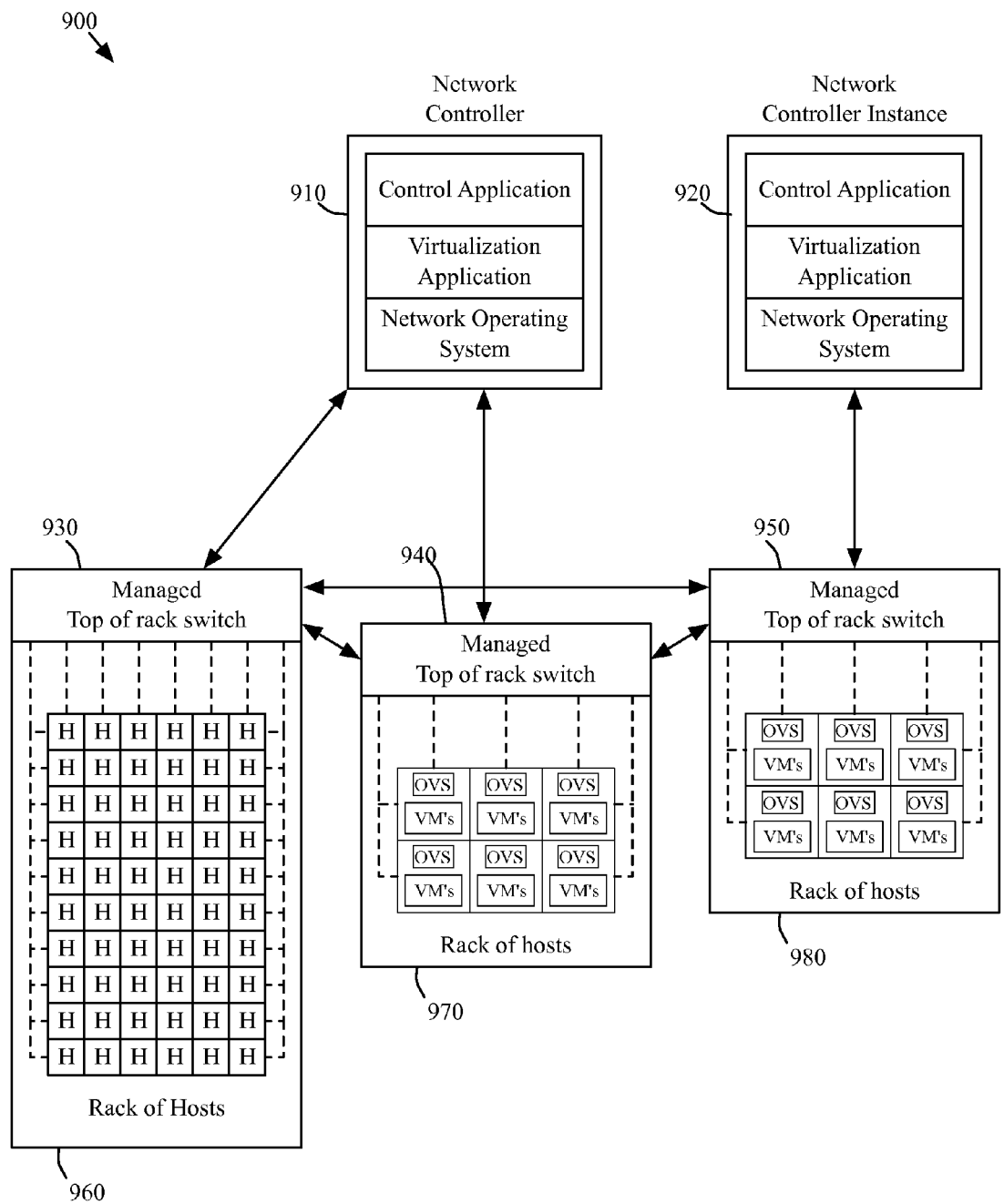
FIG. 9 illustrates a network control system that includes network controllers that control non-edge switching elements.

The above figures illustrate examples of network controllers that control edge switching elements in a network. However, in some embodiments, the network controllers can control non-edge switching elements as well. FIG. 9 illustrates a network control system that includes such network controllers. In particular, FIG. 9 conceptually illustrates a network control system 900 of some embodiments for managing TOR switching elements 930-950 and OVSs running on hosts in the racks of hosts 970 and 980.

As shown in FIG. 9, the network controllers 910 and 920 manage edge switching elements and non-edge switching elements. Specifically, the network controller 910 manages the TOR switching elements 930 and 940, and the software switches running on the hosts in the rack of hosts 970. The network controller 920 manages TOR switching element 950 and the software switching elements running on the hosts in the rack of hosts 980. In this example, the TOR switching element 930 and the software switching elements running on the hosts in the racks of hosts 970 and 980 are edge switching elements, and the TOR switching elements 940 and 950 are non-edge switching elements. The network controllers 910 and 920 perform similar functions as the network controllers 610 and 620, which are described above by reference to FIG. 6.

II. Hierarchical Network Controller Structure

In some embodiments, several individual logical networks (such as those shown above in FIGS. 5-9) can be logically connected together to form a larger multi-level logical network. In order to interconnect multiple logical networks, some embodiments provide a hierarchical network control system that includes a hierarchical arrangement of network controllers. A set of higher-level network controllers receives a specification of a higher-level logical datapath set that includes the machines of all of the lower-level logical networks to be interconnected. The higher-level network controllers generate flow entries that are passed down to the lower-level network controllers. These lower-level network controllers modify the flow entries to incorporate lower-level logical datapath set information, then configure the managed switching elements within their respective networks in order to implement the higher-level logical datapath set on top of their own respective lower-level logical datapath sets. In this case, the higher-level logical datapath set serves to interconnect the lower-level logical datapath sets, thereby interconnecting the networks.

The hierarchical controller arrangement in turn results in hierarchical processing of packets by the switching elements within the network. As stated, the higher-level network controllers generate flow tables that implement the highest-level logical datapath set that governs packet forwarding between end machines of the network, then pass these tables down to the lower-level network controllers. The lower-level network controllers then incorporate the received higher-level flow entries into their own flow tables that implement the lower-level logical datapath sets. Each set of lowest-level network controllers generates flow tables for the managed switching elements within the network of the controller set, and passes these generated flow tables to the managed switching elements. These flow tables specify lookup entries that the managed switching elements use to process packets within the logical network. When a switching element receives a packet on a physical port, the switching element maps the packet to logical ports of the hierarchical data paths, makes a forwarding decision to an egress port at the highest level, and maps the identified egress port back down through the hierarchy of data paths to a physical egress port.

A. Connecting Multiple Managed Networks

The above description of FIGS. 5-9 focuses on a single managed network, with one controller (or cluster of controllers) implementing a logical switching element within the physical switching elements of the network. In some embodiments, the machines connected by the logical switching element may be physically located in a single data center or across several data centers. For instance, in FIG. 9, the rack of hosts 960 might be in a first location while the racks of hosts 970 and 980 are located in a second location. In between two (or more locations) is an interconnecting network of unmanaged switching elements, routers, etc. (e.g., the Internet, a different local network, etc.).

1. Single Controller Cluster

Figure 10:
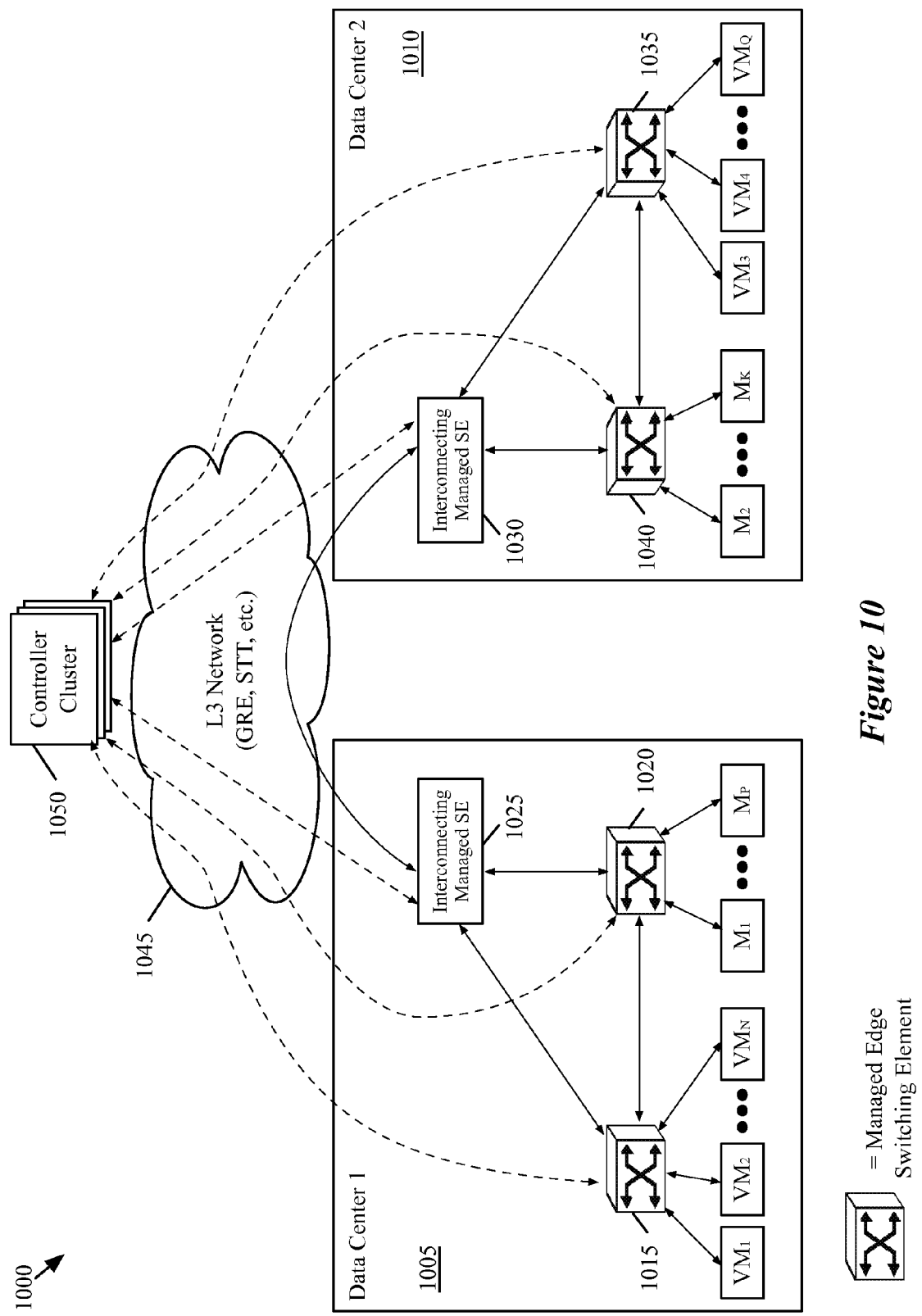
FIG. 10 illustrates a network that spans two data centers.

Some embodiments use a particular type of managed switching element to connect a managed network at a particular location (e.g., a data center with one or more racks of host machines) to an external unmanaged network (e.g., in order to connect the machines at the data center to machines at another data center through the unmanaged network). FIG. 10 illustrates a network 1000 that spans two data centers 1005 and 1010. The first data center 1005 includes managed switching elements 1015, 1020, and 1025. The managed switching elements 1015 and 1020 are edge switching elements, to which end machines (either virtual machines or physical machines) are connected. For instance, the edge switching element 1015 might be a software switching element (similar to the OVS switches in the previous section), and the edge switching element 1020 might be a TOR hardware switching element.

In addition to the edge switching elements 1015 and 1020, the first data center 1005 includes an interconnecting managed switching element 1025, which connects to the network outside the data center 1005. The interconnecting managed switching element 1025, in some embodiments, is an extender. An extender is a type of managed switching element described in detail in U.S. application Ser. No. 13/177,535, filed on Jul. 6, 2011 and entitled "Hierarchical Managed switching element Architecture", which is incorporated herein by reference. In some embodiments, an extender enables communication between a machine within the managed network and external machines by adding (to incoming packets) and removing (from outgoing packets) logical context IDs that indicate that a packet belongs to (and is routed on) a particular logical datapath set.

In FIG. 10, the second data center 1010 also includes several managed edge switching elements 1035 and 1040 connected to several machines, as well as an interconnecting managed switching element 1030. In some embodiments, this interconnecting managed switching element 1030 is also an extender, with the two extenders 1025 and 1030 communicating (through the external network 1045). In some embodiments, in order for these two managed switching elements 1025 and 1030 to communicate, a tunnel is defined through the network 1045 between the managed switching elements. In some embodiments, the network through which the tunnel is defined is a layer 3 (L3) network, such as an Internet Protocol (IP) network. Such a tunnel may be defined using Generic Routing Encapsulation (GRE), IP Security (IPSec), Stateless Transport Tunneling (STT), or other tunneling protocols. These tunnels enable packets to be transported over the network 1045 between the data centers 1005 and 1010 with no or minimal processing by the intervening switching/routing elements that make up the network 1045.

In addition to extenders, some embodiments utilize pool nodes as interconnecting managed switching elements (or use pool nodes as internal non-edge managed switching elements within a managed network). Pool nodes are described in detail in application Ser. No. 13/177,535, which is incorporated by reference above. Pool nodes, in some embodiments, are connected to and positioned above the edge switching elements in a hierarchical switching network architecture. In some embodiments, each edge switching element is only responsible for storing forwarding information for a subset of the machines connected by a logical datapath set. When a managed edge switching element does not have an entry for a destination address, the edge switching element automatically forwards the packet to a pool node, which stores information for a larger subset of the logical datapath set (or for all machines on the logical switching element). The pool node then forwards the packet to the appropriate next switching element in order for the packet to reach its destination.

In the example shown in FIG. 10, all of the machines at both data centers 1005 and 1010 are on a single logical switching element that implements a logical datapath set. One of ordinary skill in the art will recognize that in some embodiments, many different logical switching elements could be implemented at the same time by the managed switching elements in order to connect many different sets of machines within the data centers. These logical switching elements could connect machines in both data centers 1005 and 1010, as shown in this figure, as well as implementing logical datapath sets that connect machines only within one of the data centers. For instance, $VM_1$, $M_P$, and $VM_3$ might be connected via a first logical switching element while $VM_4$, $VM_2$, $M_1$, and $M_2$ are connected via a second logical switching element.

In some embodiments, when a packet is sent from a machine (e.g., $VM_1$) at the first data center 1005 to a machine (e.g., $VM_3$) at the second data center 1010, the interconnecting managed switching element 1025 encapsulates the packet in a tunneling protocol. This packet is transported through the network 1045 to the interconnecting managed switching element 1030, which removes the tunneling protocol.

To implement this logical switching element within the managed physical switching elements 1015-1040, a controller cluster 1050 connects to the managed switching elements 1015-1040, and generates and passes flow entries (in the form of forwarding tables) to the switching elements. In this figure, as well as others within this document, traffic data paths (i.e., for transporting network data packets between end machines) are shown as solid lines, while control data paths (i.e., for managing the forwarding tables of switching elements) are shown as dashed lines.

As shown, the controller cluster 1050 connects to each of the switching elements 1015-1035. In this figure, the controller cluster 1050 is illustrated as located outside of either of the data centers (e.g., at a third data center). However, in some embodiments, the cluster might be located at one of the data centers or distributed across both of the data centers 1005 and 1010. For instance, the controller cluster 1050 might consist of several controller instances, some of which are located at the first data center 1005 and some of which are located at the second data center 1010. These controller instances each manage one or more of the managed switching elements (i.e., transmit flow entries that define forwarding tables to the managed switching elements). In addition, the controller instances communicate with each other in order to share information (e.g., about the location of physical elements within the network as well as the generated logical datapath sets for implementing a logical switching element).

2. Separate Controller Clusters

The solution for interconnecting data centers illustrated in FIG. 10 (using a single logical switching element to connect all of the machines) requires that the connection between the data centers be completely reliable. Even if the controller cluster includes instances at both data centers, these controller instances require the ability to communicate with each other in order to propagate any changes to the physical structure of the network as well as any changes to the forwarding rules. In some cases, a user enters input to define forwarding rules into a controller instance at one of the locations, and this information must be propagated to the controller instances at the other location. However, if connectivity to one of the data centers is lost, then this could potentially cause failures even for traffic internal to one of the data centers, as the network controllers would be unable to provide updates to the switching elements as the network changes (e.g., as VMs are migrated to different locations).

In addition, the users of the various machines at the data centers might not be the actual owners of the machines. For example, in many situations, the data center is owned and operated by a hosting service, and numerous different customers share the use of the machines provided by the hosting services. In order to enable a customer to provision its network (e.g., to set forwarding rules), the provider may expose a logical datapath set for the customer. The customer may have its own set of machines (e.g., at its own premises) and/or machines at other hosting services, with each such site having a separate logical datapath set for the customer to operate. Similarly, a network carrier between the hosting services and the customer might expose its connectivity as a logical datapath abstraction as well. By doing so, the network carrier provides a well-defined API for its customers to determine how their packets should be handled, without the network carrier's personnel playing any role in these operations.

Furthermore, even within a single data center, a customer might need to separate their machines into separate logical switching elements. For instance, the customer might want separate logical switching elements for different departments, or might simply be operating so many machines that it becomes infeasible or impossible to do so with a single logical switching element. This limit may come about based on constraints of the controller or due to constraints of the logical datapath service model.

Accordingly, some embodiments define multiple separate logical switching elements implemented by separate logical datapath sets, then interconnect these separate logical datapath sets. This subsection 2 describes a decentralized solution in which the interconnection of the separate logical datapath sets is established manually. Subsection 3 describes a more centralized solution that uses multiple levels of controller clusters to implement multiple levels of logical datapath sets.

Figure 11:
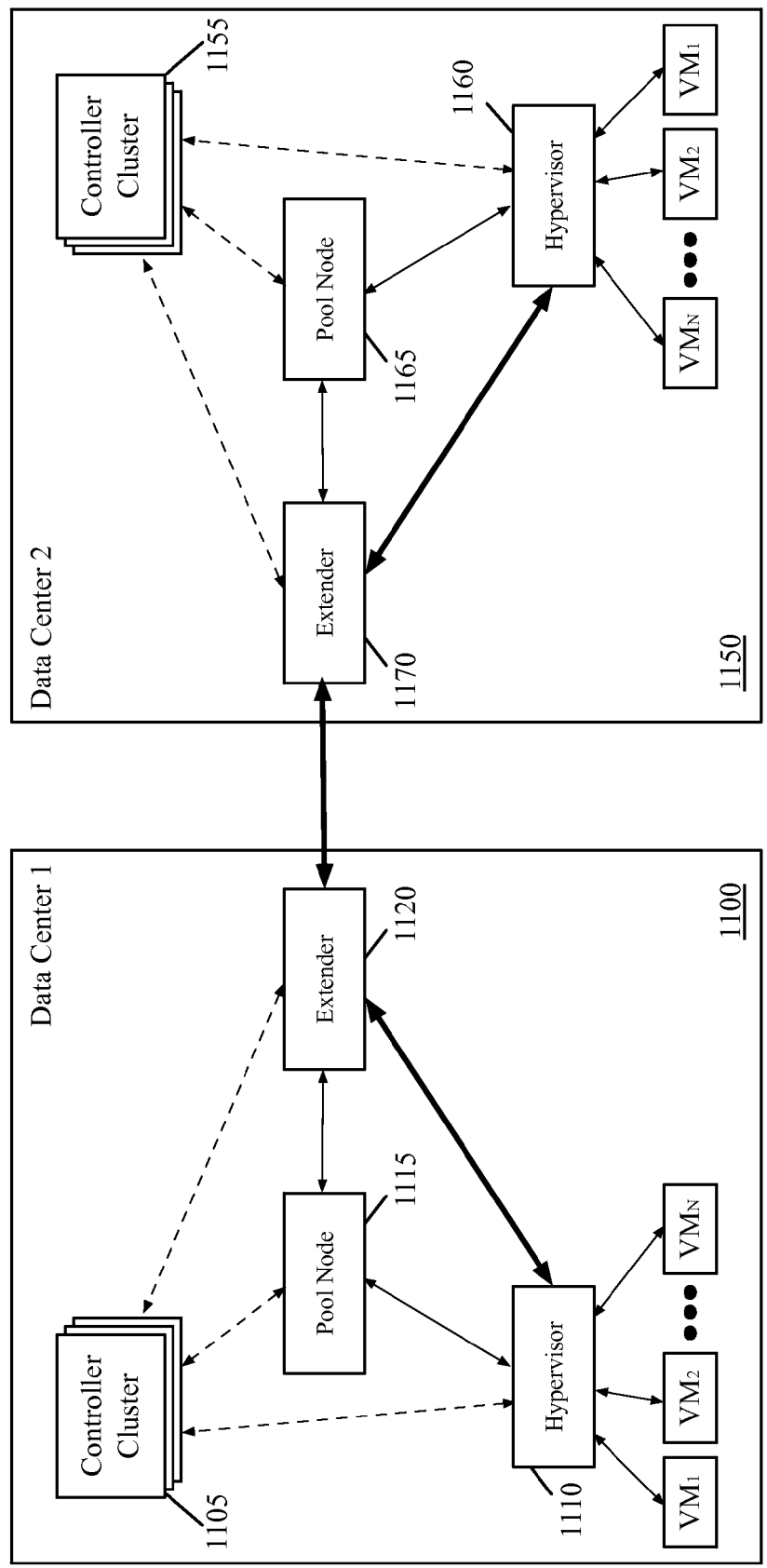
FIG. 11 illustrates two data centers with separate controller clusters that each manage the managed switches within their respective data centers.

FIG. 11 illustrates two data centers 1100 and 1150 with separate controller clusters that each manage the managed switching elements within their respective data centers. Within the first data center 1100, a controller cluster 1105 manages a hypervisor 1110, a pool node 1115, and an extender 1120. Similarly, within the data center 1150, a controller cluster 1155 manages a hypervisor 1160, a pool node 1165, and an extender 1170. In the setup described above (with a single controller cluster for controlling the network), some embodiments would require packets being sent from a VM in data center 1100 to a VM in data center 1150 to travel through the hypervisor 1110, the pool node 1115, and the extender 1120. The first VM sends a packet to the hypervisor 1110 (the edge switching element that connects to this VM), which would not recognize the destination (in the other data center 1150) in its forwarding tables. Thus, the hypervisor 1110 forwards the packet by default to the pool node 1115, which recognizes the destination address as belonging to a machine located in the other data center and therefore forwards the packet to the extender 1120, in order for the extender 1120 to send the packet through a tunnel to the extender 1170 at the second data center 1150.

As shown in FIG. 11, some embodiments modify this setup in order to separate the logical datapath set into separate logical datapath sets for each data center while still allowing the machines at one data center to transmit packets to the machines at the other data center (and vice versa). In such embodiments, each data center has a separate controller cluster to manage the switching elements at the data center. The controller cluster 1105, for example, manages the hypervisor 1110, pool node 1115, and extender 1120, while the controller cluster 1155 manages the hypervisor 1160, pool node 1165, and extender 1170. Within the first data center 1100, there could be numerous hypervisors and pool nodes connecting numerous end machines on a single logical datapath set (or several different sets of machines on different users' logical datapath sets).

In order for the machines at the first data center to communicate with machines at a second data center, some embodiments program the controller clusters with a second level logical datapath set that includes machines from both data centers. For example, if a first logical datapath set includes $VM_A$ and $VM_B$ in a first data center, and a second logical datapath set includes $VM_C$ and $VM_D$ in a second data center, then a third logical datapath set will include all four of $VM_A$, $VM_B$, $VM_C$, and $VM_D$ in some embodiments. This third logical datapath set is sent to the controller clusters at each of the data centers, and defines a logical switching element that connects all of the machines from the first and second logical datapath sets.

A tunnel is still created between the extenders at the two sites, although the extenders can function much like pool nodes would within a site, by enabling the transmission of packets from a machine in one area of the logical network to a machine in another area. In addition, as shown in bold in FIG. 11, some embodiments enable a direct connection from the hypervisor 1110 to the extender 1120, bypassing the pool node 1115. The hypervisor 1110 (edge switching element) recognizes that a packet is destined for a machine in the other data center, and automatically forwards the packet to the extender 1120 rather than the pool node 1115. A tunnel between the extenders 1120 and 1170 still enables the communication between the two sites, and the details of packet processing and encapsulation will be described in sections below. Furthermore, the hypervisor 1110 will still forward packets destined for other machines within the data center 1100 (that do not have entries within the forwarding tables of the edge switching element hypervisor 1110) to the pool node 1115.

3. Multiple Levels of Controller Clusters

While FIG. 11 illustrates an architecture with separate controller clusters at different data centers, some embodiments additionally involve a second-level controller cluster that generates flow entries to connect the separate data centers. Specifically, some embodiments define separate logical switching elements implemented by separate logical datapath sets at each data center, and interconnect these separate logical datapath sets with a single (or more than one) second-level logical datapath set that spans multiple data centers. In some cases, the packet processing behavior of the setup shown in FIG. 11 is the same or similar to the packet processing behavior of the multi-level implementation described in the subsections below.

Figure 12:
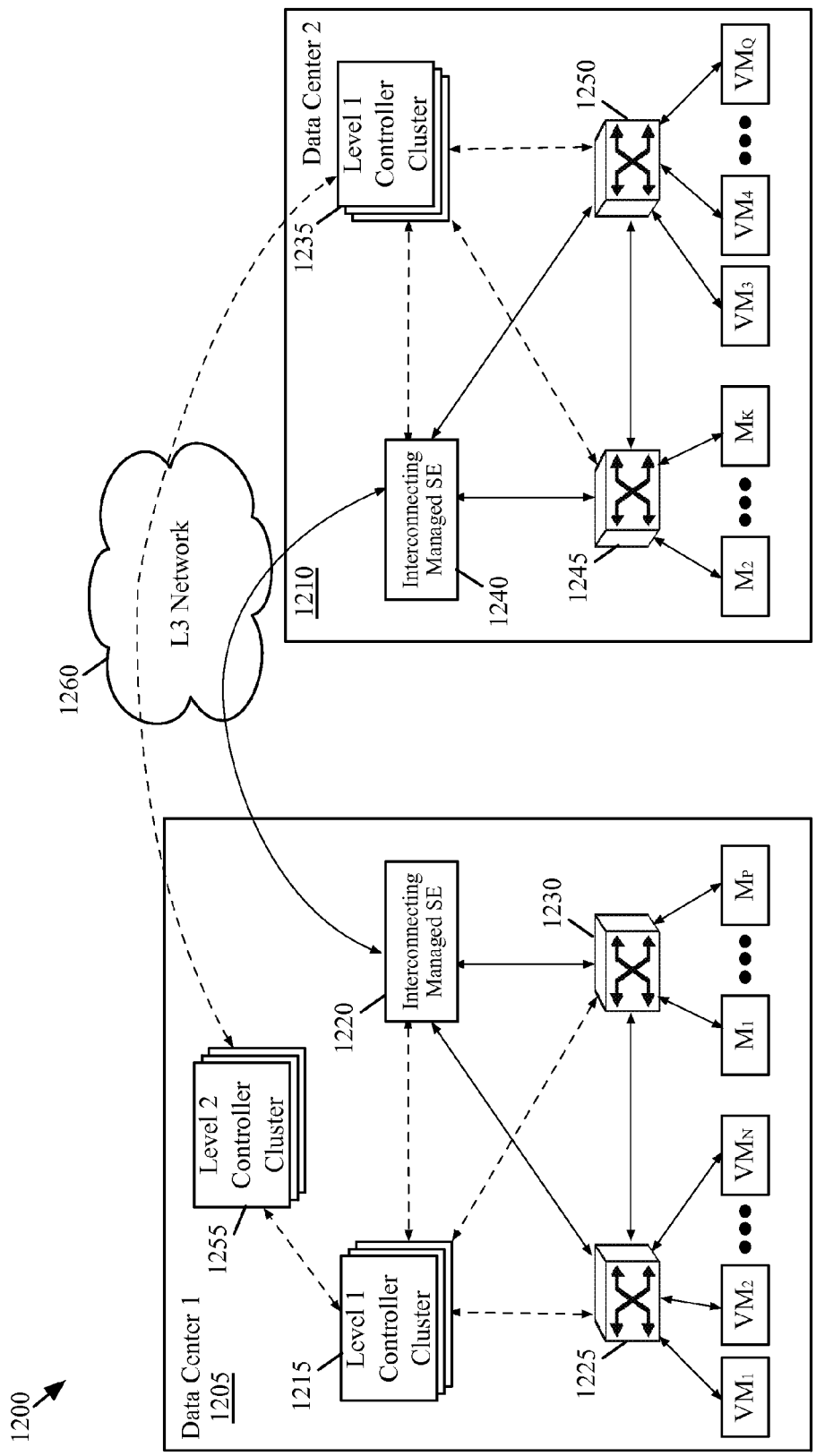
FIG. 12 illustrates a managed network with a multi-level (or "federated") implementation.

FIG. 12 illustrates a managed network 1200 with such a multi-level (or "federated") implementation. As shown, the managed network 1200 also includes a first data center 1205 and a second data center 1210, with an unmanaged network 1260 (in this case, an L3 network) connecting the two data centers. As shown, the first data center includes a first level controller cluster 1215, an interconnecting managed switching element 1220, edge switching elements 1225 and 1230, and several end machines (both virtual and physical machines). While many of the managed networks in the following sections include both virtual and physical machines, one of ordinary skill in the art will recognize that in some embodiments all of the machines at a data center may be virtual machines, or may all be physical machines. The second data center 1210 also includes a first level controller cluster 1235, an interconnecting managed switching element 1240, edge switching elements 1245 and 1250, and several end machines.

The interconnecting managed switching elements 1220 and 1240 may be different types of switching elements in different embodiments (e.g., pool nodes, extenders). For instance, they might both be pool nodes, both be extenders, or a combination of the two types of switching elements. These interconnecting managed switching elements create a tunnel through the L3 network in order to send packets between the two networks when necessary. The packet processing performed by these switching elements in order to handle this interconnection between the data centers will be described below.

In addition to the first level controller clusters 1215 and 1235, the first data center 1205 also includes a second level controller cluster 1255. As discussed above, each network controller instance (or, each logical controller instance in the case that the cluster is separated into logical and physical controllers) in the first level controller cluster includes a control application and a virtualization application. The first level controller cluster generates forwarding table entries (also referred to as "flow entries", "data flows", or "flows") to populate the physical control plane of the managed switching elements.

In some embodiments, the second level controller cluster has the same structure as the first level controller clusters, with a control application and virtualization application that implement a logical switching element by generating flow entries. As with the first level controller clusters, the second level controller cluster may be a single network controller instance or may consist of multiple controller instances that communicate with each other in order to update their knowledge of the network and to disseminate information regarding the generated flow entries.

However, rather than connecting directly to the managed switching elements, the second level controller cluster pushes its flow entries to one or more first level controller clusters in order for those first level controller clusters to implement these second-level flows within the first-level flow entries that they send to the managed switching elements. Thus, the first level controller cluster 1215 need not include any of the machines at the data center 1210 on its logical switching element, as the interconnections between machines at the data center 1205 and machines at the data center 1210 will be implemented by the second level logical switching element. As will be described in further detail in Section B below, in some embodiments the virtualization application of the second-level controller cluster converts flow entries from the second level logical forwarding plane directly to the first level logical forwarding plane. Because all of the forwarding data (e.g., port bindings, etc.) is received at the second level controller cluster, there is no control plane with regard to the forwarding decisions. As such, the control application at the first level controllers is not involved in generating flow entries for packet forwarding. However, in some embodiments, the first level logical control plane may be used to enter security or other policies (e.g., for conversion into ACL tables).

In the example of FIG. 12, the second level controller cluster 1255 is located at one of the data centers (specifically, data center 1205). As shown, the second level controller cluster 1255 connects to the first level controller cluster 1215 at data center 1205 in order to send the flow information for the second level logical datapath sets to the first level controller cluster 1215. In addition, the second level controller cluster 1255 connects to the first level controller cluster 1235, through the unmanaged network 1260. In some embodiments, the second level controller cluster actually passes the control data through the tunnel between the two interconnecting managed switching elements 1220 and 1240 that connects the two data centers. However, the dashed line is shown separately here in order to indicate the flow of control data (as compared to network traffic).

Figure 13:
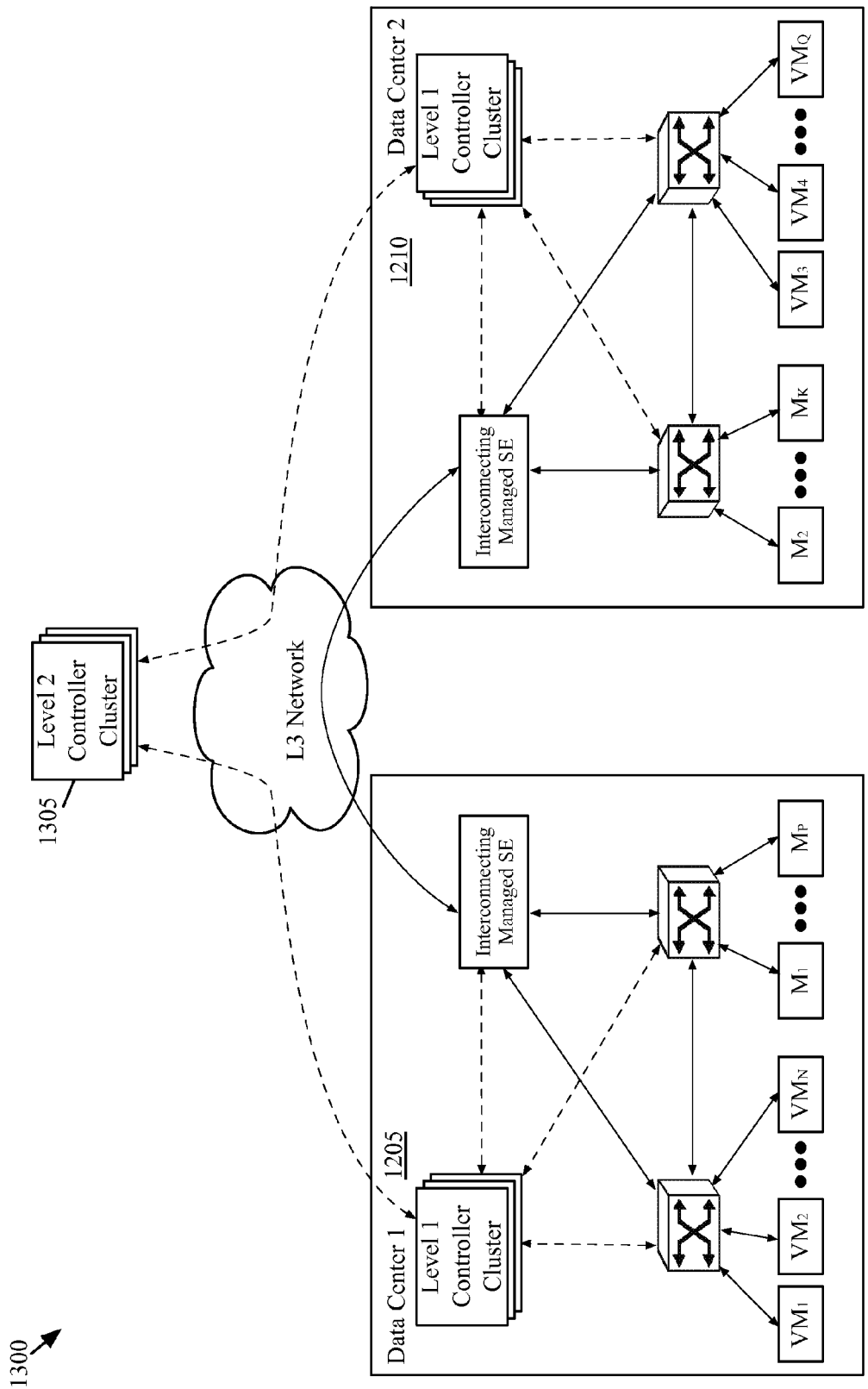
FIG. 13 illustrates an alternate implementation of a managed network with multiple levels of controller clusters.

There is no requirement that the second level controller must be located at one of the data centers, however. FIG. 13 illustrates an alternate implementation of a managed network 1300 with multiple levels of controller clusters. In this case, the second level controller cluster 1305 is located outside of both of the data centers 1205 and 1210. This location might be a tenant's location (i.e., the owner of the machines interconnected by the logical switching elements), or at a third data center. Some embodiments attempt to locate the second level controller at the most well-connected of the possible locations. For instance, if connecting three data centers, then the second level controller might be located at the data center with the best connection (e.g., the most redundant and/or fastest connection) to the other two.

While the ability of the second level controller to connect to the different data centers (or domains) is important, part of the goal of the federated approach is to ensure that the separate domains can operate independently if a domain is cut off, either from the other domains or from the second level controllers. If, for example, the connection between the first data center 1205 and the second data center 1210 were to go down, each of the first level controller clusters could still maintain and update the logical datapath sets for their respective sites, maintaining connectivity within the sites. Similarly, if the second level controller cluster 1305 were cut off, the two first level controller clusters would continue managing their respective data center logical datapath sets.

As such, the second level controller of some embodiments does not need to be aware of the actual physical network topology within a data center. While the second level controller needs to account for which end machines are located in which domain, the controller need not know where the different machines are located within a domain. Thus, physical changes such as VM migration within a data center need not be pushed up to the second level controller, as it will not affect the second level logical switching element. This information will still be gathered by the first level controller, as it may require updating the first level flow entries sent to the different managed switching elements. For instance, if a particular VM moves from a first hypervisor to a second hypervisor, then the first level network controller for the logical network containing the particular VM will need to generate new flow entries for various switching elements (e.g., updating pool nodes, the first and second hypervisors, etc.).

When an end machine is moved from one domain to a different domain connected by the second level logical switching element, then the second level controller cluster may be involved in some embodiments. In this regard, different embodiments may distribute the functionality differently between the first and second level controllers. In a more centralized approach, the second level controller receives updates any time a machine moves between domains, then generates and pushes forwarding table entries. In a more decentralized approach, the second level controller pushes an entry indicating that the first level controllers should use a distributed learning algorithm to handle the move of the end machine from one domain to the other. Such a distributed learning algorithm might be implemented using a standard flooding-based approach, or by relying on a lookup service-based model that does not require any flooding.

The ability of the separate domains to function in isolation, however, does not mean that connectivity between the second level controllers and first level controllers is unimportant. As such, some embodiments interconnect the second level controllers to each site independently with enough redundant paths to provide a desired level of reliability. Some embodiments rely on gossiping to guarantee a reliable system of updates from the second level controller to the different first level controllers at different sites. To implement this gossiping, some embodiments utilize a distributed protocol specialized for the delivery of flow entries.

Irrespective of the approach used to disseminate updates to the flow entries, in some embodiments the second level flow entries may not make it to switching elements at the different first level domains at exactly the same time (e.g., because of different travel times from the second level controller to the different first level controllers, or different processing times at the different first level controllers). Thus, some embodiments instruct the first level controllers to include versioning information in the packet processing pipeline, so that the managed switching elements add this versioning information to each packet received from an end machine. Thus, a single packet will use the same network state version across multiple domains. In this manner, the second level controller can push the state in stages. Only after preparing a new network state version far enough, the system enables the use of the new version at the network edge, and only after updating all of the edges to the new version will the earlier version be removed.

Figure 14:
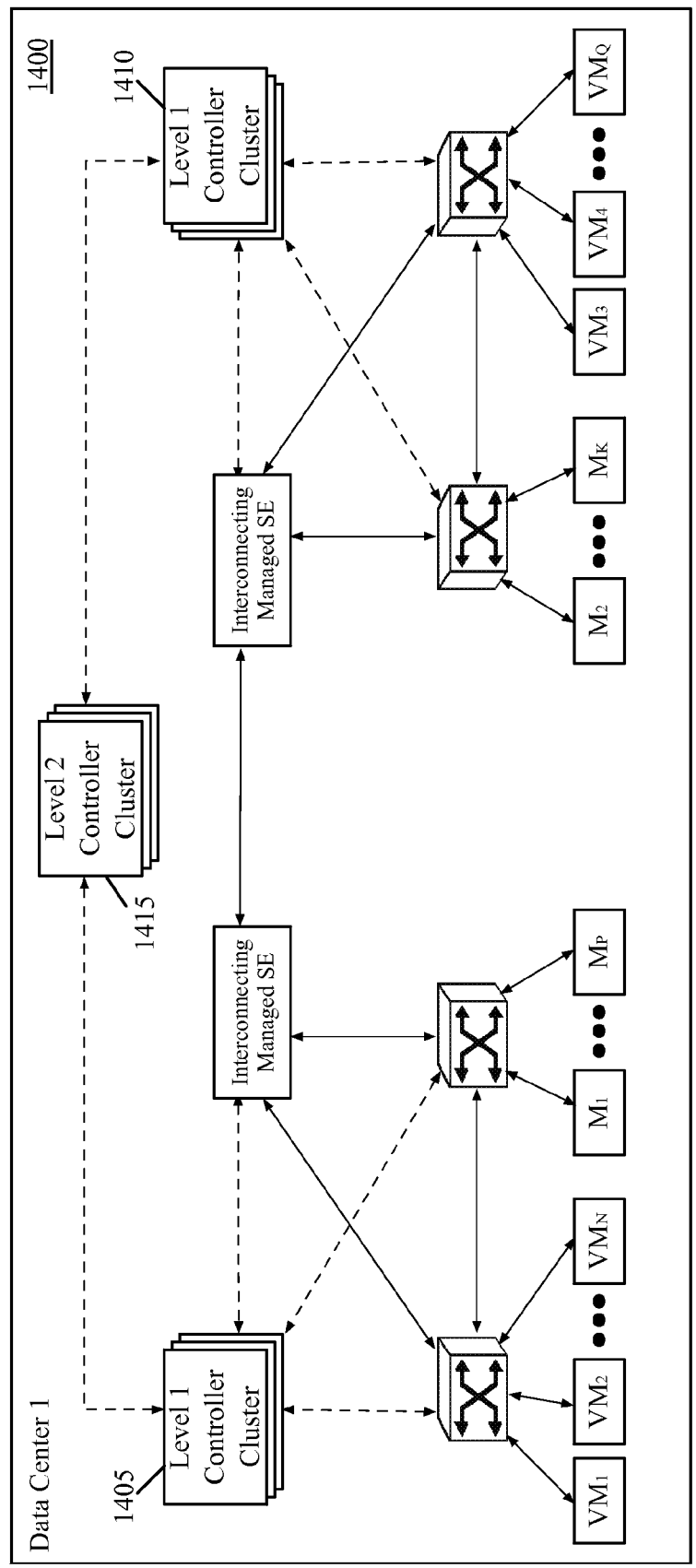
FIG. 14 illustrates a data center that includes a first domain managed by a first level controller cluster and a second domain managed by a different first level controller cluster.

In addition to connecting machines on different first level logical switching elements at different data centers (or other locations), some embodiments use a federated approach within a single data center. FIG. 14 illustrates such a data center 1400 that includes a first domain managed by a first level controller cluster 1405 and a second domain managed by a different first level controller cluster 1410. In order to interconnect these two domains, the data center also includes a second level controller cluster 1415 that implements a logical switching element over both of the domains, and pushes down the second level flows to the two first level controller clusters 1405 and 1410. In this case, the interconnecting managed switching elements on the edges of the domains are more likely to be pool nodes, as there is no external unmanaged network through which to connect (although, as is the case in all of the figures, there may be unmanaged switching elements that are not shown in between the managed switching elements).

Some embodiments use this federated approach within a single data center for different reasons. For instance, the size of a single first level logical datapath set may be constrained, by either the underlying controller implementation or by the constraints of the logical datapath service model. While the second level logical switching element may have the same number of logical ports as would a first level logical switching element connecting all the machines on a logical datapath set, the flow entries for the second level logical datapath set will be simpler because they only need to handle traffic going from one of the first level domains to the other first level domain.

B. Generation of Flow Entries

As mentioned above, in the federated system, flow entries are generated initially by the second level controller, then pushed down to the appropriate first level controller(s), which generate flow entries to push down to the managed switching elements. Within this and later sections, "1L" may be used to refer to the first level logical datapath sets and network controllers. Similarly, "2L" may be used to refer to the second level logical datapath sets and network controllers. These terms are intended to be different from "L1" and "L2" that often refer to the Open Systems Interconnect ("OSI") physical and data link layers.

Section I above described the use of a network controller (or controller cluster) in a single level logical network to generate a logical datapath set and create flows that are pushed down to the managed switching elements. The network controller of some embodiments includes a control application for converting logical control plane data to logical forwarding plane data, and a virtualization application for converting logical forwarding plane data to physical control plane data. In some embodiments, each of these sets of data (logical control plane, logical forwarding plane, physical control plane) are stored in the network controller as nLog tables, and the control and virtualization applications perform nLog table mapping operations to convert from one data plane to the next using an nLog rules engine. In some embodiments, in fact, the control application and virtualization application use the same rules engine to perform their table mappings. The physical control plane data is then pushed to the managed switching elements.

Figure 15:
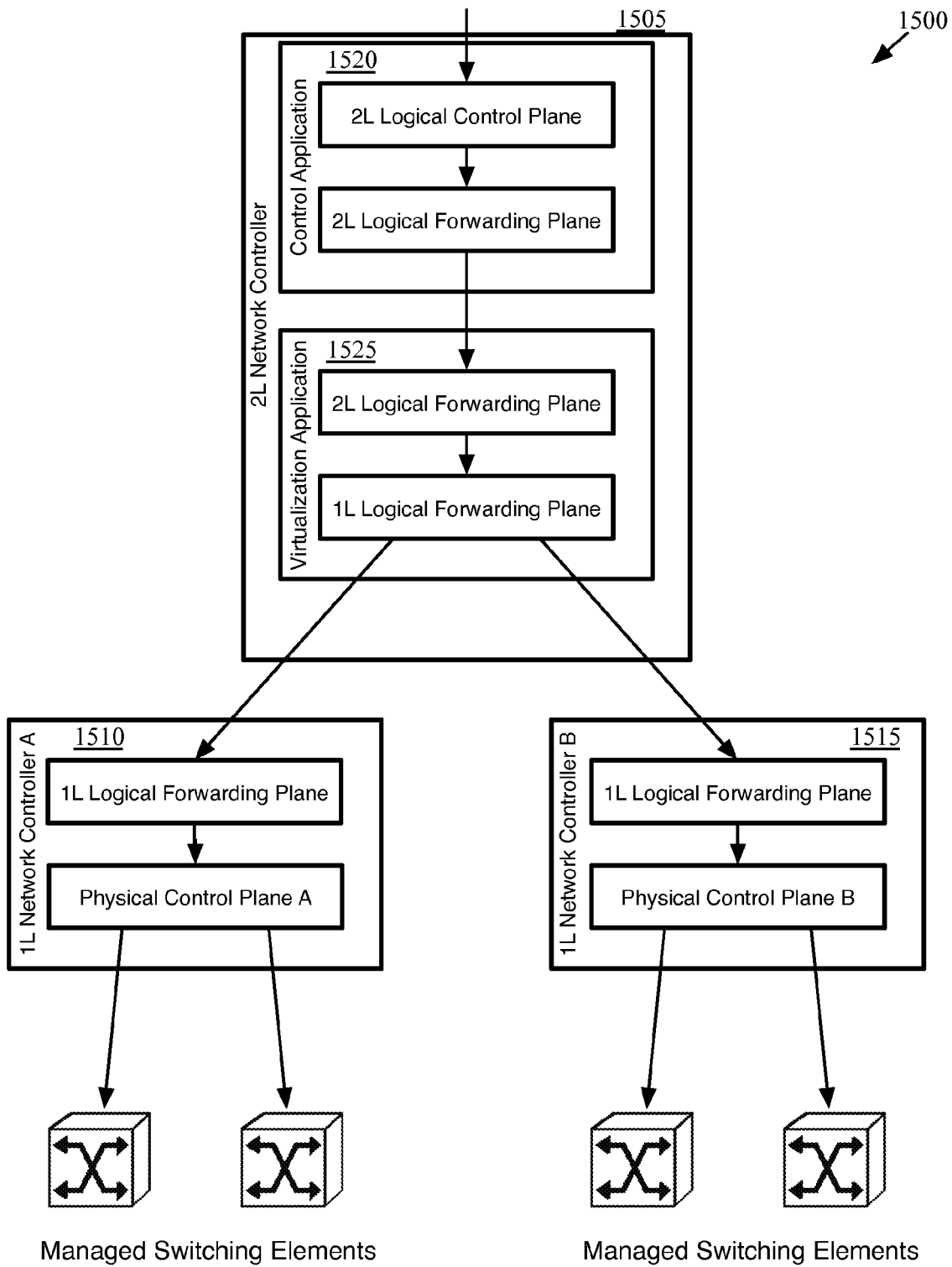
FIG. 15 conceptually illustrates a control data pipeline for a hierarchically-arranged set of network controllers at two levels that manage a federated network.

For a network with multiple levels of controller clusters, in some embodiments the controller clusters at each level of the hierarchy perform additional conversions of the flows (e.g., using nLog table mapping engines). FIG. 15 conceptually illustrates a control data pipeline 1500 for a hierarchically-arranged set of network controllers at two levels that manage a federated network. Specifically, FIG. 15 conceptually illustrates a 2L network controller 1505 and two separate 1L network controllers 1510 and 1515 for two different 1L domains.

As shown, the 2L network controller 1505 includes a control application 1520 and a virtualization application 1525. The control application 1520 converts 2L logical control plane data into 2L logical forwarding plane data. In some embodiments, the control application 1520 exposes constructs with which the control application itself or users of the application (i.e., the owners of the logical datapath sets) define the logical datapath set within the logical control plane. The logical control plane data of some embodiments includes logical access control list ("ACL") data that may be specified by the user (e.g., to define security policy). In addition, the 2L logical control plane data may include logical forwarding records generated by the control application in response to changes in the network detected by the managed switching elements and pushed up through the 1L network controllers. At least some of the 2L logical control data of some embodiments may be specified without consideration for a current arrangement of managed switching elements and how the logical datapath set will actually be converted into data for the different switching elements.

The control application 1520 receives this 2L logical control plane data as input, and applies its table mapping rules to generate 2L logical forwarding plane data as output. The 2L logical forwarding plane data includes lookup entries that define the logical datapath set based on the 2L logical control plane data. In some embodiments, for example, the control plane might define that a particular MAC address is located at a particular logical port. This 2L control plane data, however, does not provide an actual lookup entry. The 2L logical forwarding plane data generated by the control application defines that if a packet destination matches the particular MAC address, then the packet should be forwarded to the particular logical port. This 2L control plane data, however, does not provide any context for the packet. This essentially turns a piece of data into a lookup entry.

The control application 1520 pushes the 2L logical forwarding plane data to the virtualization application 1525. As shown, the virtualization application 1525 takes the 2L logical forwarding plane data as input, and outputs 1L logical forwarding plane data. In some embodiments, the 1L logical forwarding plane data adds a match of the 2L datapath to the lookups. For instance, in the example above, the 1L logical forwarding plane lookup determines that if a packet has matched the particular 2L datapath (e.g., via ingress port matching) and matches the particular destination MAC address, then the packet should be forwarded to the particular logical port.

The virtualization application pushes the logical forwarding plane data to the two 1L network controllers 1510 and 1515. These 1L network controllers, in some embodiments, receive the logical forwarding plane data customized to their particular logical domain. That is, in some embodiments, certain entries are only pushed to the network controllers that need the entry (though this would not be the case for the attachment of a new VM for a port, which would be sent to all 1L domains). At each of the 1L controllers, a virtualization application takes the logical forwarding plane data for the domain and converts the logical forwarding plane data into physical control plane data for the managed switching elements in the domain. In the above-described example for a newly attached machine, the physical control plane lookup determines that if a packet has matched the particular 1L datapath and has matched the particular 2L datapath and matches the particular destination MAC address, then the packet should be forwarded to the particular logical port. In this case, two separate physical control plane lookups are generated by the two different 1L network controllers. For the first network controller 1510, the lookup requires a match to the particular 1L datapath defined by that network controller for its 1L domain. Similarly, a different lookup is generated for the network controller 1515 that requires a match to its particular 1L datapath.

As with the control and virtualization applications at the 2L controller 1505, the virtualization application of the 1L controller of some embodiments uses an nLog table mapping engine to perform this conversion. The physical control plane data of some embodiments is data readable by the managed switching elements, which the managed switching elements convert into physical forwarding plane lookups. In some embodiments, the 1L network controllers include push the physical control plane data to the appropriate managed switching elements within the network.

In this figure, no logical control plane is illustrated for the 1L network controllers. Because the actual forwarding decisions are made at the 2L level, no 1L logical control plane data is required or used in some embodiments. However, in some embodiments administrators of the 1L domain can use the 1L network controller to configure logical control plane data for their particular domain. For instance, additional security policy may be set at the 1L logical control plane in some embodiments.

The above description shows a simple case in which a single 2L logical datapath set connects two 1L logical datapath sets. As will be described in subsequent sections, in some embodiments additional 1L datapaths may be connected by a 2L datapath, and additional levels of logical datapath sets may be used to provide additional discretization of the network. For a three-level network, the control data pipeline would include only a 3L logical control plane, with the lookups converted to 3L, 2L, and 1L logical forwarding plane data. More generally, for any number of levels, in some embodiments there is only one logical control plane, at the topmost level, with lookups converted to logical forwarding plane data at each subsequent level of network controller.

This example illustrates the 1L network controller converting data directly from the logical forwarding plane to the physical control plane, which includes data customized to the different managed switching elements. However, for some embodiments, this represents a simplification. In such embodiments, the 1L network controller virtualization application converts the logical data path set from the 1L logical forwarding plane to universal physical control plane (UPCP) data that is generic for any managed switching element that implements the logical datapath set within the 1L domain. In some embodiments, this virtualization application is part of a controller instance that is a master controller for the particular logical datapath set within the 1L domain (also referred to as the logical controller).

In some embodiments, the UPCP data is then converted to customized physical control plane (CPCP) data for each particular managed switching element by a controller instance that is a master physical controller instance for the particular managed switching element, or by a chassis controller for the particular managed switching element. When the chassis controller generates the CPCP data, the chassis controller obtains the UPCP data from the virtualization module of the logical controller through the physical controller.

Irrespective of whether the physical controller or chassis controller generate the CPCP data, the CPCP data for a particular managed switching element needs to be propagated to the managed switching element. In some embodiments, the CPCP data is propagated through a network information base (NIB) data structure, which in some embodiments is an object-oriented data structure. Several examples of using the NIB data structure are described in U.S. patent application Ser. Nos. 13/177,529 and 13/177,533, which are incorporated by reference above. As described in these applications, the NIB data structure is also used in some embodiments to may serve as a communication medium between different controller instances, and to store data regarding the logical datapath sets (e.g., logical switching elements) and/or the managed switching elements that implement these logical datapath sets.

However, other embodiments do not use the NIB data structure to propagate CPCP data from the physical controllers or chassis controllers to the managed switching elements, to communicate between controller instances, and to store data regarding the logical datapath sets and/or managed switching elements. For instance, in some embodiments, the physical controllers and/or chassis controllers communicate with the managed switching elements through OpenFlow entries and updates over the configuration protocol. Also, in some embodiments, the controller instances use one or more direct communication channels (e.g., RPC calls) to exchange data. In addition, in some embodiments, the controller instances (e.g., the control and virtualization modules of these instance) express the logical and/or physical data in terms of records that are written into the relational database data structure. In some embodiments, this relational database data structure are part of the input and output tables of a table mapping engine (called nLog) that is used to implement one or more modules of the controller instances.

Figure 16:
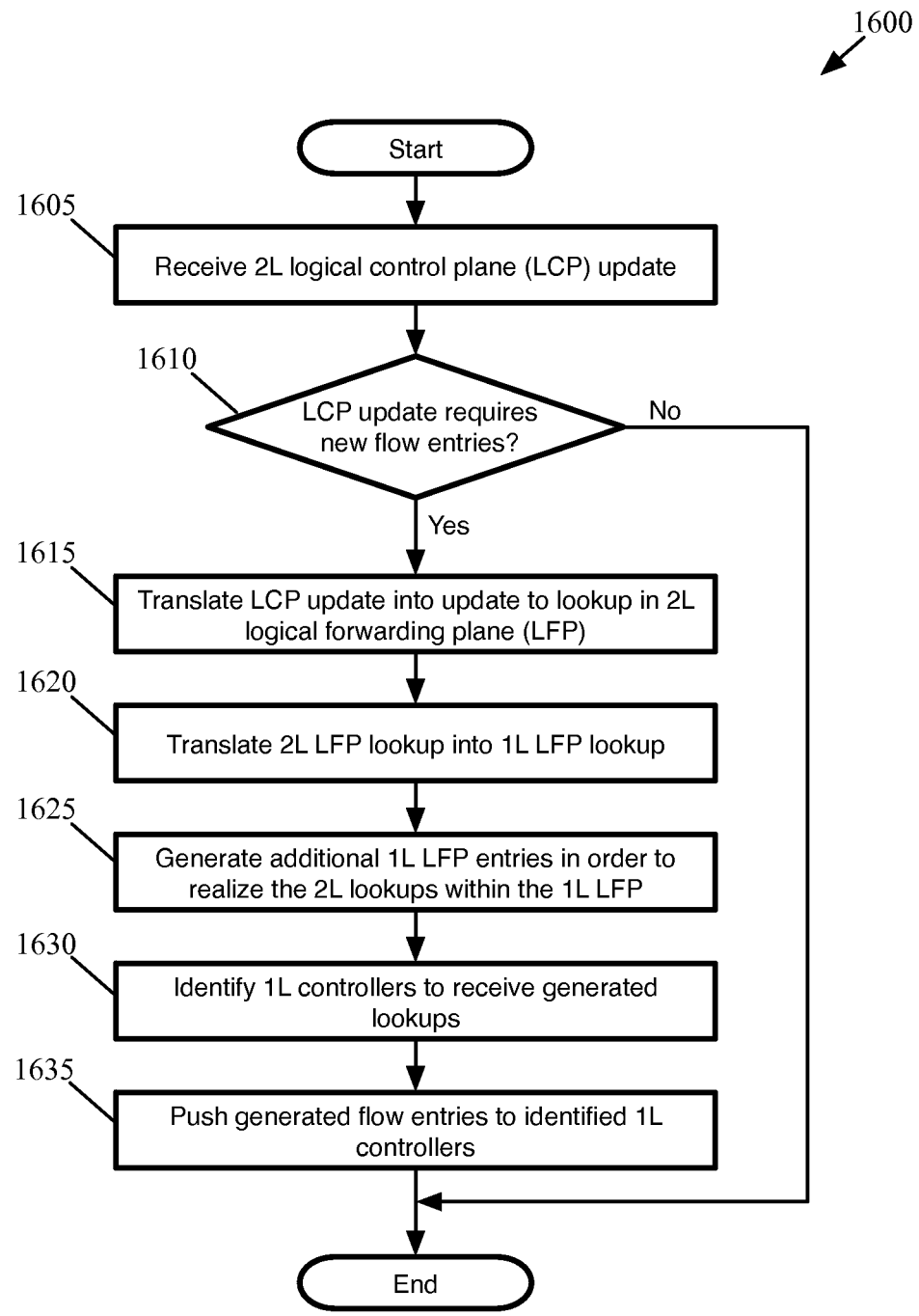
FIG. 16 conceptually illustrates a process performed by a second level network controller of some embodiments to generate flow entries for an event detected at a logical control plane.

For a two-level network (e.g., that shown in FIG. 15), FIG. 16 conceptually illustrates a process 1600 performed by the second level network controller of some embodiments to generate flow entries for an event detected at the logical control plane. As shown, the process 1600 begins by receiving (at 1605) an update to the 2L logical control plane. Such an update may be a user entering a particular ACL policy (e.g., enabling port security or machine isolation for a particular port, requiring a particular QoS for a particular machine at a particular port, etc.). In addition, updates may be received at the control plane after being pushed upwards from the managed switching elements. When a new machine is attached to a particular managed switching element, this network information is pushed up to the 1L network controller that manages the particular switching element, then from the 1L controller to the 2L controller. In some embodiments, the user will have configured the logical ports (of the first and second logical switching elements) to which the newly detected machine should be bound.

The process then determines (at 1610) whether the update to the 2L logical control plane requires the creation of new flow entries. For instance, if the update simply indicates that the network has not changed, then no new entries will be required, and the process ends. On the other hand, if the update specifies new ACL rules, or indicates the attachment of a new VM, then the 2L network controller will begin generating new flow entries.

Next, the process 1600 translates (at 1615) the 2L logical control plane update into an update to the lookups in the 2L logical forwarding plane. As mentioned above, in some embodiments this translation involves turning a piece of data into a lookup entry. Throughout the process 1600 and the process 1700 (shown in FIG. 17, described below), several examples will be used to illustrate the translation of logical control plane data into physical control plane data. The first example is that given in simple terms above: the attachment of a new machine, having a MAC address A, to a particular logical port X of the 2L logical datapath set. In this case, the logical control plane data states "MAC A is at logical Port X". The control application translates this event into an update to the 2L LDPS lookup table that reads "If destination matches MAC A, forward to Port X".

The second example described here illustrates the generation of ACL table entries. While the conversions related to the hierarchical network are feature agnostic (e.g., the addition of match conditions), examples will be given for the specific example of port security. Thus, at the logical control plane, the user specifies that a particular port should be secured (e.g., Port X)—that is, that network data entering and exiting the logical switching element through the particular port have only certain addresses that the switching element has restricted the port to use. For this example, the user has secured Port X, restricted to MAC address A and IP address B. Other examples of ACL rules that a user could specify include counters (i.e., counting the number of packets coming from a particular source address or to a destination address), machine isolation (i.e., only sending broadcast/multicast packets received from a particular machine to a particular set of machines), QoS enablement (i.e., requiring a particular quality of service for packets sent from or to a particular port), etc.

For the port security, the control plane data simply specifies that Port X should be secure, with MAC A and IP B as the allowed addresses. The logical forwarding plane converts this into an ingress ACL entry and an egress ACL entry. At this point, the entries are similar to those that would be used in a single level logical network. For the ingress ACL, the entry specifies that a packet entering the logical switching element from Port X is allowed if the packet has "A" as the source MAC address and "B" as the source IP address, and dropped if the MAC address or IP address are different. Furthermore, Address Resolution Protocol ("ARP") responses must correspond to the correct address (i.e., the MAC address must be "A" and the IP address must be "B" in the source response, or the packet will be dropped). Logically, the lookup instruction might state "If received from Ingress Port X→Allow, or Drop If ARP MAC not A or IP not B, or Drop If MAC not A or IP not B". This effectively prevents the machine at Port X from using other MAC or IP addresses than those assigned to it. Similarly the egress ACL lookup prevents packets not sent to the correct address from exiting the switching element at Port X, with an instruction of "If sent to Egress Port X→Drop If dest. IP not B". This prevents other IP addresses from being used at Port X; by the nature of the logical forwarding, packets sent to MAC addresses other than A will not be directed to Port X in the first place.

After translating the logical control plane update into a 2L logical forwarding plane lookup(s), the process then translates (at 1620) the 2L logical forwarding plane data into 1L logical forwarding plane lookup entries. As with the 2L logical control plane to 2L forwarding plane translation, in some embodiments the conversion from 2L logical forwarding plane to 1L logical forwarding plane is performed as an nLog table mapping operation (e.g., using the same table mapping engine as for the 2L logical control plane to 2L logical forwarding operation). For both the ACL lookups and the attachment of a new machine, the virtualization application adds a match of the 2L LDPS to the entry. Thus, the first entry now states "If match 2L LDPS and destination matches MAC A, forward to Port X". The ingress ACL entry at the 1L logical forwarding plane reads "If match 2L LDPS and If received from Ingress Port X→Allow, or Drop If ARP MAC not A or IP not B, or Drop If MAC not A or IP not B". Similarly, the egress ACL entry reads "If match 2L LDPS and If sent to Egress Port X→Drop If dest. IP not B".

In addition to translating the 2L logical forwarding lookups to 1L logical forwarding lookups, the process 1600 also generates (at 1625) additional 1L logical forwarding plane entries in order to realize the 2L lookups within the 1L logical forwarding plane. In some embodiments, the virtualization application rules engine creates additional flow entries to handle the operations around the forwarding lookups. These include ingress and egress port integration lookups to handle the ingress context mapping and egress context mapping described below, as well as additional entries to handle the tunnels between different 1L domains (i.e., for packets not originating in the destination domain).

In some embodiments, these lookup entries are generated as soon as a new machine is added at a particular port and the 1L and 2L logical ports are bound to the same machine. Thus, when ACL entries are generated for a particular port, these additional 1L logical forwarding entries are not affected. Continuing to refer to the example of a machine with MAC address A and IP address B at Port X, the virtualization application of some embodiments generates four types of entries: ingress port integration, egress port integration, tunnel sending, and tunnel receiving. The ingress port integration entry matches the 1L port ("Port K") to which the machine is bound to the 2L Port X to which the machine is also bound. Thus, this entry states "If received from 1L ingress Port K→Mark 2L ingress as Port X". In order to generate such an entry, the virtualization application uses input tables that correspond the port bindings between the two levels (based on user-provided information).

The egress port integration entry matches a forwarding decision at the 2L level to a 1L port. Specifically, for the continuing example, the egress port integration entry states "If sent to Port X→Run through egress pipeline then send to Port K". Thus, a packet forwarded to Port X at the 2L level will be first sent to the egress pipeline (at which point the egress ACL rules are applied to the packet), then sent to the 1L Port K. As with the ingress port integration, input tables specifying port bindings are used by the virtualization application to generate such egress port integration entries. In some embodiments, both the ingress and egress port integration lookups are written specifically for the 1L domain that actually contains Port K. Only packets originating from Port K will need to be mapped to Port X, and packets destined for Port X will only need to be mapped to Port K once received at the 1L domain.

In addition to the ingress and egress port integration lookups, some embodiments also generate lookups to handle the receipt and transmission of packets sent through different 1L LDPS than the 1L LDPS containing Port X. The ingress 2L port and the egress 2L port might be in different 1L LDPS, and therefore the packet will have to travel along the tunnels between these 1L domains. Thus, two lookups (at the sending side of the tunnel and the receiving side of the tunnel) are generated for the 1L logical forwarding plane. For any 1L LDPS that does not contain Port X and that connects directly to the 1L LDPS that does contain Port X, the virtualization application generates a tunnel encapsulation lookup entry that states "If sent to Port X→Encapsulate with X's context ID and output to 1L Port that connects to destination 1L LDPS". For the receiving side of the tunnel (i.e., the 1L LDPS that contains Port X), the virtualization application generates a tunnel decapsulation lookup entry that states "If tunneled→Decapsulate to identify 2L port, then Resubmit". The resubmission results in the execution of the egress port integration described above.

In some embodiments, the 1L datapaths are not a full mesh. That is, there may not be a direct connection between each pair of 1L domains within the 2L domain. In some such embodiments, additional lookup entries are generated for sending packets to the appropriate tunnels from 1L domains that do not directly connect to the domain containing Port K. For each such 1L domain, the virtualization application generates a lookup stating that "If sent to Port X→Encapsulate with X's context ID and output to 1L Port that connects to appropriate next 1L LDPS". Correspondingly, for any 1L domain that does not contain Port K but that can receive a packet destined for MAC B over such a tunnel, the virtualization application generates a lookup stating that "If tunneled→Decapsulate to identify 2L port, then Resubmit". The resubmission will then result in the eventual execution of the next tunnel to the next 1L datapath.

To generate the tunneling lookups, the rules engine of the virtualization application uses an input table that defines the interconnections between the different 1L logical datapath sets. Such an input table defines the ports of the 1L LDPS that connect to other 1L LDPS. In addition, some embodiments use tables generated at the 2L control plane that define pathways through the 1L datapaths for packets that originate in a 1L domain that does not directly connect to the destination 1L domain (i.e., whether packets should be forwarded through a first domain or a second domain, that both directly connect to the destination 1L domain). In different embodiments, these pathways may be defined by a user or by an optimization algorithm that combines network data with user-entered traffic policies (e.g., QoS guarantees, traffic classification, etc.).

With all of the 1L logical forwarding plane entries generated for the update, the process 1600 identifies (at 1630) the 1L controllers to receive the generated lookups. As described for some of the different lookup entries above, not all controllers will receive every lookup, as some lookups may not be needed for the managed switching elements in some 1L domains. For example, the tunnel sending lookups will not need to be sent to the 1L domain containing the destination port, and the tunnel receiving lookup will not need to be sent to the 1L domains that will never receive packets sent to the destination port. Depending on the complexity of the network and the defined pathways through the domains, in some cases all domains might be potential recipients. The egress and ingress port integration lookups, as well as certain egress pipeline entries (e.g., the egress ACL for port security) will only be sent to the 1L controller at the 1L domain containing the port being mapped. On the other hand, the forwarding entries and the ingress pipeline entries of some embodiments are sent to all of the 1L domains, as any of these domains might have a machine sending a packet to the machine at Port X.

Finally, the process 1600 pushes (at 1635) the generated flow entries to the identified 1L controllers, then ends. In some embodiments, the 2L controller propagates the generated flow entries to the 1L controller through an object-oriented (NIB) data structure, while other embodiments use direct communication channels (e.g., RPC calls) to exchange the flow entries.

Figure 17:
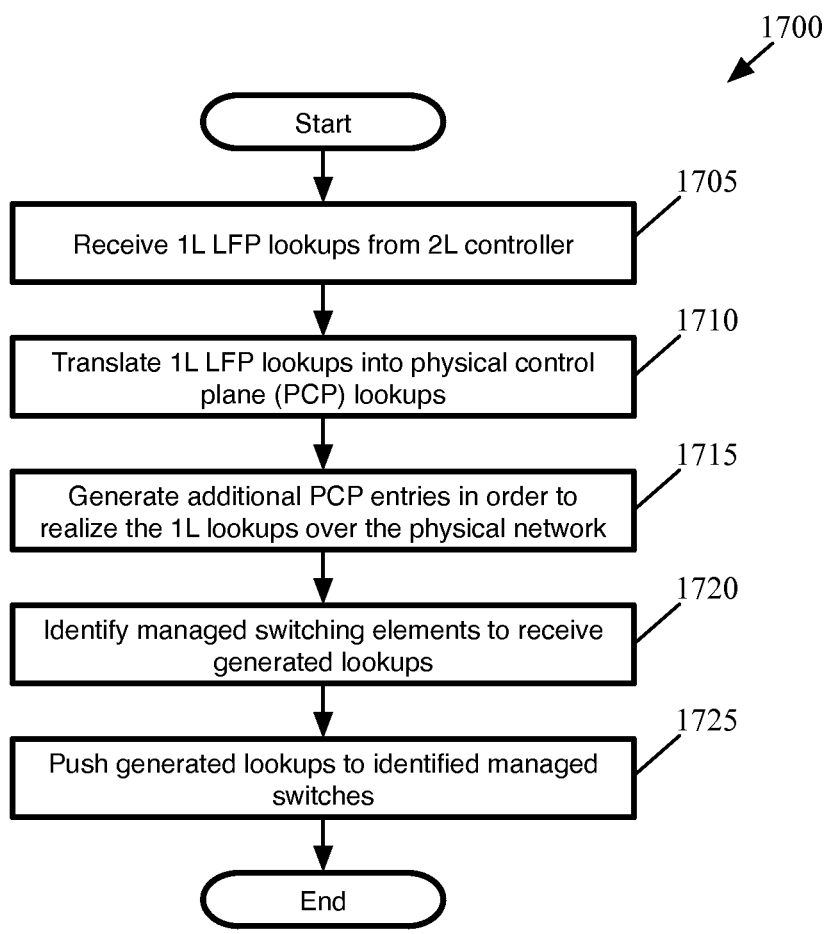
FIG. 17 conceptually illustrates a process of some embodiments that generates physical control plane data from the 1L forwarding plane data received at the 1L controller from the 2L controller.

FIG. 17 conceptually illustrates a process 1700 of some embodiments that generates the physical control plane data from the 1L forwarding plane data received at the 1L controller from the 2L controller. In some embodiments, a virtualization application at the 1L controller performs the process

1700. As shown, the process begins by receiving (at 1705) 1L logical forwarding plane lookup entries from the 2L controller. In some embodiments, the virtualization application receives these lookup entries, published by the 2L controller, by using its subscriber tables. In some embodiments, the subscriber tables specify locations of 2L controllers from which the virtualization application should retrieve flow entries. As described above, the only logical control plane for these flows exists at the 2L logical level. In some embodiments, however, local policies for traffic contained within a particular 1L domain may be set at the control plane of the 1L logical controller.

Next, the process translates (at 1710) the 1L logical forwarding plane lookups into physical control plane lookups. As with the translation operations performed by process 1600, in some embodiments the conversion from 1L logical forwarding plane to physical control plane is performed as an nLog table mapping operation. The rules engine used by the 1L controller is the same rules engine (with different input tables) as that used by the 2L controller in some embodiments. For both the ACL lookups and the forwarding entry for the new machine attached to the network, the virtualization application adds a match of the 1L LDPS to the entry. Thus, the entry for forwarding packets to Port X now states "If match 1L LDPS and If match 2L LDPS and If destination matches MAC A→forward to Port X". The ingress ACL entry at the physical control plane reads "If match 1L LDPS and If match 2L LDPS and If received from Ingress Port X→Allow, or Drop If ARP MAC not A or IP not B, or Drop If MAC not A or IP not B". Similarly, the egress ACL entry reads "If match 1L LDPS and If match 2L LDPS and If sent to Egress Port X→Drop If dest. IP not B". This egress ACL entry, in some embodiments, is only generated by the 1L network controller at the domain containing Port X, as the other 1L network controllers do not receive the entry at their logical forwarding planes.

In addition to translating the 1L logical forwarding plane lookups to physical control plane lookups, the process 1700 also generates (at 1715) additional physical control plane lookup entries to realize the 1L logical forwarding plane over the physical network. In some embodiments, the 1L virtualization application rules engine creates additional flow entries to handle the operations around the forwarding lookups. These lookups are the analogues to the entries generated by the 2L virtualization application for realizing the 2L logical forwarding plane on top of the 1L logical forwarding plane. As with the entries described earlier, the lookups generated at 1715 include ingress and egress port integration entries to handle ingress context mapping and egress context mapping, as well as additional entries to handle the tunnels between different managed switching elements.

In some embodiments, these lookup entries are generated as soon as a new machine is added at a particular physical port (e.g., a virtual interface) and the 1L and 2L logical ports are bound to that physical port. When ACL entries are generated for a particular port, these additional physical control plane entries are not affected. For the sake of the examples, the physical port to which the machine located at 1L logical Port K and 2L logical Port X is connected is Port J in the ongoing examples. Continuing with this example, the ingress port integration entry for this level matches the physical Port J to which the machine is connected to the 1L port K to which the machine is bound. Thus, this entry states "If received from physical ingress Port J→Mark 1L ingress as Port K". In order to generate such an entry, the virtualization application uses input tables that correspond the port bindings between the physical and logical levels (based on user-provided information).

The egress port integration entry matches a forwarding decision, as mapped to the 1L logical level, to a physical port. Specifically, for the continuing example, the egress port integration entry becomes "If sent to Port K→Run through egress pipeline then send to Port J". Thus, a packet forwarded to Port K at the 1L level will be first sent to the egress pipeline and then sent to the physical Port J. As with the ingress port integration, input tables specifying port bindings are used by the 1L virtualization application to generate such egress port integration entries. In some embodiments, both the ingress and egress port integration lookups are written specifically for the managed switching element (e.g., a hypervisor) that actually contains Port J. Only packets originating at this port will need to be mapped to Port K, and packets destined for Port K will only need to be mapped to physical Port J once received at the managed switching element.

In addition to the ingress and egress port integration lookups, some embodiments also generate lookups to handle the receipt and transmission of packets through different managed switching elements within the 1L domain containing Port K. Packets might originate at other managed switching elements within the domain, or originate in a different 1L domain and enter via an interconnecting switching element. In this case, the packet will have to travel along at least one tunnel between two managed switching elements within the 1L domain in order to reach the switching element containing Port J. Thus, two lookups (at the sending and receiving sides of the tunnel) are generated for the physical control plane. For any managed switching element that does not contain Port J and that connects directly to the switching element that does contain Port J (the interconnecting managed switching element for the 1L domain is often such a switching element), the virtualization application generates a tunnel encapsulation lookup entry that states "If sent to Port K→Encapsulate with K's context ID and output to physical port via tunnel that connects to destination switch". For the receiving side of the tunnel (i.e., at the managed switching element that contains Port J), the virtualization application generates a tunnel decapsulation lookup entry that states "If tunneled→Decapsulate to identify 1L port, then Resubmit". The resubmission results in the execution of the egress port integration described above.

In some embodiments, the managed switching elements may not be a full mesh. Packets incoming from other 1L domains are generally sent directly from the interconnecting managed switching element to the destination managed switching element in some embodiments. On the other hand, for networks with pool nodes, the path from a first managed edge switching element within the 1L domain passes through one or more pool nodes in order to reach a second managed edge switching element (to which the destination machine connects) in some cases. In some such embodiments, additional lookup entries are generated for sending packets to the appropriate tunnels from managed switching elements that do not directly connect to the destination managed switching element containing Port J. For each such switching element, the virtualization application generates a lookup stating that "If sent to Port K→Encapsulate with K's context ID and output to physical port via tunnel that connects to appropriate next managed switch". Correspondingly, for any managed switching element that does not contain Port J but can receive a packet destined for MAC B over such a tunnel, the virtualization application generates a lookup stating that "If tunneled→Decapsulate to identify 1L port, then Resubmit".

In this case, the resubmission results in the eventual execution of the next tunnel to the next managed switching element.

To generate the tunneling lookups, the rules engine of the virtualization application uses an input table that lists the physical ports connected to each managed switching element, as well as an input table defining the connections between the different managed switching elements (i.e., indicating through which additional switching elements a packet will have to travel in order to reach a particular destination switching element from a particular originating switching element). In addition, to configure the tunnels, some embodiments use an input table that identifies which types of tunnels are allowed for particular managed switching elements (e.g., hypervisors, pool nodes, extenders, etc.). In order to connect two managed switching elements, the rules engine of some embodiments selects a shared tunnel type.

With all of the physical control plane entries generated for the update received at the logical forwarding plane, the process 1700 identifies (at 1720) the managed switching elements to receive the generated lookups. As described for some of the various lookup entries generated at 1710 and 1715, not all of the managed switching elements within the 1L domain will receive every lookup. For example, the tunnel sending lookups will not be sent to the managed switching element to which the destination machine actually connects, and the tunnel receiving lookup will not need to be sent to any managed switching elements that will never receive packets sent to the destination machine in question. Depending on the complexity of the pathways through the 1L domain, in some cases all of the switching elements might be potential recipients. In many situations though, at least some of the other edge switching elements will never receive packets destined for the machine in question (except directly from the machines connected to those edge switching elements). The egress and ingress port integration lookups, as well as certain egress pipeline entries (e.g., the egress ACL for port security) will only be sent to the managed edge switching element containing the secured port. On the other hand, the forwarding entries and ingress pipeline entries of some embodiments are sent to all of the managed switching elements within the domain, as any of these switching elements might have a machine sending a packet to the machine at Port J.

Finally, the process 1700 pushes (at 1725) the generated flow entries to the identified managed switching elements, then ends. In some embodiments, the 1L network controller communicates directly with the managed switching elements. However, in other embodiments, the 1L network controller that performs the conversion of the 1L logical forwarding plane data into the physical control plane data sends physical control plane data to master controllers for the particular switching elements that are to receive the data, and these master controllers push the data to the switching elements. In addition, while this example describes the computation of physical control plane data customized for particular switching elements (e.g., with port numbers of the particular switching elements), some embodiments compute universal physical control plane data that is generic to any particular switching element. In this case, either the master controller or a chassis controller at the managed switching element performs the conversion to customized physical control plane data for the managed switching elements. In some embodiments, the 1L controller propagates the generated flow entries (e.g., to the master controller, from the master controller to the managed switching elements) through an object-oriented (NIB) data structure, while other embodiments use direct communication channels (e.g., RPC calls, OpenFlow entries, updates over the configuration protocol) to exchange the flow entries.

Figure 18:
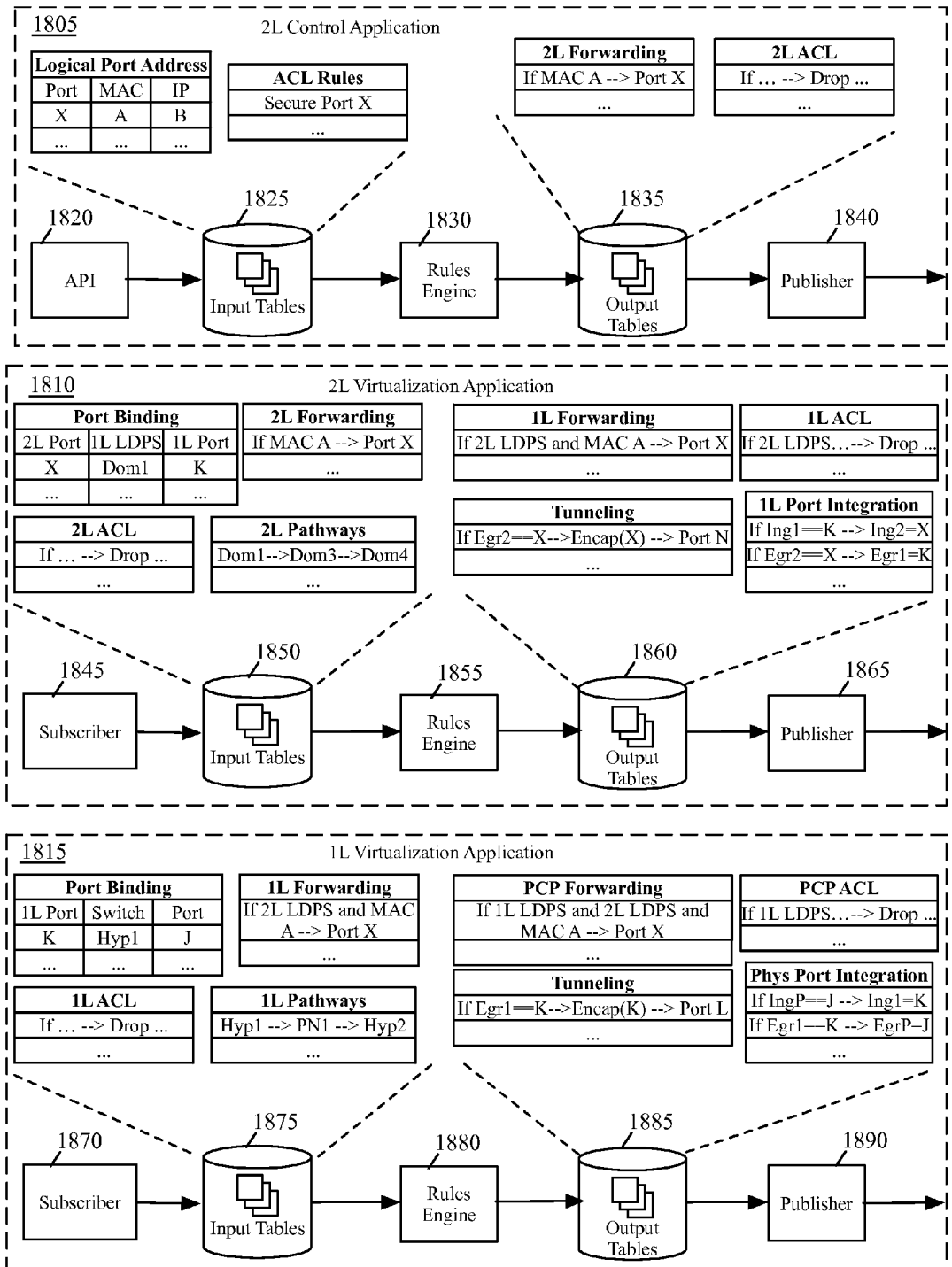
FIG. 18 conceptually illustrates these input and output tables through the various flow generation operations of some embodiments.

FIG. 18 conceptually illustrates some of these input and output tables through the various flow generation operations of some embodiments. Specifically, FIG. 18 conceptually illustrates the input and output tables for a 2L control application 1805, a 2L virtualization application 1810, and one of the 1L virtualization applications 1815. The 2L control application 1805 and 2L virtualization application 1810 are located in the same network controller, while the 1L virtualization application 1805 is located in one of several different 1L network controllers for several different 1L domains (other controllers not shown).

As shown, the control application 1805 includes an API 1820, input tables 1825, a rules engine 1830, output tables 1835, and a publisher 1840. The API 1820 provides an interface for translating input into the control plane input tables 1825. This API 1820 may be used by various types of management tools with which a user can view/and or modify the state of a multi-level logical network (in this case, a two level network). In some embodiments, the management tools provide a user interface such as a graphical user interface that allows a visual configuration of port bindings, ACL rules, etc. (e.g., through a web browser). Alternatively, or in conjunction with the graphical user interface, some embodiments provide the user with a command line tool or other type of user interface.

Based on the information received through the API, as well as updates to the network state received from the 1L controller (not shown), the control application generates the input tables 1825. The input tables represent the state of the logical switching elements managed by the user in some embodiments. As shown in this figure, some of the input tables include the association of MAC addresses/IP addresses with logical ports of the 2L logical switching element, as well as ACL rules set by the user. In this case, the Port X is associated with MAC address A and IP address B, and is secured.

The rules engine 1830 of some embodiments performs various combinations of database operations on different sets of input tables 1825 to populate and/or modify different sets of output tables 1835. As described in further detail in U.S. application Ser. No. 13/288,908, incorporated herein by reference, in some embodiments the rules engine is an nLog table mapping engine that maps a first set of nLog tables into a second set of nLog tables. The output tables 1835 populated by the rules engine of the control application 1805 include 2L logical forwarding plane lookups (e.g., mapping a MAC address to a destination output port) and 2L logical forwarding plane ACL entries (e.g., securing Port X).

The publisher 1840 is also described in further detail in U.S. application Ser. No. 13/288,908, and publishes or sends the output tables 1835 to the virtualization application 1810, in order for the virtualization application to use the output tables 1835 among its input tables. In some embodiments, the publisher 1840 also outputs the tables to an object-oriented data structure (NIB) that stores network state information.

The 2L virtualization application 1810 receives the output tables 1835 of the control application 1805, and converts this 2L logical forwarding plane data to 1L logical forwarding plane data. As shown, the 2L virtualization application 1810 includes a subscriber 1845, input tables 1850, a rules engine 1855, output tables 1860, and a publisher 1865. The subscriber 1845 of some embodiments is responsible for retrieving tables published by the publisher 1840 of the control application 1805. In some embodiments, the subscriber 1845 retrieves these tables from the same object-oriented data structure to which the publisher stores the table information. In other embodiments, a change in the tables is detected by the virtualization application in order to initiate the processing.

The input tables 1850 include, in some embodiments, at least some of the output tables 1835, in addition to other tables. As shown, in addition to the 2L logical forwarding plane data, the input tables 1850 include port binding information that indicates, for each 2L port, the 1L port bound to the same MAC and IP address (and that 1L port's 1L logical datapath set). In addition, some embodiments include interconnection information that describes the pathways for packets to take through the different 1L domains. In some embodiments, this information is generated by the user through the user interface. Other embodiments use user policies and network data to optimize the pathways, as described below by reference to FIG. 46.

In some embodiments, the rules engine 1855 is the same as the rules engine 1830. That is, the control application 1805 and the virtualization application 1810 actually use the same rules engine in some embodiments. As indicated, the rules engine performs various combinations of database operations on different sets of input tables 1850 to populate and/or modify different sets of output tables 1860. In some embodiments, the rules engine is an nLog table mapping engine that maps a first set of nLog tables into a second set of nLog tables. The output tables 1860 populated by the rules engine 1855 include 1L logical forwarding plane lookups (e.g., mapping a MAC Address to a destination logical port when the 2L LDPS is matched) and 1L logical forwarding plane ACL entries (e.g., securing Port X). In addition, the ingress and egress port integration and tunnel sending/receiving lookups are generated by the rules engine 1855 in some embodiments. In addition to the information shown in the figure, some embodiments also include in the output tables the correct 1L network controllers to receive the different tables.

The publisher 1865 is similar to the publisher 1840 in some embodiments. The publisher 1865 publishes and/or sends the output tables 1860 to the 1L network controllers, including the controller containing virtualization application 1815. In some embodiments, the publisher 1865 also outputs the tables to an object-oriented data structure (NIB) that stores network state information.

The 1L virtualization application 1815 is located at one of the 1L network controllers in the two level federated network. Specifically, in this case, the virtualization application 1815 is part of the network controller located in the 1L domain at which the machine with MAC address A (located at Port X of the 2L LDPS) is also located. As such, the 1L virtualization application generates flows that include those for the managed switching element to which this machine directly connects.

As shown, the 1L virtualization application 1815 includes a subscriber 1870, input tables 1875, a rules engine 1880, output tables 1885, and a publisher 1890. The subscriber 1870 of some embodiments is responsible for retrieving tables published by the publisher 1865 of the 2L virtualization application 1810 (specifically, the tables for its particular 1L controller). In some embodiments, the subscriber 1870 retrieves these tables from the same object-oriented database to which the publisher stores the table information. In other embodiments, changes to the output tables from the 2L virtualization application are transmitted via RPC calls to the 1L network controller.

The input tables 1875 include, in some embodiments, at least some of the output tables 1860, in addition to other tables. As shown, in addition to the 1L logical forwarding plane data generated by the 2L virtualization application 1810 that is appropriate to the particular 1L network controller, the input tables 1875 include additional port binding information (matching 1L logical ports with physical ports of particular managed switching elements). In addition, some embodiments include interconnection information that describes pathways through the managed switching elements of the 1L network for packets either fully contained within the network (as shown in the example pathway) or exiting/entering the network to/from other 1L domains. In some embodiments, this information is generated by the user at the 2L network controller and passed down to the 1L network controller, or may be generated at the 1L network controller.

In some embodiments, the rules engine 1880 is similar to the rules engines 1855 and 1830. In the situation in which the 1L network controller is located in the same hardware as the 2L network controller (i.e., the same physical machine), the 1L virtualization application 1815 may use the same rules engine as the 2L network controller. As indicated, the rules engine performs various combinations of database operations on different sets of input tables 1875 to populate and/or modify different sets of output tables 1885. In some embodiments, the rules engine is an nLog table mapping engine that maps a first set of nLog tables into a second set of nLog tables. The output tables 1885 populated by the rules engine 1880 include physical control plane lookups (e.g., mapping a MAC Address to a destination logical port when the 1L and 2L LDPS is matched) and physical control plane ACL entries (e.g., securing Port X). In addition, the ingress and egress port integration and tunnel sending/receiving lookups are generated by the rules engine 1880 in some embodiments. In addition to the information shown in the figure, some embodiments also include in the output tables the correct managed switching elements to receive the different tables.

Finally, the publisher 1890 is similar to the publisher 1865 in some embodiments. The publisher 1890 publishes and/or sends the output tables 1885 to the managed switching elements within the domain of the 1L network controller containing virtualization application 1815. These managed switching elements may include hypervisors, pool nodes, extenders, etc. In some embodiments, the publisher 1890 outputs the tables to an object-oriented data structure (NIB) that stores network state information.

One of ordinary skill in the art will recognize that the input and output tables shown in this figure are simplified conceptual representations of the actual tables, which are generated in a database language appropriate for the rules engine (e.g., nLog) and may provide additional information to that shown. Furthermore, different embodiments will use different sets of tables. For instance, the port binding tables of some embodiments are actually a single table that binds a particular MAC address and IP address at a particular physical port of a particular hypervisor to particular 1L and 2L logical ports.

C. Packet Processing

The above section described the generation of the forwarding table entries for a federated network, through the second level and first level network controllers. The following section describes the processing of packets being sent from one machine to another in such a federated network, with the managed switching elements using the flows generated as described above.

Figure 19:
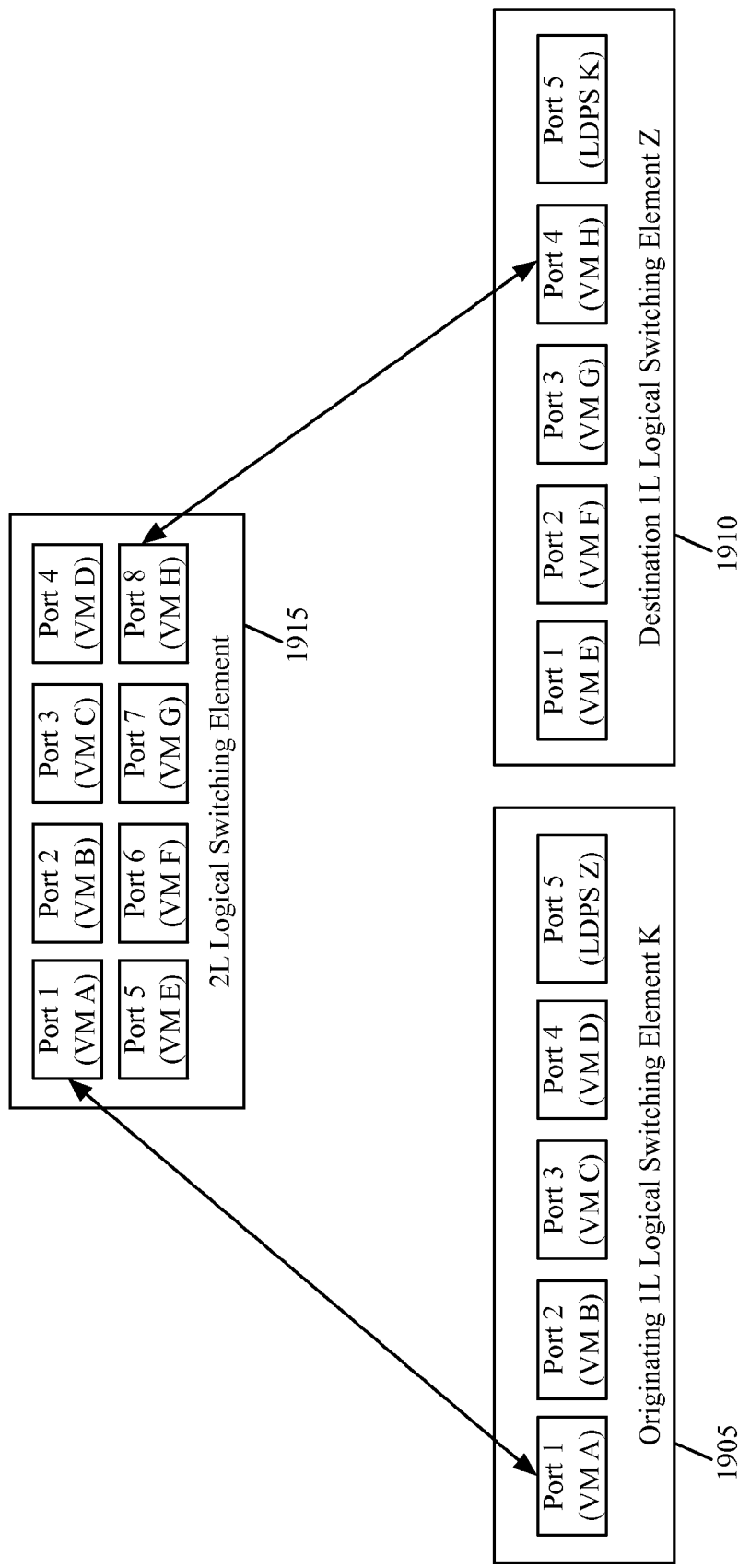
FIG. 19 illustrates a set of logical datapath sets for an example federated network of some embodiments.

FIG. 19 illustrates a set of logical datapath sets (or logical switching elements) for an example federated network of some embodiments, which will be used in some of the examples below. Specifically, FIG. 19 illustrates an originating first level logical datapath set 1905 (LDPS K), a destination first level logical datapath set 1910 (LDPS Z), and a connecting second level logical datapath set 1915.

As shown, the first level LDPS K 1905 has four ports for the VMs A, B, C, and D, as well as a fifth port that connects to the LDPS Z. The first level LDPS Z 1910 also has four ports for the four VMs E, F, G, and H, as well as a fifth port that connects to the LDPS K. The first level LDPS K 1905 logically connects machines within a first domain (e.g., a first data center) while the first level LDPS Z 1910 logically connects machines within a second domain (e.g., a second data center). The second level LDPS 1915 that logically connects these two domains has eight ports, for the eight VMs A, B, C, D, E, F, G, and H.

The arrows in this figure illustrate logical mappings for a packet sent from VM A in the first domain to VM H in the second domain. As will be described, these logical mappings are performed at one or more managed switching elements using the forwarding tables generated as described in the above section. In this case, the packet enters the logical switching element 1905 at Port 1, and is mapped to Port 1 of the second level logical switching element 1915. The forwarding tables that realize the second level logical switching element recognize the destination address of the packet as VM H and forward the packet to Port 8 of the second level logical switching element 1915 (actually exiting the logical switching element 1905 through Port 5). Port 8 of the second level logical switching element then maps to Port 4 of the logical switching element 1910, the first level logical switching element for the second (destination) domain (actually entering the logical switching element 1910 through Port 5). These mappings will be described in detail by reference to FIGS. 20-25.

Figure 20:
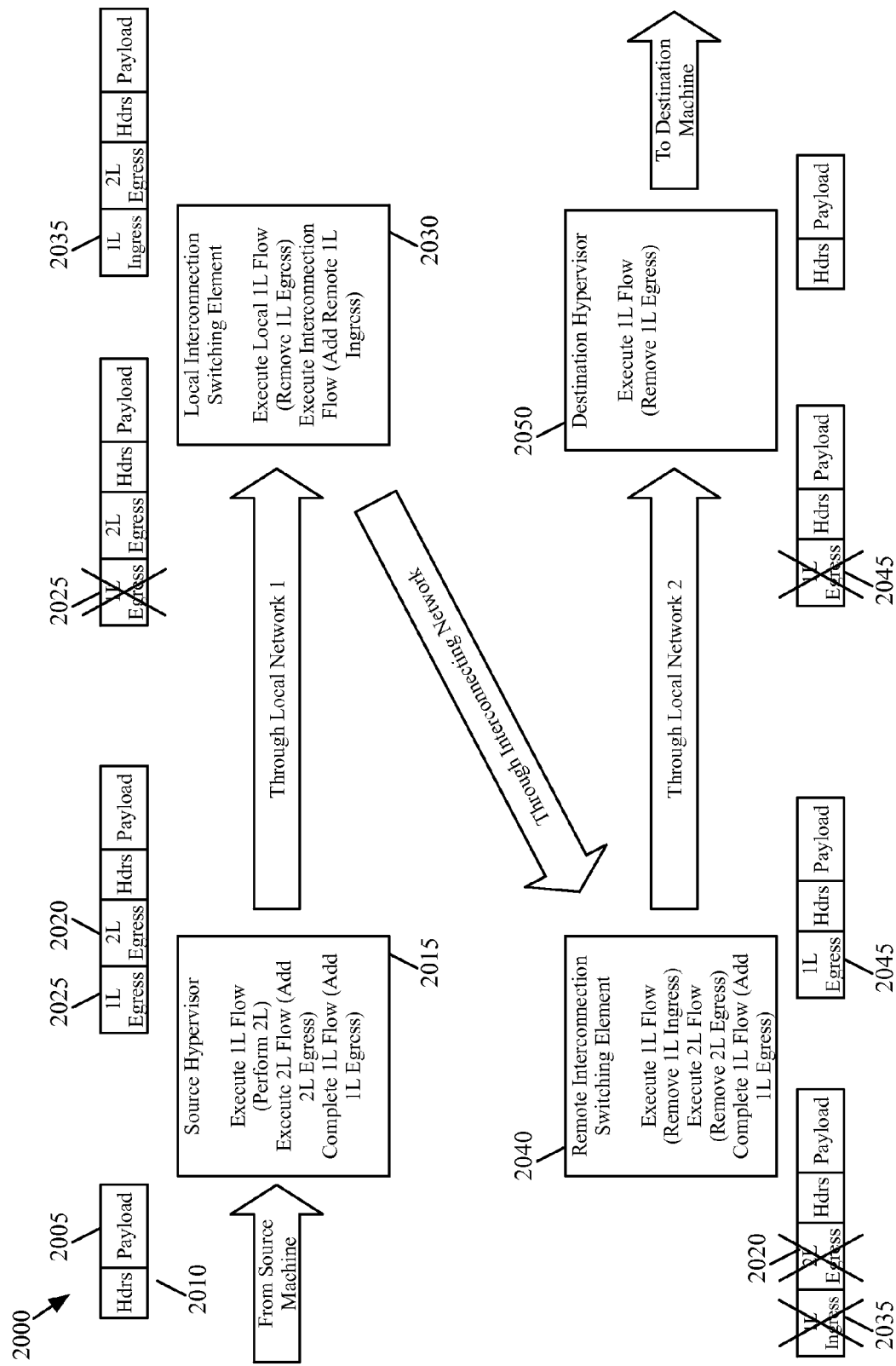
FIG. 20 conceptually illustrates the path of a packet through four managed switches between its source machine in a first domain and its destination machine in a second domain.

FIG. 20 conceptually illustrates the path of a packet 2000 through four managed switching elements between its source machine in a first domain and its destination machine in a second domain. The operation of some of the managed switching elements shown in this figure will be described in part by reference to FIGS. 21, 22, and 23, which conceptually illustrate processes performed by some of the managed switching elements in a federated network in order to process and forward packets.

As shown, the packet 2000 originates from a source machine with a payload 2005 and headers 2010. The payload 2005 contains the actual data intended for the destination machine, while the headers 2010 include information appended by the source machine in order to enable the packet 2000 to reach the destination machine. For instance, the headers 2010 include the source and destination machines' addresses (e.g., MAC addresses, IP addresses, etc.). These addresses are physical addresses from the perspective of the machines, which are not aware of the logical network. From the perspective of the switching elements within the network between the machines, however, these MAC addresses are considered logical addresses, as the initial managed switching element uses the destination address to perform logical forwarding, and the address is kept within the encapsulation and therefore not visible to the subsequent logical switching elements.

Thus, the packet leaves the source machine without any sort of logical context ID. Instead, as described further below, all of the logical context information is added and removed at the managed switching elements. The end machines, and the network interfaces of the end machines, need not be aware of the logical network over which the packet is sent. As a result, the end machines and their network interfaces do not need to be configured to adapt to the logical network. Instead, only the managed switching elements are configured by the network controllers.

The packet 2000 is first sent to a source hypervisor 2015 in this example. In this case, the source machine from which the packet originates is a virtual machine (e.g., VM A of FIG. 19) that operates on a hypervisor running on a physical machine. Such hypervisors, in some embodiments, also contain software to operate as managed switching elements, performing physical and logical forwarding functions for packets originating from and destined for the virtual machines operating on the hypervisor. As shown, the source hypervisor 2015 executes a first level flow, which includes performing second level functions. As such, the source hypervisor 2015 executes the 2L flow to add 2L egress information to the packet, and then completes the 1L flow to add 1L egress information to the packet. The packet 2000 exits the source hypervisor with two layers of encapsulation: 2L egress information 2020 encapsulated inside 1L egress information 2025.

Figure 21:
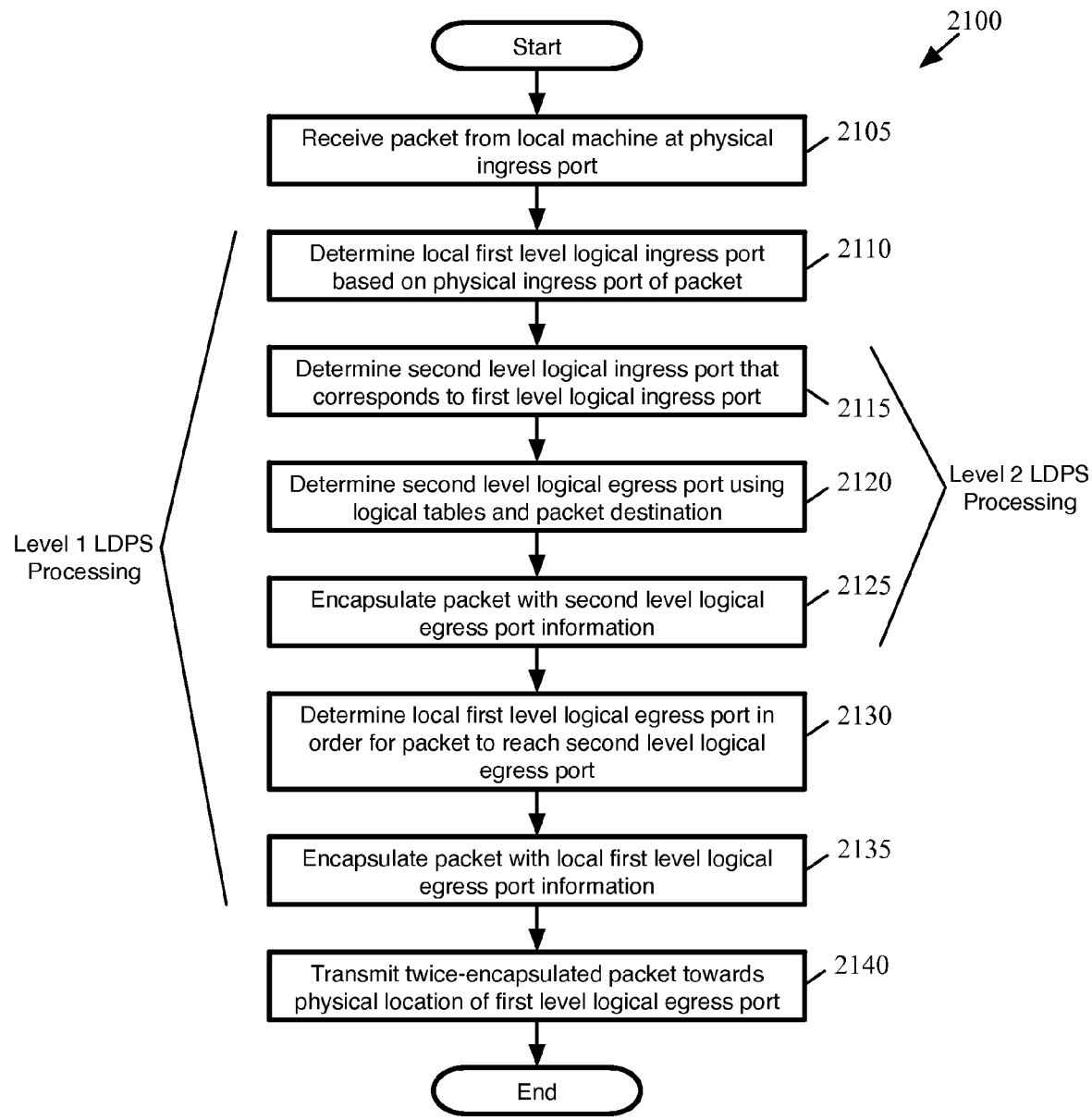
FIG. 21 conceptually illustrates in greater detail a process of some embodiments for processing packets by a first hop managed switching element in a federated network.

FIG. 21 conceptually illustrates in greater detail a process 2100 of some embodiments for processing packets by a first hop managed switching element (e.g., the source hypervisor 2015) in a federated network. The first hop managed switching element is the first managed switching element at which a packet arrives after being sent by its source machine. In the case of a packet from a virtual machine, this first hop managed switching element is often the hypervisor on which the virtual machine operates. As in the example of FIG. 20, in some embodiments all of the second level processing, as well as the originating LDPS's first level processing, is performed at the first hop.

As shown, the process 2100 begins (at 2105) by receiving a packet from a local machine at a physical ingress port. A switching element, whether managed or unmanaged, has several physical ports through which packets may enter or exit. In general, each port can serve as both an ingress port (for incoming packets) and an egress port (for outgoing packets), although in some embodiments certain ports may be reserved for either ingress or egress specifically. The packet is received through a physical port of the switching element to which the source machine of the packet connects, either directly or through other (unmanaged) switching elements. In the case of a packet sent from a virtual machine, this switching element is often running on the hypervisor on which the virtual machine operates.

Based on the physical ingress port of the packet, the process determines (at 2110) the local first level logical ingress port for the packet. That is, the managed switching element maps the physical ingress port to a 1L logical ingress port. In some embodiments, the managed switching element bases this mapping solely on the physical port through which the packet arrived, and the fact that the packet is not yet encapsulated with any 1L information. In other embodiments, the managed switching element also uses the packet headers (e.g., the MAC address of the source machine) to determine the mapping.

Next, the process determines (at 2115) the second level (2L) logical ingress port for the packet based on the first level logical ingress port. In some embodiments, each 1L logical port corresponds to a second level logical port. For example, in FIG. 19, Port 1 of the 1L LDPS K 1905 corresponds to Port 1 of the 2L LDPS 1915. As shown in FIG. 21, operation 2115 is the beginning of the second level processing, which is encompassed within the first level processing (i.e., the first level logical forwarding tables realize the second level logical processing pipeline).

Now that the forwarding tables have begun 2L processing, the process determines (at 2120) the 2L logical egress port for the packet using the logical forwarding tables and the packet destination. That is, the managed switching element examines the packet headers to determine the packet destination (e.g., the MAC address), and maps the identified destination to a logical port of the 2L logical switching element. This logical forwarding operation may be performed for layer 2 processing (e.g., using the MAC address), layer 3 processing (e.g., using an Internet Protocol (IP) address), or using any other type of network addresses. That is, the concept of having hierarchical network controllers creating hierarchical logical datapath sets is not restricted to any particular type of network forwarding.

In addition to making a forwarding decision (i.e., mapping to a 2L logical egress port), some embodiments also perform other forwarding table operations within the 2L processing. For instance, some embodiments perform ingress and/or egress Access Control List ("ACL") lookups that may contain instructions to drop a packet (e.g., if the source of the packet is known to be corrupted), queue a packet (e.g., to enforce quality of service controls), allow a packet through, etc.

After determining the 2L logical egress port, the process encapsulates (at 2125) the packet with this second level logical egress port information. That is, the managed switching element prepends information to the packet (e.g., a logical context) that includes the 2L egress port information. An example of such a logical context for OSI Layer 2 processing is described in detail in U.S. application Ser. No. 13/177,535, incorporated by reference above. The logical context described therein is a 64-bit tag that includes a 32-bit virtual routing function field (for representing the logical switching element to which the packet belongs (i.e., the 2L logical switching element)), a 16-bit logical inport field (i.e., the ingress port on the 2L switching element), and a 16-bit logical outport field (i.e., the 2L egress port).

Some embodiments, however, only include the logical egress port within the logical context prepended to the packet. That is, the logical context that encapsulates the packet does not include an explicit tenant ID. Instead, the logical context captures the logical forwarding decision made at the first hop. From this, the LDPS ID (i.e., the LDPS to which the packet belongs) can be determined implicitly at later switching elements by examining the logical egress port (as that logical egress port belongs to a particular logical switching element). This results in a flat context identifier, meaning that the switching element does not have to slice the context ID to determine multiple pieces of information within the ID. In some embodiments, the egress port is a 32-bit ID. However, the use of software switching elements as the managed switching elements that process the logical contexts in some embodiments enables the system to be modified at any time to change the size of the logical context (e.g., to 64 bits or more), whereas hardware switching elements tend to be more constrained to using a particular number of bits for a context identifier. In addition, using a logical context identifier such as those described herein results in an explicit separation between logical data (i.e., the egress context ID) and source/destination address data (i.e., MAC addresses). While the source and destination addresses are mapped to the logical ingress and egress ports, the information is stored separately within the packet.

Such logical networks, that use encapsulation to provide an explicit separation of physical and logical addresses, provide significant advantages over other approaches to network virtualization, such as VLANs. For example, tagging techniques (e.g., VLAN) use a tag placed on the packet to segment forwarding tables to only apply rules associated with the tag to a packet. This only segments an existing address space, rather than introducing a new space. As a result, because the addresses are used for entities in both the virtual and physical realms, they have to be exposed to the physical forwarding tables. As such, the property of aggregation that comes from hierarchical address mapping cannot be exploited. In addition, because no new address space is introduced with tagging, all of the virtual contexts must use identical addressing models and the virtual address space is limited to being the same as the physical address space. A further shortcoming of tagging techniques is the inability to take advantage of mobility through address remapping.

With the packet encapsulated with 2L context information (e.g., the egress port), the 2L logical processing realized by the 1L logical tables is complete. Next, the process 2100 determines (at 2130) a local first level logical egress port in order for the packet to reach the second level logical egress port in its encapsulation information. When the packet destination is at a remote domain, this is the logical egress port for the originating first level logical switching element that connects to the remote domain containing the destination machine. In the example of FIG. 19, this is Port 5 of the originating LDPS K 1905. When the packet destination is within the same domain, this will be one of the other ports on the originating first level logical switching element that connects to the destination machine. The majority of the foregoing discussion, however, assumes that the packet destination is in a different 1L domain than the packet source.

After determining the 1L logical egress port, the process encapsulates (at 2135) the packet with this local first level logical egress port information. That is, the managed switching element prepends information to the packet (e.g., a logical context) that includes the 1L egress port information. As with the 2L encapsulation, the logical context information of some embodiments is a 64-bit tag that includes a 32-bit virtual routing function field (for representing the logical switching element to which the packet belongs (i.e., the originating 1L logical switching element)), a 16-bit logical inport field (i.e., the ingress port on the 1L switching element), and a 16-bit logical outport field (i.e., the 1L egress port).

As with the 2L logical egress port, some embodiments only include the 1L logical egress port within the 1L logical context prepended to the packet. That is, the logical context that encapsulates the packet does not include an explicit tenant ID. Instead, the 1L logical context captures the logical forwarding decision made at the first hop. From this, the first level LDPS ID (i.e., the 1L LDPS from which the packet originates) can be determined implicitly at later switching elements within the originating domain by examining the logical egress port (as that logical egress port belongs to the particular 1L logical switching element). This results in a flat context identifier, meaning that the switching element does not have to slice the context ID to determine multiple pieces of information within the ID. In some embodiments, the egress port is a 32-bit ID.

At this point, the 1L logical forwarding is complete. The process 2100 then transmits (at 2140) the twice-encapsulated packet towards the physical location of the first level logical egress port, and ends. In the case of a packet destination outside of the domain, this physical location is an interconnection switching element (e.g., an extender or a pool node) located at the edge of the domain. In some embodiments, this transmission actually involves multiple operations. First, the 1L logical egress port is mapped to a physical address (e.g., the address of the interconnection switching element, or a port thereupon). Next, this physical address is mapped to a physical port of the managed switching element so that the packet can be transmitted to the next hop. That is, while the interconnection switching element is the ultimate destination (within the local 1L domain), there may be one or more physical switching elements (either managed or unmanaged) in between the source managed switching element and the interconnecting managed switching element.

Returning to FIG. 20, the packet 2000 leaves the source hypervisor 2015 with a double encapsulation, having the 2L egress context 2020 encapsulated inside the 1L egress context 2025. As shown, the packet 2000 (destined for a remote machine in a different 1L domain) travels through the local network to a local interconnection switching element 2030 (e.g., an extender that connects to the remote 2L domain). The local interconnection switching element 2030 executes the local 1L flow, which removes the local 1L egress context 2025 (as the switching element 2030 is the physical realization of the local 1L egress port). The local interconnection switching element also executes an interconnection flow that encapsulates the packet 2000 with the ingress context 2035 of the remote 1L logical switching element (i.e., the logical port of the switching element that connects to the local domain, such as Port 5 of logical switching element 1910 in FIG. 19).

Figure 22:
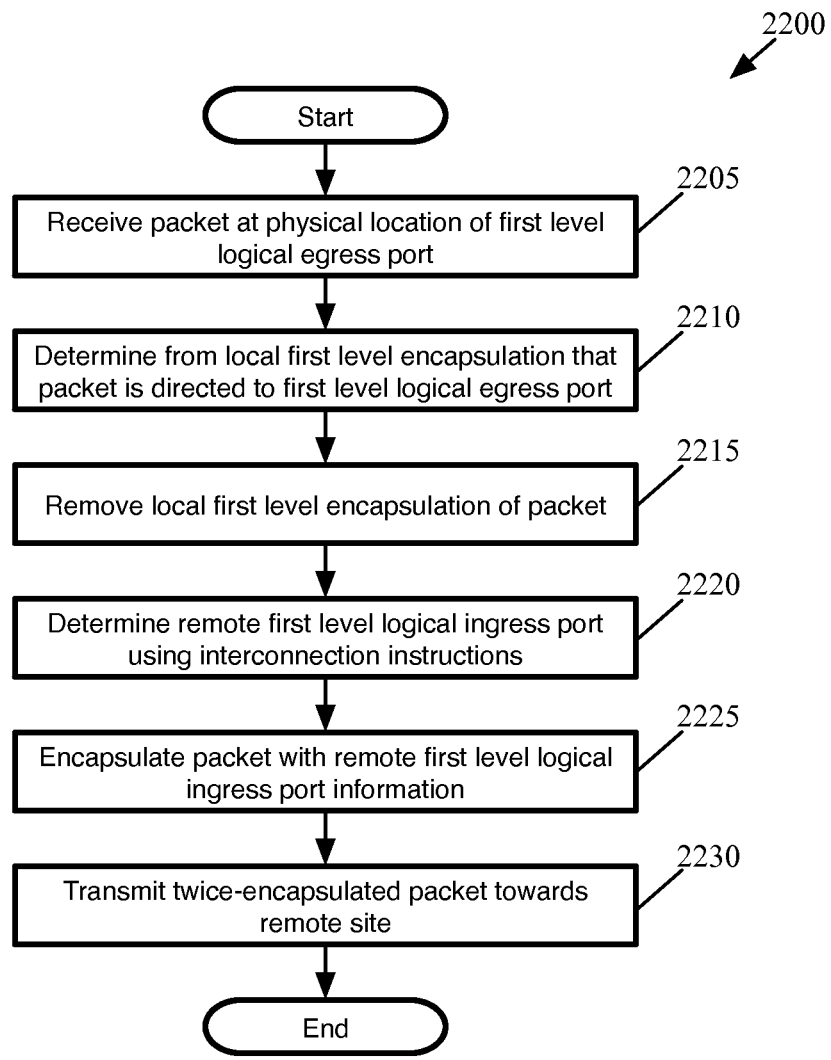
FIG. 22 conceptually illustrates in greater detail a process of some embodiments for processing packets by an interconnection managed switching element for a packet exiting the domain of the interconnection managed switching element in a federated network.

FIG. 22 conceptually illustrates in greater detail a process 2200 of some embodiments for processing packets by an interconnection managed switching element for a packet exiting the domain of the interconnection managed switching element (e.g., the interconnection switching element 2030) in a federated network. This switching element, as stated, may be an extender or a pool node in various embodiments, and contains information regarding connections to external networks (including the remote managed network to which the packet is headed). As in the example of FIG. 20, in some embodiments only first level processing is performed at the managed switching elements other than the first hop switching element.

As shown, the process 2200 begins (at 2205) by receiving a packet at the physical location of the packet's logical egress port. The logical egress port of a packet headed out of the network is a particular port on the logical switching element that maps to a particular port on the physical interconnection managed switching element (e.g., Port 5 of the logical switching element 1905 of FIG. 19). For an extender, e.g., this is the physical port that faces the local network (as opposed to one or more ports facing external networks).

As the packet's outermost encapsulation contains local 1L egress data, the process determines (at 2210) from this encapsulation that the packet is directed to the first level logical egress port (which it has now reached). As such, the process removes (at 2215) the local first level encapsulation of the packet. In general, once a packet reaches a destination that maps to a logical egress port in the encapsulation of the packet, the switching element at that destination will remove the encapsulation in some embodiments (as it is no longer needed).

With the local 1L processing complete, the process 2200 determines (at 2220) the remote first level logical ingress port using interconnection instructions contained within the forwarding tables of the managed switching element. In some embodiments, the 2L network controller cluster passes these interconnection instructions to the local 1L controller, which passes them to the interconnection switching element within the forwarding table information. Specifically, the managed switching element uses the interconnection instructions to match the local logical egress port (from the encapsulation information stripped at 2215) to a remote ingress port. In the context of FIG. 19, Port 5 of the originating LDPS 1905 as an egress port matches to Port 5 of the destination LDPS 1910 as an ingress port.

The process then encapsulates (at 2225) the packet with this remote first level logical ingress port information. That is, the managed switching element prepends information to the packet (outside the 2L egress information, which is unmodified), such as a logical context, that includes the remote 1L ingress port information. This may be a 64-bit logical context as described above, in some embodiments, but without the 16-bit outport information (which is determined at the remote interconnection switching element). In other embodiments, the remote 1L logical ingress port is prepended to the packet without a specific LDPS ID, in the same manner as the egress ports described above. Just as with the logical egress ports, when the packet reaches the physical realization of the outermost logical port, the encapsulation will be removed.

At this point, the logical processing for the interconnection switching element is complete. The process 2200 then transmits (at 2230) the twice-encapsulated packet towards the physical location of the remote site, and ends. Again, this transmission may involve multiple operations. The managed interconnection switching element maps the logical ingress port to a physical address (e.g., the address of a remote interconnection switching element), then maps this physical address to a physical port of the managed interconnection switching element through which the packet can be transmitted to the next hop. In this case, the next hop may be on an unmanaged network (e.g., the Internet) if the two 1L domains are in two different locations (e.g., data centers in different cities).

In FIG. 20, the packet 2000 is transmitted from the local (originating network) interconnection switching element through an interconnecting network to a remote interconnection switching element 2040 (e.g., an extender, pool node, etc.). This remote interconnection switching element 2040 is located at the edge of the remote 1L domain (e.g., the edge of a remote data center). As shown, when the packet arrives at the managed switching element 2040, the switching element removes both the 1L ingress port information 2035 and the 2L egress port information 2020, then adds new 1L egress port information 2045 to the packet 2000. This 1L egress information 2045 indicates the egress port on the local 1L logical switching element for the packet (i.e., the port connected to the destination machine for the packet).

Figure 23:
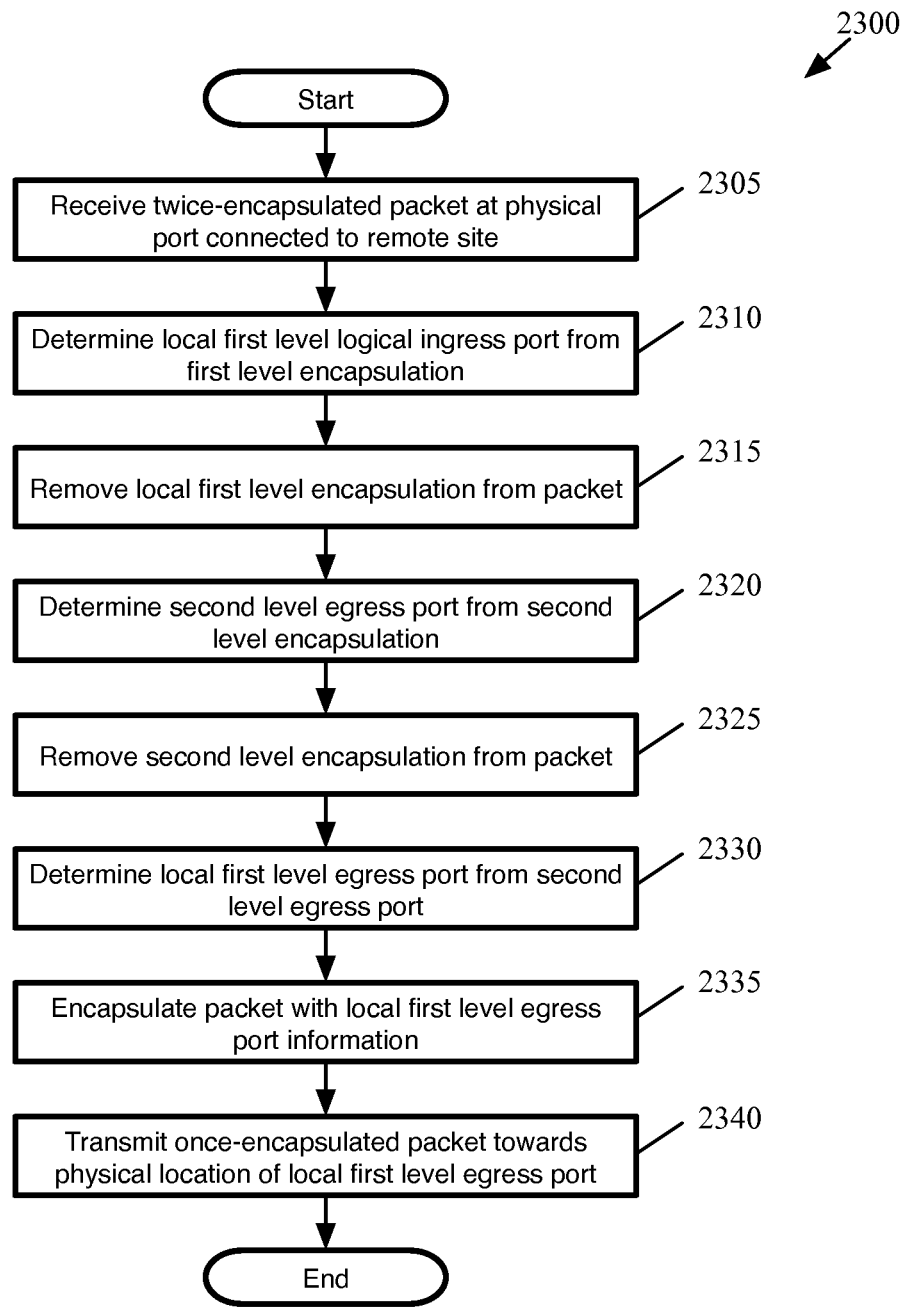
FIG. 23 conceptually illustrates in greater detail a process of some embodiments for processing packets by an interconnecting managed switching element for a packet entering the domain of the interconnecting managed switching element in a federated network.

FIG. 23 conceptually illustrates in greater detail a process 2300 of some embodiments for processing packets by an interconnecting managed switching element for a packet entering the domain of the interconnecting managed switching element (e.g., the interconnection switching element 2040) in a federated network. This switching element, as stated, may be an extender or a pool node in various embodiments, and contains information regarding connections to external networks (including the remote managed network from which the packet is received).

As shown, the process 2300 begins by receiving (at 2305) a twice-encapsulated packet at the physical port connected to a remote site. This packet, as shown in FIG. 20, contains an outer encapsulation 2035 identifying the 1L ingress port local to the physical managed switching element performing the process 2300 as well as an inner encapsulation 2020 identifying the 2L egress port for the packet.

As the packet's outermost encapsulation contains local (to the switching element) 1L ingress data, the process determines (at 2310) from this encapsulation that the packet is directed to the first level logical ingress port (which it has now reached at the interconnecting managed switching element). As such, the process removes (at 2315) the local first level encapsulation from the packet. In some embodiments, whenever a switching element removes encapsulation information from a packet, the switching element saves that information in a temporary storage (e.g., a register of the switching element)

for the duration of the processing of the packet, as the information may be needed for later processing.

With the 1L encapsulation removed, the process determines (at 2320) the second level egress port based on the 2L encapsulation of the packet. This is the logical port on the 2L switching element that maps to the packet destination. The process also removes (at 2325) the second level encapsulation from the packet. As with the first level encapsulation, some embodiments store this 2L information in a temporary storage (e.g., a register) for use in any additional processing of the packet.

At this point, the packet has no encapsulation information (at least as relates to the logical datapath sets of the federated network). Next, the process determines (at 2330) a local first level egress port based on the second level egress port. The 2L egress port from the encapsulation removed at operation 2325 maps to a particular port in the local (destination) 1L logical datapath set. For instance, in FIG. 19, Port 8 of the 2L LDPS 1915 maps to Port 4 of the destination 1L LDPS Z 1910. While described here as using the 2L egress information to determine the 1L egress port, some embodiments also use the destination address contained in the packet headers, as this address also maps to the 1L egress port.

In addition, some embodiments may execute egress ACL tables within the 2L processing at the receiving interconnection switching element. Some embodiments execute such egress ACL tables when the egress port of a particular logical switching element is removed. Thus, in a single-level logical network, when a packet reaches the destination managed switching element, some embodiments remove the logical context and run the packet through egress ACL tables. Similarly, in this case, when the receiving interconnect removes the 2L processing, it may execute egress ACL tables.

The process 2300 then encapsulates (at 2335) the packet with this local first level logical egress port information. As with the encapsulations performed at the source managed switching element, in some embodiments the encapsulation is in the form of a context tag, such as the 64-bit context tag described above. In other embodiments, the context tag contains only the 1L logical egress port (e.g., the 32-bit egress port described above).

Next, the process transmits (at 2340) the once-encapsulated packet towards the physical location of the local first level egress port. In general, there will not be any managed switching elements in between the interconnection managed switching element (usually a non-edge switching element, such as an extender or pool node) and the destination managed switching element (an edge switching element that connects to the destination machine). As shown in FIG. 11, some embodiments enable a direct connection between the extender and hypervisor for federated networks. In other embodiments, an additional managed switching element (e.g., a pool node) may be located between the interconnection switching element and the destination managed switching element. In addition, the network may contain intervening unmanaged switching elements. Again, this transmission may involve multiple operations, including mapping the 1L logical egress port to a physical destination (the destination contained in the packet headers), then mapping this physical address to a physical port of the managed interconnection switching element through which the packet can be transmitted to the next hop.

Returning again to FIG. 20, the packet 2000 is transmitted (with a single level of encapsulation) through the destination 1L network) to a destination hypervisor 2050. This hypervisor 2050 is the edge managed switching element to which the destination machine connects (specifically, in this case, the hypervisor on which the destination machine operates). As shown, this machine executes its 1L flow to recognize its outport facing the machine as the 1L egress port, remove this egress information 2045, and transmit the packet 2000 (headers and payload) to the destination machine.

While this example in FIG. 20 (and the subsequent process of FIG. 23) illustrates the removal of the 2L egress port information at the remote interconnection switching element 2040 (as it is no longer needed except to add the 1L egress information at that switching element), some embodiments do not strip the 2L egress information until the last managed switching element that connects directly to the destination machine (i.e., the location of the 2L egress port, such as hypervisor 2050). In this case, the interconnection switching element at the destination domain would remove the 1L ingress information and encapsulate the packet with the 1L egress information, while leaving the 2L encapsulation intact.

Figure 24:
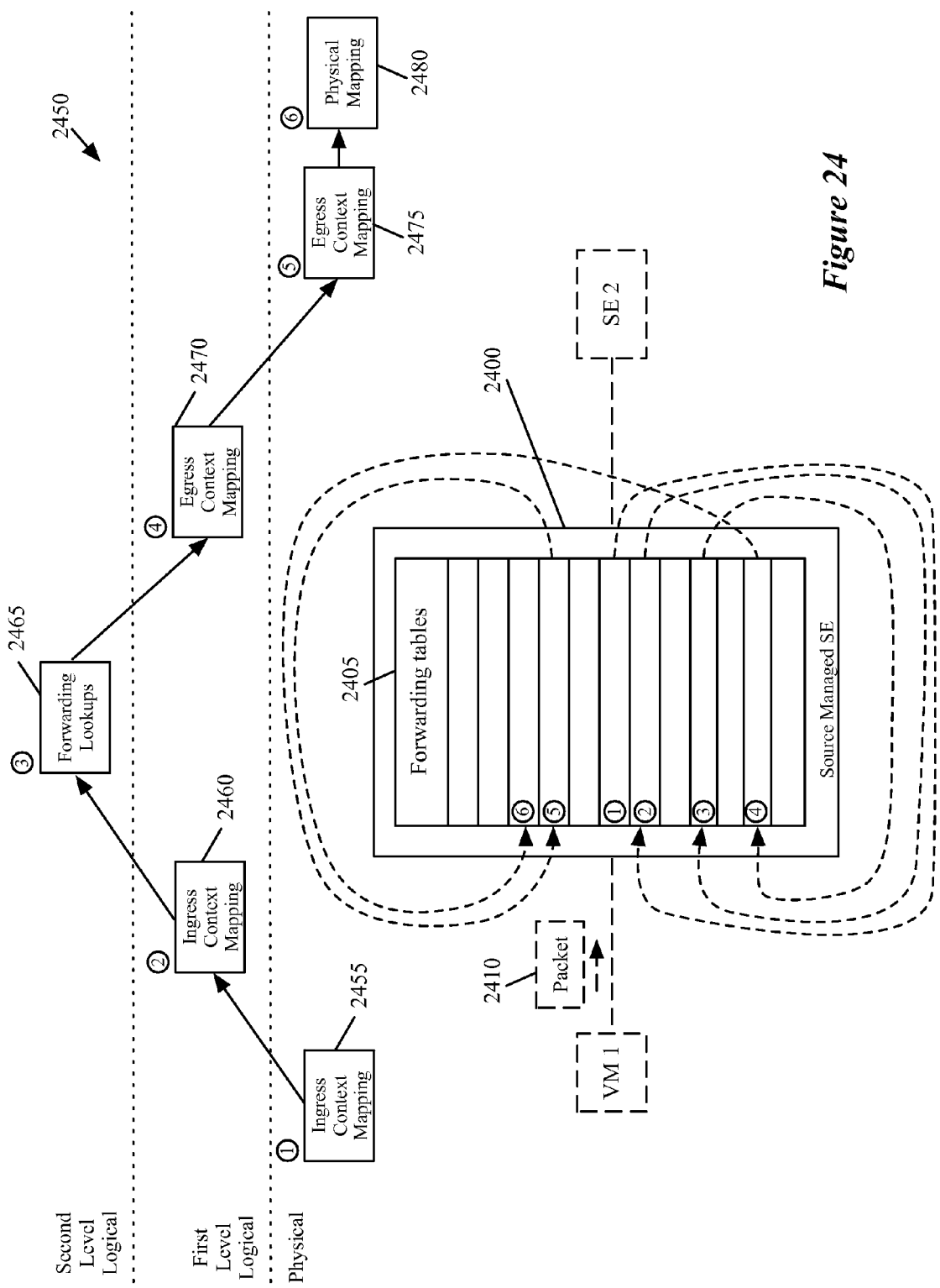
FIG. 24 conceptually illustrates a different view of the processing performed by a source managed switching element.

The previous set of figures described the packet processing performed at several of the managed switching elements within a federated network (or set of networks) for a packet originating in one first level network and destined for a different first level network. FIG. 24 conceptually illustrates a different view of the processing performed by a source managed switching element 2400 (i.e., the managed switching element at which a packet arrives after being sent from its source machine, such as the hypervisor 2015 of FIG. 20). Specifically, FIG. 24 illustrates forwarding table entries 2405 for the source managed switching element 2400.

In conjunction with the forwarding table entries, FIG. 24 conceptually illustrates the processing pipeline 2450 performed by the source managed switching element 2400 of some embodiments. As shown by the numbers 1-6, when the managed switching element 2400 receives a packet, the switching element uses numerous forwarding table entries to process the packet. In some embodiments, the physical, 1L, and 2L tables are implemented as a single table within the managed switching element (e.g., using a dispatch port that returns a packet processed by a first entry to the forwarding table for processing by a second entry).

As shown, in this example, a VM 1 is coupled to the managed switching element 2400, which is also coupled to a second switching element (which may be a managed switching element or an unmanaged switching element). The VM 1 sends a packet 2410 to a destination machine through two levels of logical switching elements that are implemented by the managed switching element 2400 as well as other managed switching elements.

The managed switching element 2400 receives the packet 2410 through an interface of the switching element, and begins processing the packet using the forwarding tables 2405. The first stage in the processing pipeline 2450 is an ingress context mapping stage 2455 that maps a physical ingress port (i.e., the interface through which the packet was received from VM1) to a local 1L logical ingress port (i.e., a port of the logical switching element implementing the local 1L network that corresponds to this interface). As shown by the encircled 1, the managed switching element identifies a record 1 in the forwarding table that implements this ingress context mapping. This record 1 specifies that the managed switching element 2400 store the logical context in a register, or meta field, of the managed switching element. The logical inport is therefore stored within the switching element for the duration of the packet processing, and can be used in performing additional lookups (e.g., mapping to the next level ingress port). In addition, in some embodiments the logical context (after each of the forwarding table records is applied) indicates the status of the packet within the processing pipeline (i.e., in this case, that a first level of ingress context mapping has been performed). The record also specifies to send the packet to the dispatch port, for additional processing by the forwarding tables 2405.

The second stage in the processing pipeline 2450 is a second ingress context mapping operation 2460 that maps the local 1L logical ingress port identified at stage 2455 to a 2L logical ingress port (i.e., a port of the logical switching element implementing the 2L network). As shown by the encircled 2, the source managed switching element 2400 identifies a record 2 in the forwarding tables 2405 that implements this second level of ingress context mapping. At each of the levels of ingress context mapping, as illustrated conceptually by the pipeline 2450, the forwarding entries map a lower level port to a logical port at the next level up. The federated network of some embodiments may have more than two levels (e.g., three, four, etc., to allow for traffic engineering at different levels), and in such cases, additional records for performing ingress mapping up to each of the levels would be contained within the forwarding tables. The record 2 specifies that the managed switching element 2400 store the logical context in a register, or meta field, of the managed switching element. The 2L logical inport is therefore stored within the switching element for the duration of the packet processing, and can be used in performing additional lookups. The record also specifies to send the packet to the dispatch port, for additional processing by the forwarding tables 2405.

Figure 25:
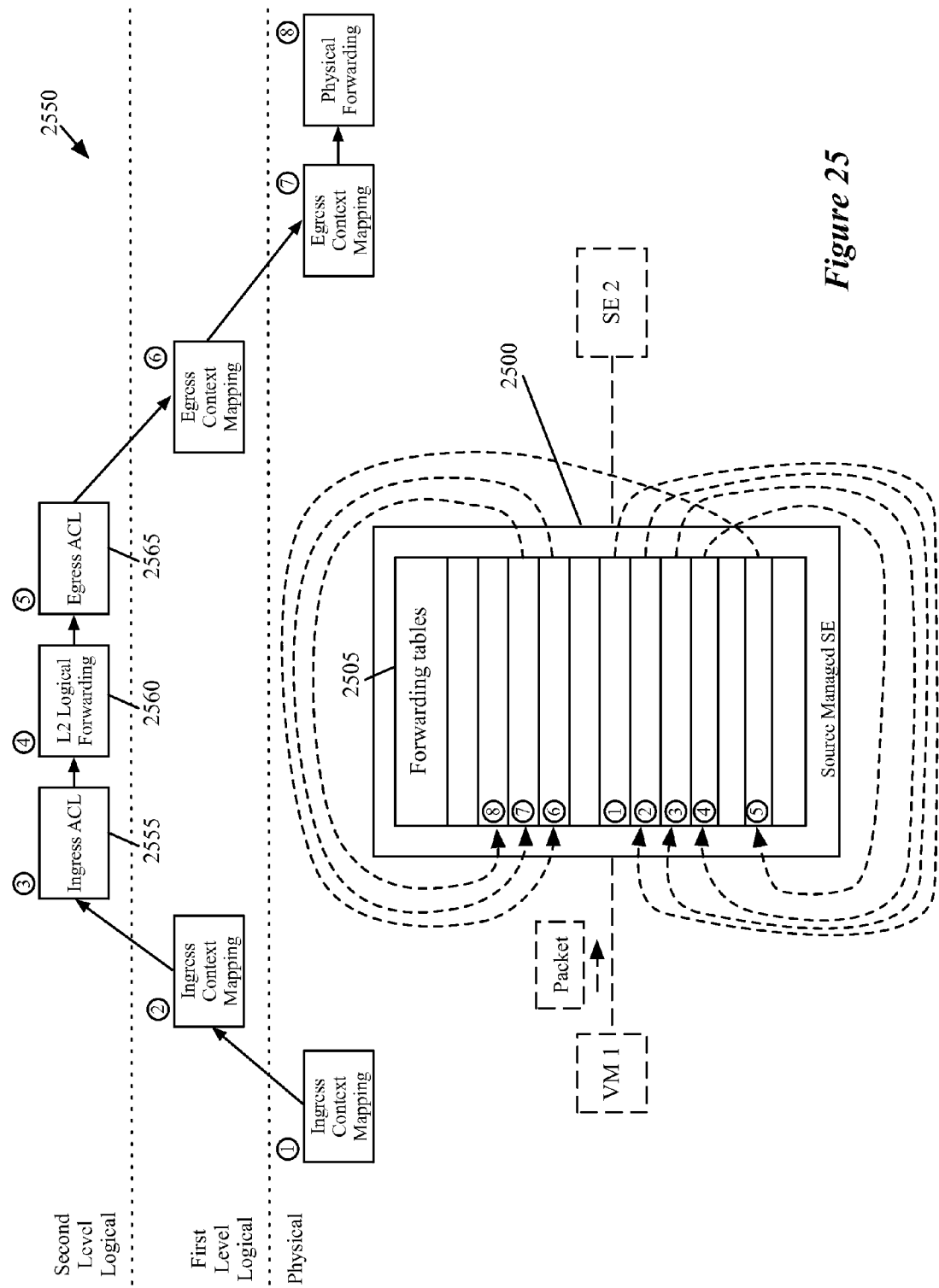
FIG. 25 illustrates a processing pipeline for a specific type of network performing OSI layer 2 forwarding (e.g., forwarding based on MAC address).

Next, the managed switching element 2400 performs the third stage in the processing pipeline 2450, the forwarding lookups 2465. These forwarding lookups are illustrated here as a single forwarding table record, but may in fact involve the use of several records from several tables (e.g., one or more ACL tables, a layer 2 or layer 3 forwarding table, etc.). The hierarchical logical forwarding concept may be applied to any type of switching/routing network, and therefore any sort of lookups may be implemented at this level of the processing pipeline. FIG. 25, described below, gives one such example.

The forwarding lookups perform the traditional forwarding decision for the packet 2410, by identifying an egress port based on the packet destination. Using this destination contained within the packet header, the forwarding lookups identify a logical port of the 2L switching element to which the packet should be sent, as well as any additional policies (e.g., drop, enqueue, etc.) that apply to the packet. These forwarding decisions are implemented by the 2L network controller, which passes its generated flow records to the 1L network controller (e.g., via an API exposed by the 1L network controller). The 1L network controller then implements these received instructions within its 1L flow records, and passes these to the managed switching elements (including the source managed switching element 2400) for application to actual traffic packets. As shown by the encircled 3, a record 3 (which may conceptually represent several records) implements these forwarding lookups, and at least specifies that the managed switching element 2400 store the 2L egress port in the packet headers (i.e., encapsulate the packet with the 2L egress context), as well as send the packet to its dispatch port.

Based on the 2L egress port specified at the third stage of the processing pipeline 2450, the managed switching element performs egress context mapping 2470 that maps the 2L egress port to an 1L egress port. As this is performed at a managed switching element in the originating 1L network, the 2L egress port maps to a port of the local 1L logical switching element. For a packet with a destination outside of the local 1L network, this will be a logical port used for remote packets (e.g., Port 5 of the logical switching element 1905 in FIG. 19). As shown by the encircled 4, the source managed switching element 2400 identifies a record 4 in the forwarding tables 2405 that implements this egress context mapping. The record 4 specifies that the managed switching element 2400 store the 1L logical egress port in the packet headers (i.e., encapsulate the packet with the 1L egress context), as well as send the packet to its dispatch port.

Next, the managed switching element 2400 performs another level of egress context mapping at stage 2475 of the processing pipeline 2450. Whereas the first level of egress context mapping maps a 2L logical egress port to a 1L logical egress port, this second stage maps the 1L logical egress port to a physical egress port for the packet within the domain of the 1L logical network. For a packet traveling to a different 1L domain, this is not the physical port of a switching element that interfaces directly with the destination machine, but rather the physical port on an interconnection managed switching element that faces an external network. In some embodiments, the egress context mapping back to the physical level also identifies a port on a next hop intermediate switching element (e.g., by the port's MAC address). As shown by the encircled 5, the source managed switching element 2400 identifies a record 5 in the forwarding tables 2405 that implements this second level of egress context mapping. As with the ingress mapping, in a federated network with more than two levels, additional records for performing egress mapping will be contained within the forwarding tables for each of the logical levels. Each level maps an egress port at the higher level to an egress port at the lower level, down to the physical level. In some embodiments, the record 5 specifies that the managed switching element 2400 store the physical egress port in the packet headers, as well as send the packet to its dispatch port for further processing.

Lastly, the managed switching element 2400 performs the physical mapping stage 2480 that specifies a physical port of the managed switching element through which to send the (now-modified) packet 2410 in order to reach the physical egress port identified by the egress context mapping (and, therefore, eventually, the destination machine). As shown by the encircled 6, the source managed switching element 2400 identifies a record 6 in the forwarding tables 2405 that implements this physical mapping. That is, the record 6 specifies which port of the managed switching element to send the packet to in order for the packet to reach the physical address identified at stage 2475 (as opposed to the dispatch port that routes the packet back into the forwarding tables).

The above description for FIG. 24 illustrates the logical pipeline performed by the first hop managed switching element for a packet in a federated network that is being sent from one 1L logical network to a second 1L logical network. In some embodiments each managed switching element performs the same logical pipeline, though with different records. However, at many of these switching elements, some or all of the logical context information is already stored in the packet, and therefore no actual operation is performed for some of the stages. For example, at an intermediate managed switching element between the first hop and the interconnection switching element, the logical context would indicate that the 1L and 2L processing was already complete until the 1L egress port is reached, which does not happen at the intermediate switching element. At such an intermediate switching element, the only operation actually performed is the physical mapping stage to send the packet to a port of the physical switching element.

In addition, not all packets within a federated network are necessarily sent from a machine in a first 1L domain to a machine in a different 1L domain. Instead, packets will often be sent from a machine in the first 1L domain to a different machine in the same 1L domain (e.g., from VM A to VM B in FIG. 19). In this case, some embodiments nevertheless perform the full processing pipeline 2450, as the actual forwarding decisions occur at the 2L level. In such a case, the source managed switching element would identify the ingress ports at the 1L and 2L level in exactly the same manner as described above for FIG. 24. The forwarding lookups would still identify an 2L egress port, which would in turn map to a 1L egress port. The difference, in this case, is that the 1L egress port would not be the port for remotely-destined packets, but rather a port that maps to one of the machines in the 1L domain. As such, the packet would generally not reach the interconnection switching element, but instead would travel through the local network to the destination switching element, which would remove all of the encapsulation and send the packet to the destination machine.

As indicated above, FIG. 24 describes a generic processing pipeline. FIG. 25 illustrates a processing pipeline 2550 for a specific type of network performing OSI layer 2 forwarding (e.g., forwarding based on MAC address). The pipeline 2550 is the same as the pipeline 2450, except that the forwarding lookups stage 2465 is split into three stages 2555-2565. Each of these stages involves a separate forwarding table lookup, as shown in the forwarding tables 2505 of the managed switching element 2500.

The ingress ACL stage 2555 uses the 2L logical ingress port, as well as other fields stored in the packet header (e.g., MAC address, identifier of the 2L logical switching element, etc.) to make a decision about how to proceed with the packet. Some ACL operations include allowing the packet to continue with further processing, denying the packet (which will cause the switching element to discard the packet and cease further processing), and enqueuing the packet (e.g., sending the packet to a queue for Quality of Service purposes). The ACL tables may implement other functionalities as well, such as counters (i.e., counting the number of packets coming from a particular source address or to a destination address), port security (i.e., only allowing packets coming in through a particular port that originated at a particular machine), and machine isolation (i.e., only sending broadcast/multicast packets received from a particular machine to a particular set of machines).

The layer 2 logical forwarding stage 2560 performs the actual forwarding lookup that determines the logical 2L egress port for the packet. As this switching element is performing layer 2 forwarding, the forwarding table record bases the decision on the destination MAC address of the packet in some embodiments. Other embodiments performing layer 3 routing might make a forwarding decision based on the destination IP address of the packet.

The third stage of the processing pipeline 2550 performed at the second logical level is the egress ACL stage 2565. In general, the egress ACL forwarding table records may include the same operations (e.g., allow, deny, enqueue, etc.) as the ingress ACL forwarding table records, but are based on egress port information or a combination of ingress and egress port information. Some embodiments will only have either an ingress ACL table or an egress ACL table, while other embodiments include both tables. In addition, some embodiments may split forwarding or ACL tables into multiple tables. In some embodiments, depending on the nature of the ACL rules, the number of resulting lookup entries may be decreased when what could be treated as a single table is split up into several tables. For instance, certain more complicated ACL rules may benefit from such a split of the lookup entries into several tables.

Both FIG. 24 and FIG. 25 illustrate the switching element repeatedly sending packets to a dispatch port, effectively resubmitting the packet back into the switching element. In some embodiments, using software switching elements provides the ability to perform such resubmissions of packets. Whereas hardware switching elements generally involve a fixed pipeline (due, in part, to the use of an application-specific integrated circuit (ASIC) to perform the processing), software switching elements of some embodiments can extend a packet processing pipeline as long as necessary, as there is not much of a delay from performing the resubmissions. In addition, some embodiments enable optimization of the multiple lookups for subsequent packets within a single set of related packets (e.g., a single TCP/UDP flow). When the first packet arrives, the managed switching element performs all of the lookups and resubmits (e.g., the 8 forwarding table records illustrated in FIG. 25) in order to fully process the packet. The switching element then caches the end result of the decision (in the above case, the addition of the particular 2L and 1L egress contexts to the packet, and the next-hop forwarding decision out a particular port over a particular tunnel) along with a unique identifier for the packet that will be shared with all other related packets (i.e., a unique identifier for the TCP/UDP flow). Some embodiments push this cached result into the kernel of the switching element for additional optimization. For additional packets that share the unique identifier (i.e., additional packets within the same flow), the switching element can use the single cached lookup that specifies all of the actions to perform on the packet. Once the flow of packets is complete (e.g., after a particular amount of time with no such packets), in some embodiments the switching element flushes the cache.

D. Additional Aspects of Federated Networks

The above examples illustrate various cases in which two first level domains (i.e., first level logical datapath sets) are interconnected via a second level logical datapath set. However, this is not the only situation in which a network operator may use multiple levels of hierarchical logical datapath sets. For example, there might be more than two first level domains that are all connected by a second level logical datapath set, more than two levels of logical datapath sets, or even one first level logical datapath set split into several second level logical datapath sets.

1. Several 1L Domains

Figure 26:
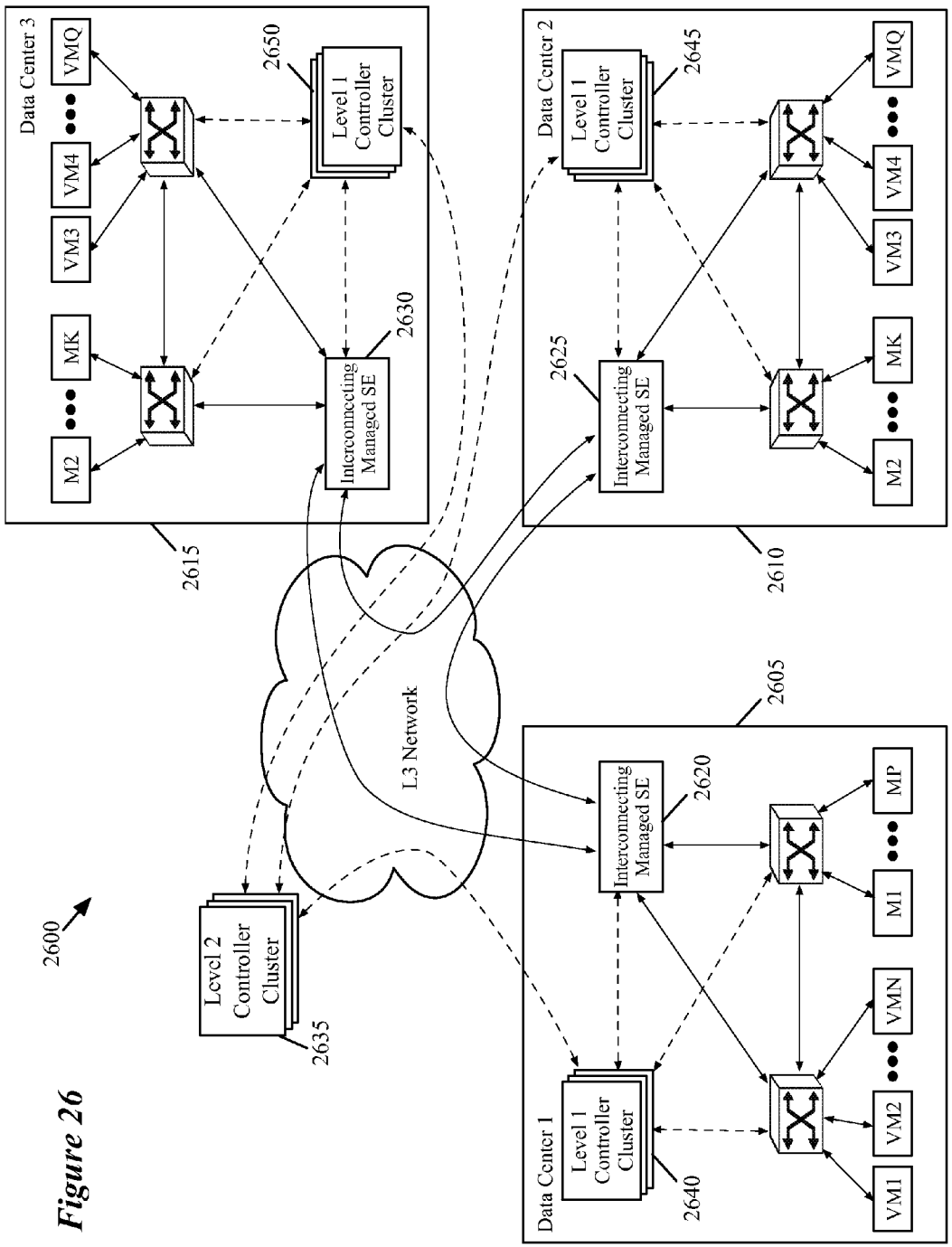
FIG. 26 illustrates a network with three separate data centers.

FIG. 26 illustrates a network 2600 with three separate data centers 2605, 2610, and 2615. These three data centers 2605-2615 are similar to the data centers described in FIG. 12, with each center having a set of end machines (either virtual or physical machines), a set of edge managed switching elements, an interconnecting managed switching element at the edge of the data center, and a first level controller cluster for implementing first level logical switching elements within the managed switching elements at the data center.

In this case, the interconnecting managed switching elements form a full mesh. That is, the switching element 2620 at the first data center 2605 connects to the switching element 2625 at the second data center 2610 and the switching element 2630 at the third data center 2615 through the external network, without having to go through one of the other data centers. In addition, the managed switching element 2625 connects to the switching element 2630 through the external network, without traveling through the data center 2605.

In addition, the network 2600 includes a second level controller cluster 2635. This controller cluster 2635 connects to first level controller clusters 2640, 2645, and 2650 at the three different data centers. In this case, the second level controller 2635 is shown as situated outside of any of the data centers, but as with the second level controllers in FIGS. 12-14, the controller 2635 may be situated in one of the data centers, or all three domains could be in a single data center with the second level controller in some embodiments.

Figure 27:
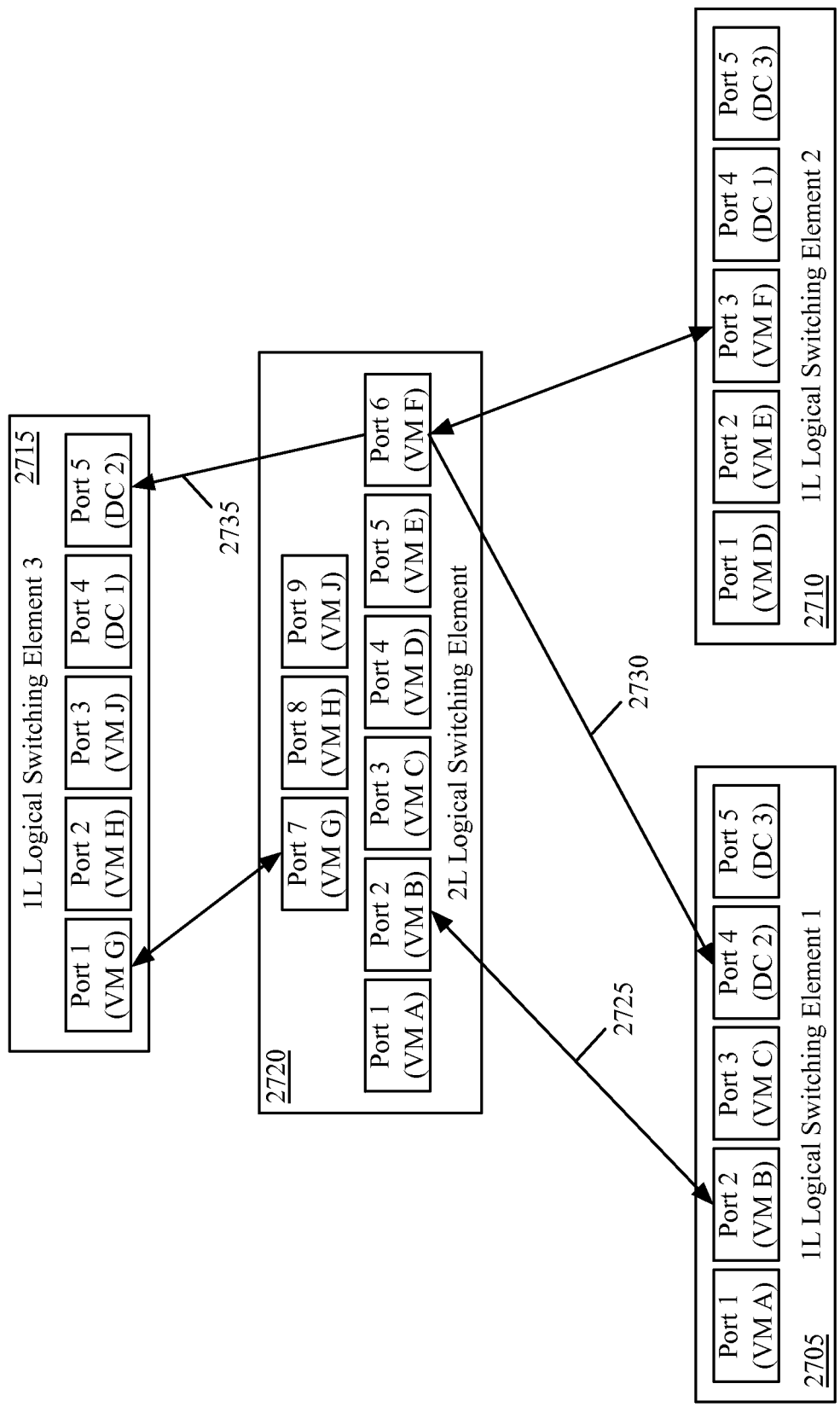
FIG. 27 illustrates three 1L logical datapath sets connected by a 2L logical datapath set, along with some of the port mappings performed during packet processing by the logical switching elements as implemented in the managed switching elements of the network shown in FIG. 26.

FIG. 27 illustrates three 1L logical datapath sets (or logical switching elements) connected by a 2L logical datapath set, along with some of the port mappings performed during packet processing by the logical switching elements as implemented in the managed switching elements of the network. As shown, this figure illustrates a first 1L LDPS 2705, a second 1L LDPS 2710, and a third 1L LDPS 2715. Each of these 1L LDPS has five ports: three ports for VMs within their local network, and two ports for connecting to the other 1L LDPS. As there are nine machines on the overall network, the 2L LDPS 2720 includes nine ports.

The various arrows shown in FIG. 27 represent ingress and egress context mappings performed by forwarding tables of managed switching elements implementing the logical switching elements 2705-2720 while processing packets. For instance, a first arrow 2725 between Port 2 of the 1L LDPS 2705 and the 2L LDPS 2720 indicates that switching elements may perform both ingress mappings (from 1L ingress port to 2L ingress port) and egress mappings (from 2L egress port to 1L egress port) between these two ports. On the other hand, the unidirectional arrows 2730 and 2735 indicate that switching elements may perform egress context mappings from Port 6 of 2L LDPS 2720 to either Port 4 of 1L LDPS 2705 or Port 5 of 1L LDPS 2715, but do not perform ingress mappings from the 1L LDPS ports facing external networks to 2L ports. Packets only originate at these ports from the perspective of the 1L logical switching element (for packets incoming from other domains), but not from the 2L perspective (from the 2L perspective, the packets always originate at a source machine).

In some embodiments, machines on the 2L network may wish to send broadcast packets to all other machines in the network. However, such a setup can create a problem of having broadcast/multicast packets circulate in an infinite loop. For example, if VM A sends a broadcast packet, the source hypervisor will identify Port 1 as the logical ingress port (for both the 1L logical switching element 2705 and then the 2L logical switching element 2720). As this is a broadcast packet, the egress ports identified by the forwarding tables are Ports 2-9 of logical switching element 2720. However, three of these egress ports (Ports 4-6) map to Port 4 of the 1L logical switching element 2705 and three of the ports (Ports 7-9) map to Port 5 of the 1L logical switching element 2705, so essentially, the packet is broadcast to each of the 1L ports, two of which connect to remote data centers. When such a broadcast packet reaches the remote 1L logical switching element 2710 (via Port 4), this logical switching element will broadcast the packet to all of its other ports, including Port 5. Sending the packet to Port 5 of logical switching element 2710 will cause the packet to travel to Port 5 of the logical switching element 2715, which will in turn broadcast the packet to all of its ports, including Port 4. This sends the broadcast packet to Port 5 of the originating logical switching element 2705, which broadcasts it to all of its ports. In this way, two infinite loops are created, with packets traveling between the networks in both directions. With additional 1L domains, the problem can become even worse.

Figure 29:
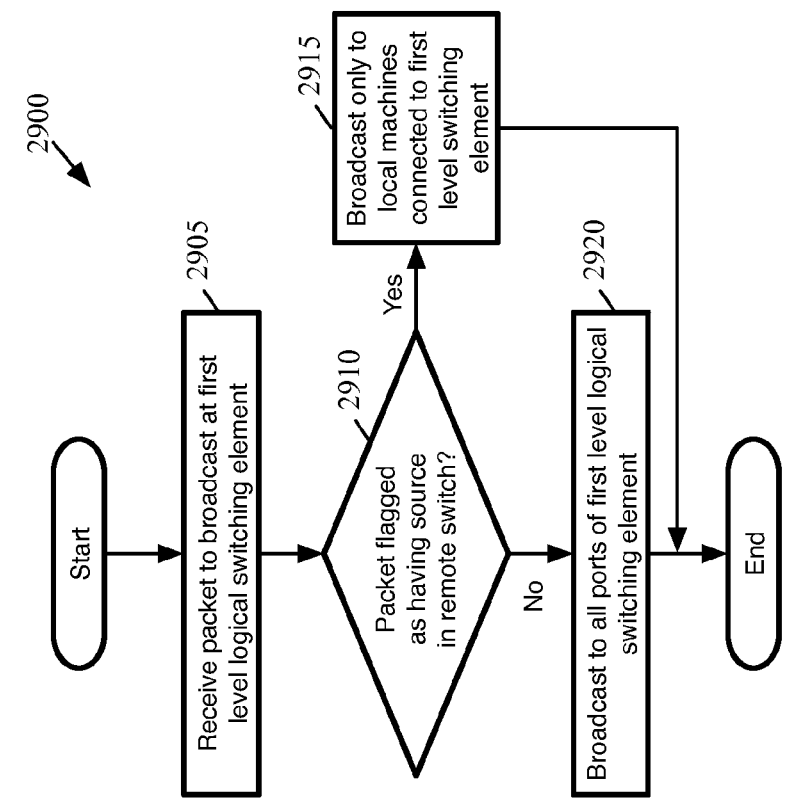
FIG. 29 conceptually illustrates a process of some embodiments for determining whether to broadcast a packet to all ports of a first level logical datapath set.
Figure 28:
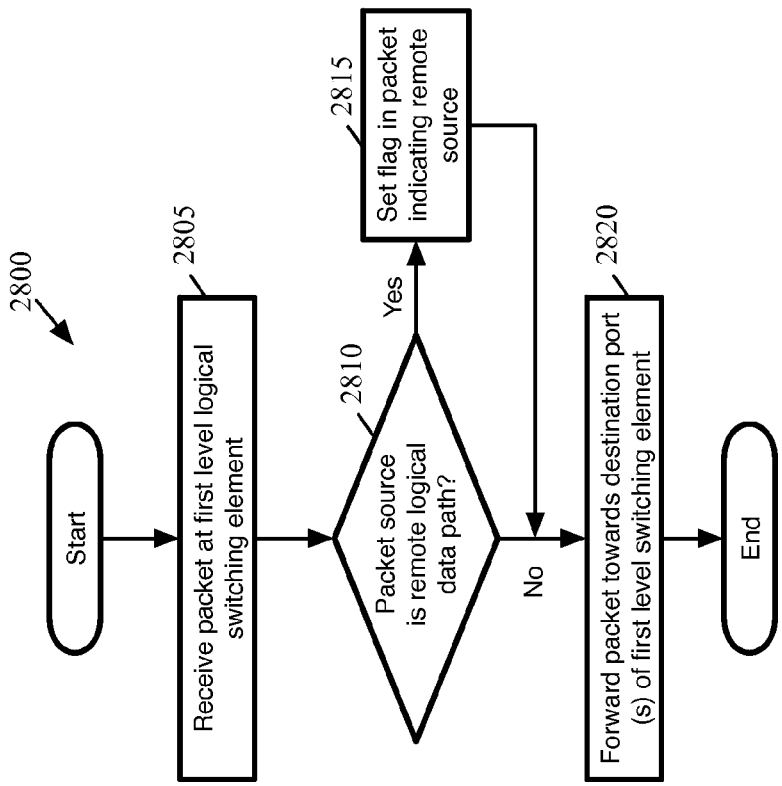
FIG. 28 conceptually illustrates a process of some embodiments for setting a flag upon receiving a packet.

Accordingly, different embodiments use different solutions to prevent such an infinite replication issue. For instance, some embodiments flag incoming broadcast packets to prevent such an infinite replication issue. FIGS. 28 and 29 conceptually illustrate processes of some embodiments for implementing such a flag to prevent broadcast replication.

FIG. 28 conceptually illustrates a process 2800 of some embodiments for setting a flag upon receiving a packet. As shown, the process begins by receiving (at 2805) a packet at a first level logical switching element. In some embodiments, this process is only performed at the interconnecting managed switching elements (e.g., extenders or pool nodes), because it is only at these switching elements where the replication problem occurs.

The process determines (at 2810) whether the source of the packet is a machine from a remote first level logical datapath set. This may be accomplished by checking the header of the packet in some embodiments. Other embodiments instead use the physical interface of the interconnecting switching element at which the packet was received (i.e., determine whether the packet was received at a port that faces an external network.

When the packet source is a remote machine, the process sets (at 2815) a flag in the packet to indicate the remote source. Some embodiments use a single bit (e.g., a default value of 0, and a value of 1 for remote-source packets). The process then forwards (at 2820) the packet towards one or more destination ports of the first level logical datapath set. While this process indicates the determination of whether a packet is a remote source as applied to all packets received at the managed switching element implementing the process, some embodiments do not apply a test to all packets received at the switching element. Instead, upon receiving a packet on a port that faces an external network, the switching element automatically applies the remote-source flag to the packet.

FIG. 29 conceptually illustrates a process 2900 of some embodiments for determining whether to broadcast a packet to all ports of a first level logical datapath set. As shown, the process begins by receiving (at 2905) a packet to broadcast (or multicast) at a first level logical switching element. In some embodiments, the process 2900 may be performed immediately after the process 2800 within a single managed switching element (i.e., when the process performs the forwarding decisions at 2820).

The process 2900 determines (at 2910) whether the packet is flagged as having a source in a remote first level logical switching element. As indicated above, this flag may be a single bit that has been set by either the current or a previous managed switching element in order to prevent infinite replication of broadcast packets in a federated network.

When the packet is flagged as such, the process broadcasts (at 2915) the packet only to local machines connected to the first level logical switching element. That is, in the example of FIG. 27, a broadcast packet received on Port 4 of the 1L LDPS 2705 with such a flag bit set would only be sent to Ports 1-3 of the 1L LDPS. On the other hand, when the packet is not flagged (e.g., if the packet is received from a machine local to the 1L logical switching element), the process broadcasts (at 2920) the packet to all ports of the first level logical switching element. The process then ends.

Figure 30:
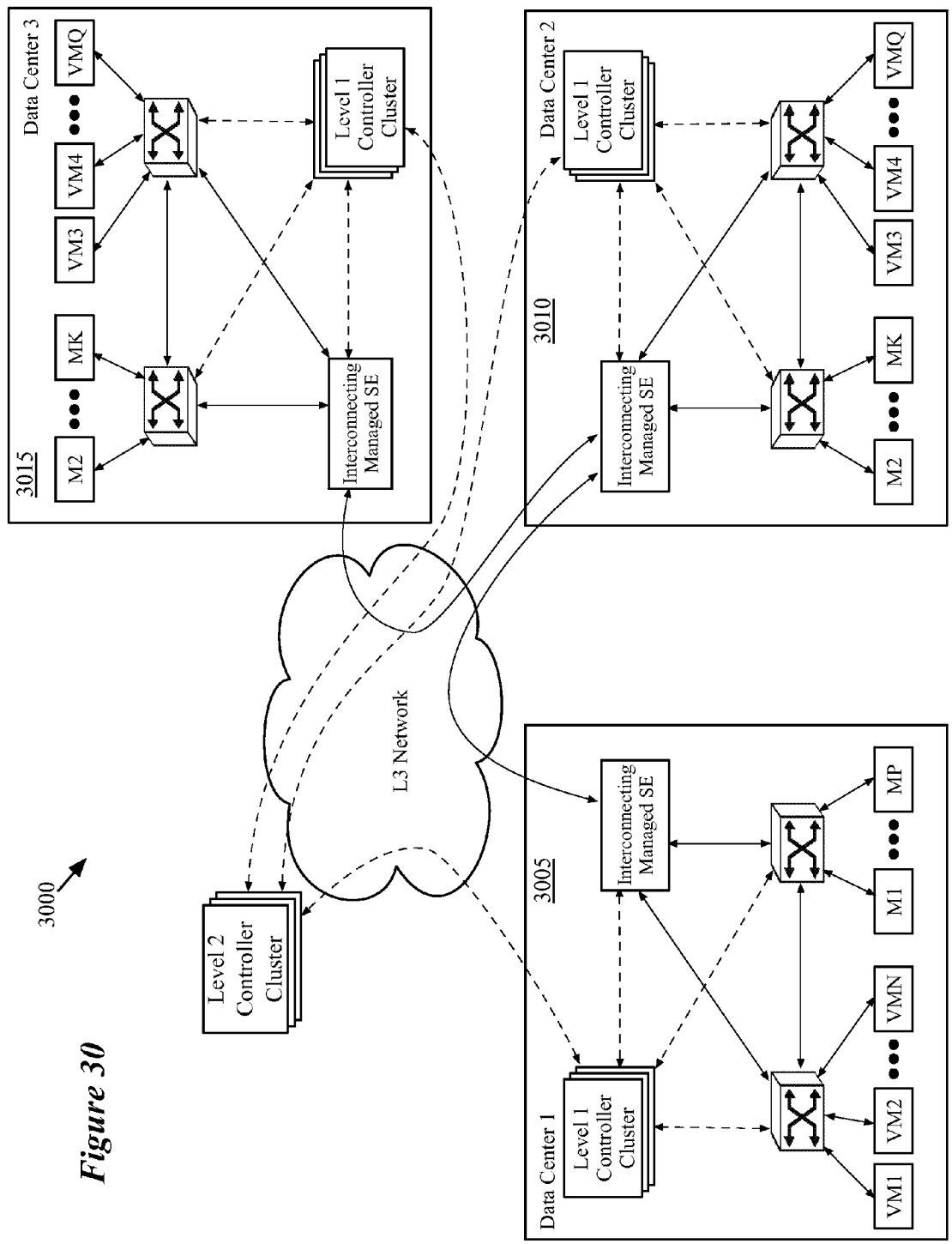
FIG. 30 conceptually illustrates a network in which various 1L domains are not fully connected.

This combination of processes will prevent the infinite replication problem without over-suppressing packets in the fully connected network such as is shown in FIG. 26. However, in some embodiments, the various 1L domains may not be fully connected. That is, packets originating in a first domain with a destination in a second domain may need to travel through a third domain. FIG. 30 conceptually illustrates such a network 3000. In this case, the first data center 3005 and the third data center 3015 do not have a direct connection. Instead, a packet traveling from the first data center 3005 to the third data center 3015 would need to travel through the second domain 3010. In this case, the processes shown in FIGS. 28 and 29 will prevent broadcast packets from one of the outer domains (1L networks 3005 and 3015) from reaching the other one of the outer domain. As such, some embodiments use a time to live (TTL) or other hop counter to prevent the infinite replication problem. That is, each packet can only be replicated either a particular number of times or for a particular time period before the packet is dropped.

2. Several Hierarchical Levels

Figure 31:
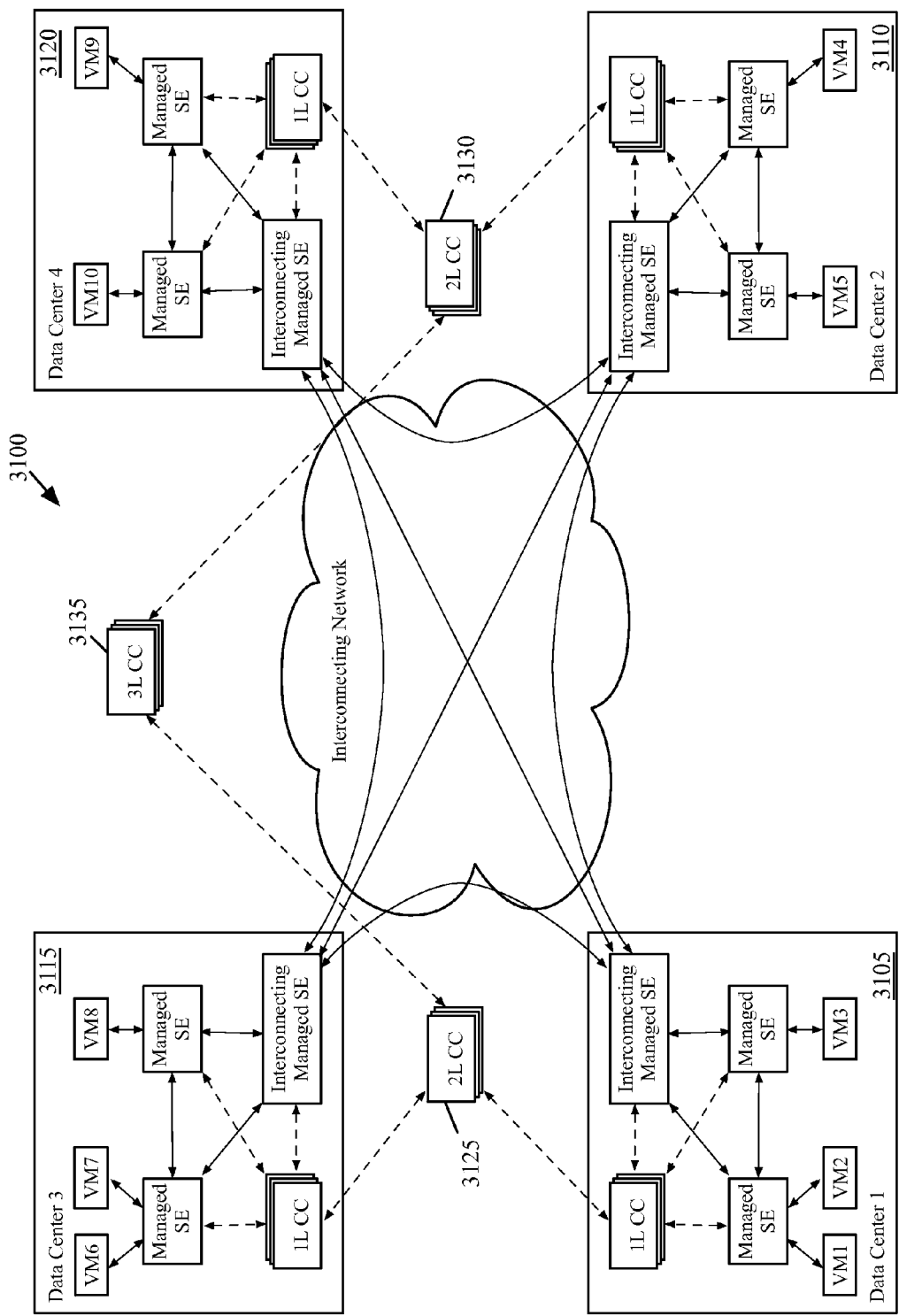
FIG. 31 illustrates a network with four data centers with three levels of network controller clusters.

While all of the previous examples illustrate two levels of hierarchical logical switching elements, the principles involved in mapping between logical ingress and egress ports of the different logical levels may be applied ad infinitum (restricted, of course, by packet sizes, limits of switch forwarding tables, and practicality). FIG. 31 illustrates a network 3100 with four data centers with three levels of network controller clusters. Specifically, the network 3100 includes a first 1L domain 3105, a second 1L domain 3110, a third 1L domain 3115, and a fourth 1L domain 3120. The first 1L domain 3105 and the third 1L domain 3115 together form a first 2L domain, controlled by a first 2L controller cluster 3125 (which may be located at one of the data centers, or external to both as shown). The second 1L domain 3110 and the fourth 1L domain 3120 together form a second 2L domain, controlled by a second 2L controller cluster 3130 (which may be located at one of the data centers, or external to both as shown). Finally, the two 2L controller clusters are controlled by a 3L controller cluster 3135, from which flow entries originate in the network 3100. Flow entries originate at the controller cluster 3135 (e.g., in response to user input, detection of a new end machine, etc.), and are pushed down to the 2L controller clusters 3125 and 3130, then from these controllers to the 1L controller clusters and from there to the managed switching elements.

Figure 32:
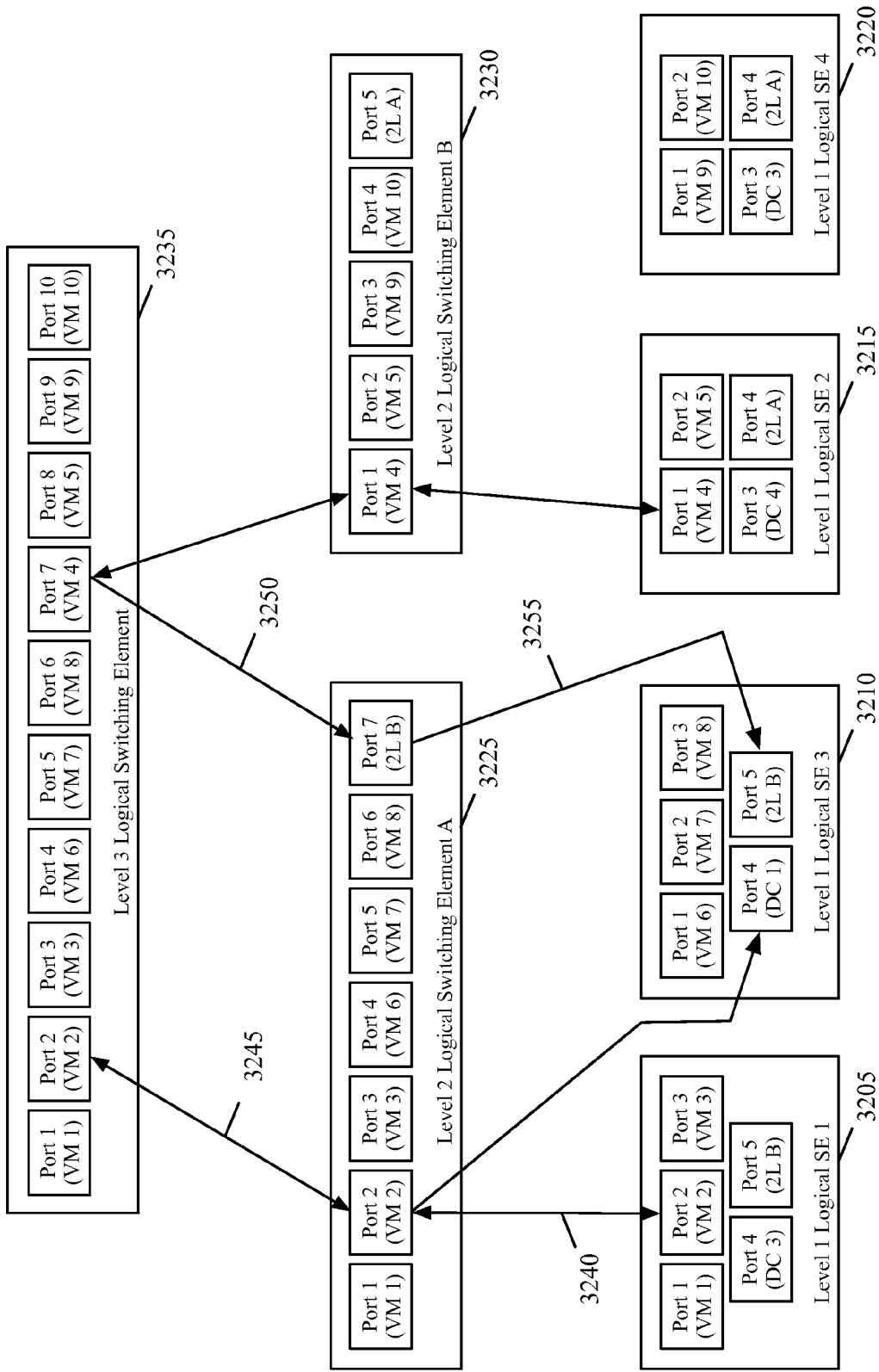
FIG. 32 conceptually illustrates three levels of logical switches implemented for the network of FIG. 31, as well as some of the mappings between the ports of these logical switches.

As shown, the first 1L domain 3105 and the third 1L domain 3115 includes three VMs each, while the second 1L domain 3110 and the fourth 1L domain 3120 include two VMs each. FIG. 32 conceptually illustrates the three levels of logical switching elements implemented for the network 3100, as well as some of the mappings between the ports of these logical switching elements.

The first 1L logical switching element 3205 includes three ports for the three VMs in this domain, as well as a fourth port for packets sent to and received from the other 1L domain within its 2L group (data center 3), and a fifth port for packets sent to and received from the other 2L domain (irrespective of which 1L domain within the other 2L domain). The other three 1L logical switching elements 3210, 3215, and 3220 have similar port arrangements. Some embodiments, however, include separate ports for each 1L domain in other 2L domains. In this case, the 1L logical switching element 3205 would include six logical ports, as Port 5 would be split into two ports, one for each of the 1L domains 3215 and 3220.

The first 2L logical switching element 3225 includes six ports for the six VMs in this domain, as well as a seventh port for packets sent to and received from the other 2L domain. The other 2L logical switching element 3230 includes a similar port arrangement, though with only five ports rather than seven. Finally, the 3L logical switching element 3235 includes ten ports, one for each of the VMs in the network. While this illustrates a three-level hierarchy, in some embodiments the 3L logical switching element 3235 could have a port for packets sent to and received from another 3L domain, connected together via an 4L logical switching element.

This figure also illustrates some of the ingress and egress context mappings performed by the managed switching elements of the network 3100 according to flow instructions received from the network controllers, with ingress mappings flowing from lower levels to higher levels, and egress mappings flowing in the opposite direction. For instance, the arrows 3240 and 3245 indicates that packets sent from VM 2 will be mapped (ingress) from Port 2 of the 1L logical switching element 3205 to Port 2 of the 2L logical switching element 3225, and then to Port 2 of the 3L logical switching element 3230, and in the opposite direction for egress mapping of packets directed towards VM 2, once within the domain of the respective switching elements. For packets directed from one of the VMs 6, 7, or 8 (within the domain of the 1L logical switching element 3210) to VM 2 (or one of VMs 1 and 3), packets will be egress mapped at the source managed switching element to Port 4 of the logical switching element 3210. For packets originating at a VM on the 1L logical switching element 3210 directed towards one of VMs 4, 5, 9, or 10, the source managed switching element will map the egress port of the 3L logical switching element 3235 (one of Ports 7-10) to Port 7 of the 2L logical switching element 3225, and then to Port 5 of the 1L logical switching element 3210, as shown by arrows 3250 and 3255.

3. Slicing a First Level Datapath

In the federated network examples illustrated above, multiple first level logical datapath sets are connected together via a single second level logical datapath set. However, in some situations, a single first level logical datapath set might be sliced into several logical datapath sets at the second level. As one example, a service provider might host numerous users (e.g., tenants) on its network of virtual machines, exposing a single logical datapath set for each user. However, if a user has multiple departments, each with their own set of virtual machines, and wants to give these departments separate control of their machines, then some embodiments allow the first level datapath to be sliced into multiple second level datapaths. In some embodiments, this slicing may be accomplished using mechanisms present in the more standard federated case (e.g., by matching a particular ingress port of an 1L LDPS to a particular ingress port of a particular 2L LDPS. As will be described, the difference in this case is that different ingress ports on the same 1L LDPS will match to different 2L LDPS.

Figure 33:
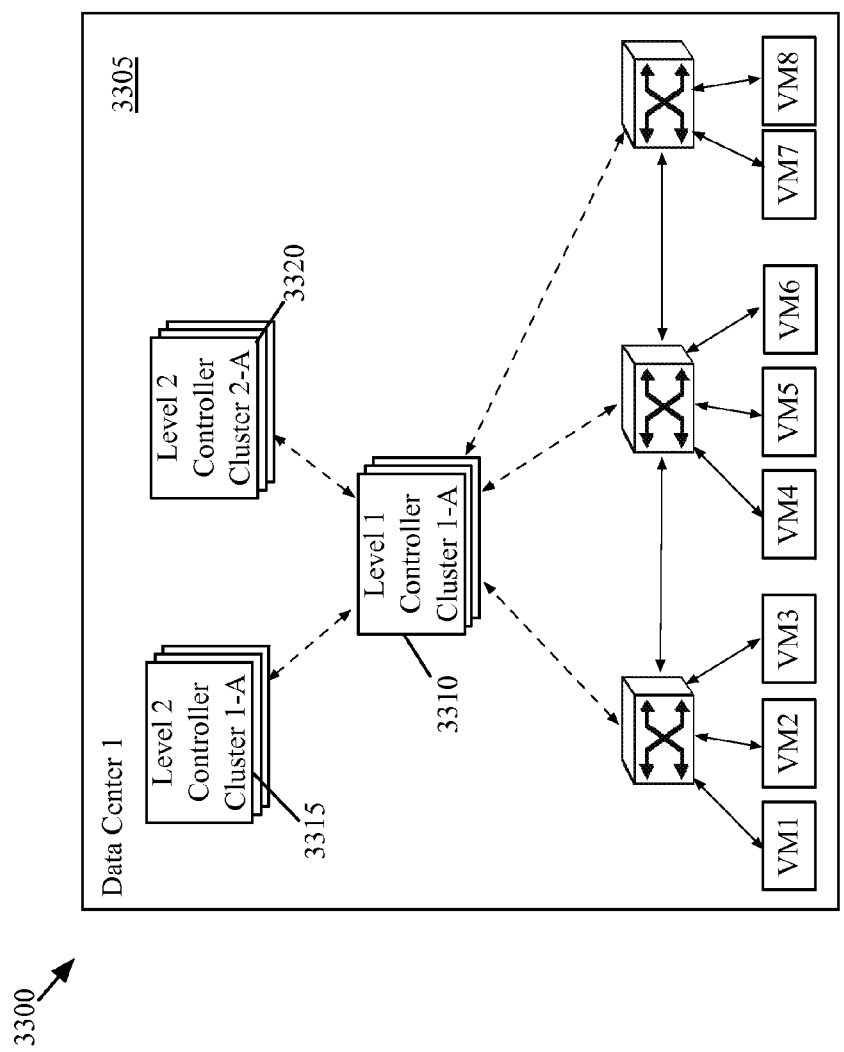
FIG. 33 conceptually illustrates network that allows the first level datapath to be sliced into multiple second level datapaths.

FIG. 33 conceptually illustrates a network 3300 that uses such a slicing approach. The network 3300 includes three managed switching elements for connecting eight virtual machines within a data center 3305. The data center 3305 includes a single first level network controller cluster 3310. Connected to this first level controller cluster 3310 are two separate second level controller clusters 3315 and 3320. These second level clusters each separately generate flow entries that are pushed down to the single first level controller 3310. The first level controller includes these received flows within the first level flows pushed to the managed switching elements. Within these first level flows are lookups that identify which ports of the first level logical switching element match to the different second level logical switching elements.

Figure 34:
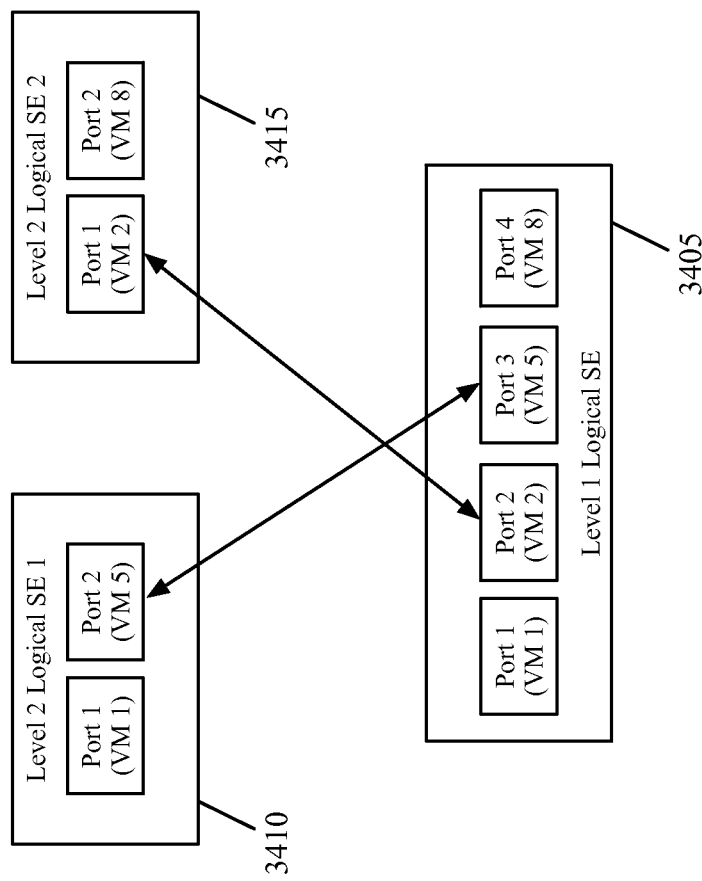
FIG. 34 conceptually illustrates example logical switches for the network in FIG. 33.

FIG. 34 conceptually illustrates example logical switching elements for the network 3300. In this case, only four of the eight VMs shown are part of the logical network. Thus, the 1L LDPS 3405 has four ports, one for each of these VMs. Because there are no VMs in the network external to this 1L domain, the 1L logical switching element 3405 has only these four ports, and no ports facing an external logical network. Each of the second level logical switching elements has two ports—VMs 1 and 5 are on the first 2L logical switching element 3410, while VMs 2 and 8 are on the second 2L logical switching element 3415. While VMs 1 and 8 are on two different second level logical switching elements, they are on the same first level logical switching element and therefore could theoretically exchange packets within the 1L domain. However, if the owner (e.g., department) of the 2L logical datapath set 3410 wished to isolate its VMs from those on other 2L datapaths, this could be easily implemented through the 2L ACL tables (e.g., using port security and machine isolation techniques), which are sent to the 1L controller cluster and implemented by the managed switching elements.

In some embodiments, enabling the 1L logical datapath set to be used as a platform for multiple 2L logical datapath sets requires similar techniques to the use of multiple 1L LDPS on a physical network. That is, just as the 1L flows require ingress context matching to identify that a particular physical machine belongs to a particular 1L LDPS, the 2L flows require ingress context matching to identify that a particular port of an 1L LDPS belongs to a particular 2L LDPS, as opposed to other 2L LDPS. This requires that the 1L LDPS has to support such matching in its logical pipeline abstraction.

For a typical single-level (i.e., non-federated) logical network, in some embodiments the packet processing in the 1L LDPS's operations requires matching over packet headers, as well as the slice. Therefore, the physical switching element needs to support matching over a 1L LDPS slice/context ID, and packet headers. In general, implementing a second level logical datapath set on top of this requires the physical switching element to support matching over the 1L LDPS slice/context ID, a 2L slice/context ID, and the packet headers. This can be implemented as a nested structure, with each 1L LDPS slice holding a set of 2L LDPS slices.

In the runtime packet processing, initially there is no slicing. When a managed switching element receives a packet, the switching element initially identifies the first slice (1L LDPS). In some embodiments, the switching element loads the 1L LDPS context/slice id into a register and scopes subsequent matches into the 1L LDPS. While doing this, the switching element removes the frontmost encapsulation header and saves any information into a register for the 1L LDPS. The 1L LDPS then proceeds to its logical lookup tables (though there may be additional lookups at this level, not discussed above). These lookups identify the 2L LDPS and save this result into another register in some embodiments. In addition, the managed switching element removes the frontmost encapsulation header and saves any information into a register for the 2L LDPS. Next, the matches are scoped into the 1L and 2L LDPS. After the various 2L LDPS lookups (e.g., ACL tables, forwarding, etc.) are complete, the packet begins traversing back towards the physical: once 2L LDPS processing finishes, the managed switching element saves its forwarding decision into a packet header by adding a new encapsulation. Similarly, once the 1L LDPS processing finishes, the switching element saves this result into the header by adding an encapsulation to the front of packet.

III. Interconnecting Disparate Networks

The above section describes the interconnection of managed networks (e.g., networks such as those described in Section I). In some cases, however, a network manager will want to provide connections between a first network segmented using a first tagging or tunneling technique (e.g., VLAN, Mac-in-Mac, L2 over L3, MPLS, etc.) and a second network segmented using a second tagging or tunneling technique. Even when the two networks use the same technique (e.g., both networks use VLANs), the implementation of that technique (e.g., the structure of the tags used in packet headers) may be different between the two networks such that they are effectively using two different techniques.

Some embodiments provide a mechanism for connecting such disparate networks across a common interconnecting network (e.g., an L3 network) that can forward traffic between the disparate networks. To connect such networks, some embodiments use a single managed interconnection switching element (e.g., an extender) at the edge of each of the segmented networks, then manage these interconnection switching elements with a network controller cluster that defines a logical datapath set between the sites.

A. Network Structure

1. Single Logical Layer

Figure 35:
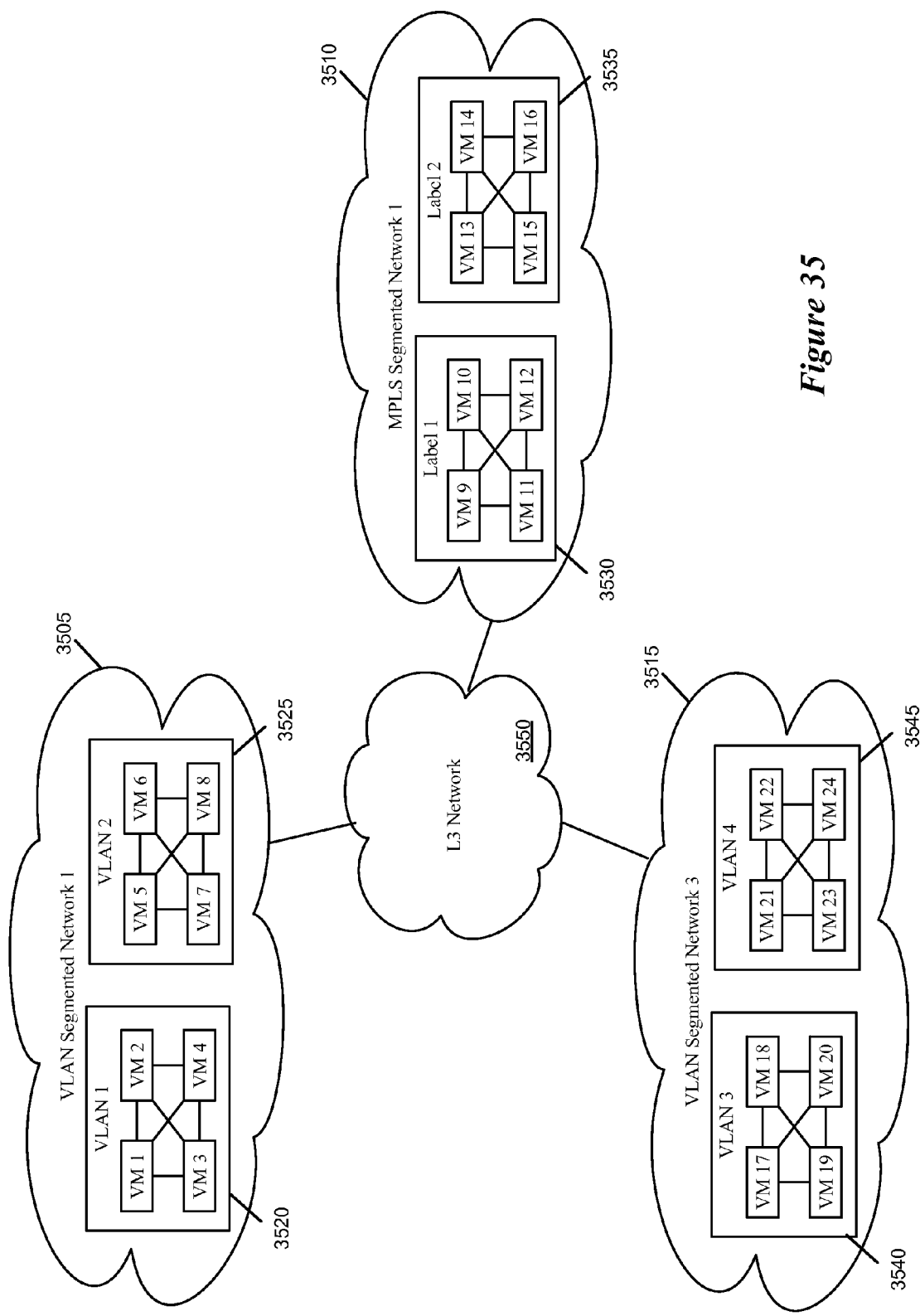
FIG. 35 conceptually illustrates three separate segmented networks.

FIG. 35 conceptually illustrates three separate segmented networks 3505, 3510, and 3515. The networks 3505 and 3515 are each segmented into two VLANs using VLAN tagging (network 3505 segmented into VLANs 3520 and 3525, and network 3515 segmented into VLANs 3540 and 3545), while the network 3510 is segmented into two labels 3530 and 3535 using MPLS labeling. The figure illustrates that these networks 3505-3515 are each connected to an L3 network 3550. However, simply being connected to a common physical network does not necessarily provide the end machines in the different segments with the ability to communicate with each other.

These three separate networks could be all owned and operated completely independently, without requiring any interconnection. However, the owner(s) of either the physical networks or the virtual machines on the networks might wish for their machines to have the ability to communicate with each other. For instance, if a first organization that owns the segmented network 3505 and uses a first type of VLAN tagging merges with a second organization that owns the segmented network 3515, the merged organization might want their IT departments (e.g., VLAN 1 3520 and VLAN 4 3545) to be able to communicate as though all the machines were on a single L2 network.

Figure 36:
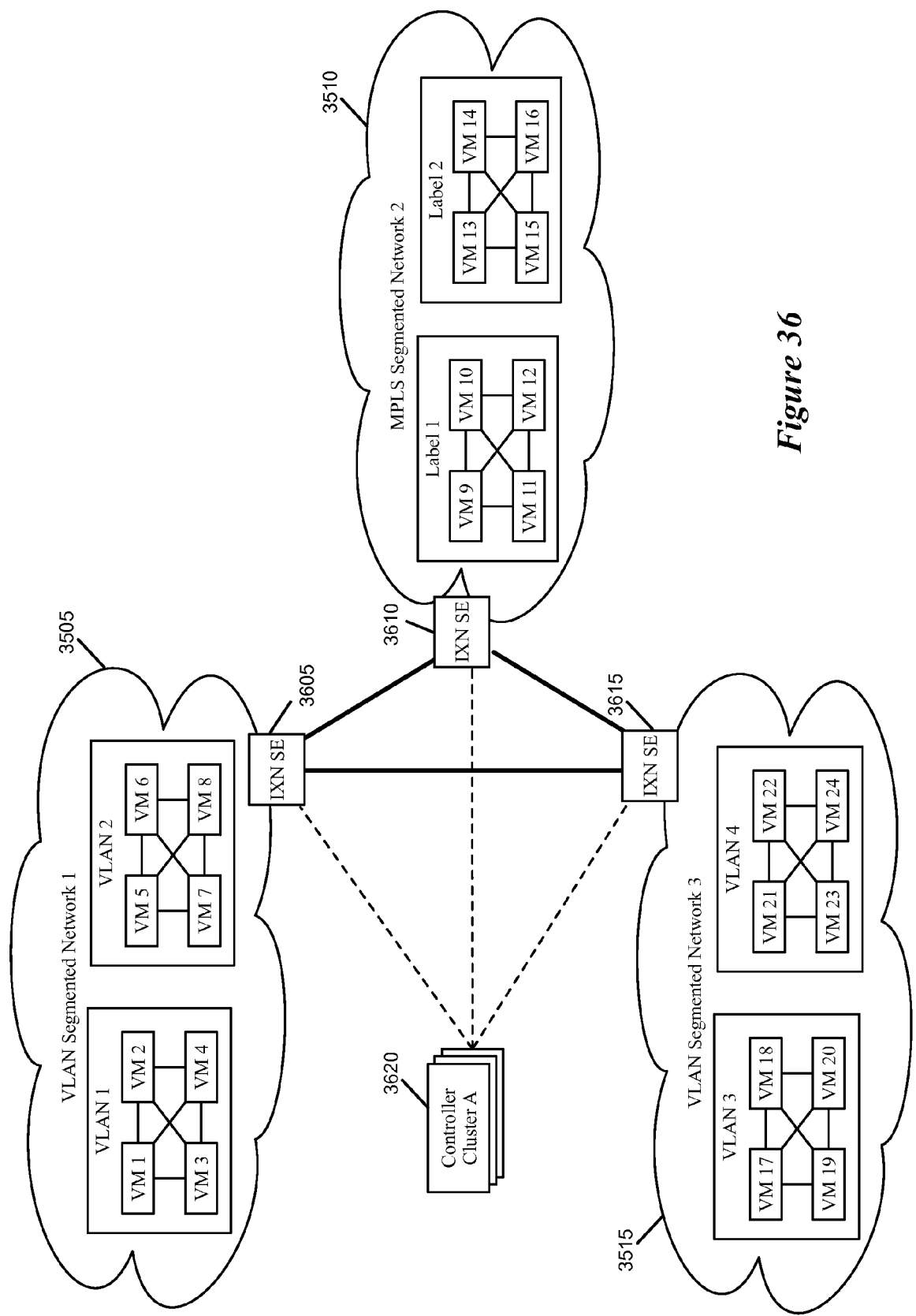
FIG. 36 conceptually illustrates a solution for the networks in FIG. 35 that locates an interconnection switching element at the edge of each of the segmented networks, then manages these interconnection switching elements with a network controller cluster.

In order to enable communication between network segments at different locations, some embodiments locate an interconnection switching element, such as an extender, at the edge of each of the segmented networks, then manage these interconnection switching elements with a network controller cluster. FIG. 36 conceptually illustrates such a solution for the networks 3505-3515. This figure illustrates that three interconnection managed switching elements 3605, 3610, and 3615 have been located at the edges of the three segmented networks 3505-3515.

The three interconnecting managed switching elements 3605-3615 are managed by a network controller cluster 3620, which may be a single network controller or several controllers that share information. This controller cluster is similar to those described above (e.g., with a control application and virtualization application). However, where the ports of the logical switching element defined by a network controller instance 610 or 1215 face end machines (either virtual or physical), the ports of the logical switching element defined by the controller 3620 face network segments (e.g., a particular VLAN at a particular site).

Figure 37:
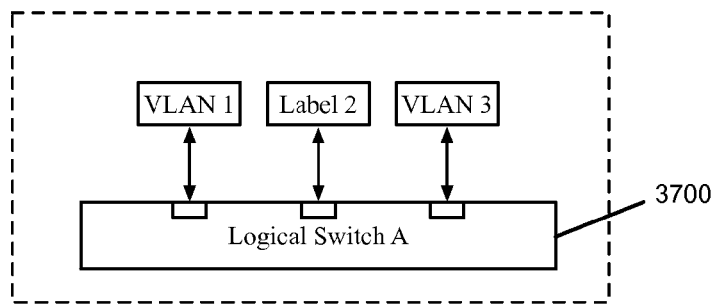
FIG. 37 conceptually illustrates a logical switching element defined by the network controller cluster in FIG. 36 and implemented by the three interconnection managed switching elements in FIG. 36.

FIG. 37 conceptually illustrates a logical switching element 3700 defined by the network controller cluster 3620 and implemented by the three interconnecting managed switching elements 3605-3615. As shown, each of the ports of the logical switching element 3700 faces one of the network segments from FIG. 35. The VLAN 1 3520 connects to Port 1, the MPLS Label 2 3535 connects to Port 2, and the VLAN 3 3540 connects to Port 3 of the logical switching element 3700. The interconnection switching elements 3605-3615 that implement the logical switching element 3700 store forwarding tables that include flow entries pushed down from the network controller that specify how to remove network segmentation headers (e.g., VLAN tags, MPLS labels, etc.)

for outgoing packets, apply security policies, forward packets between the interconnection switching elements, and insert network segmentation headers for incoming packets. The details of how these flow entries are generated by the network controller and pushed down to managed switching elements, as well as the details of processing packets by the managed switching elements, are described in the sections below.

Figure 38:
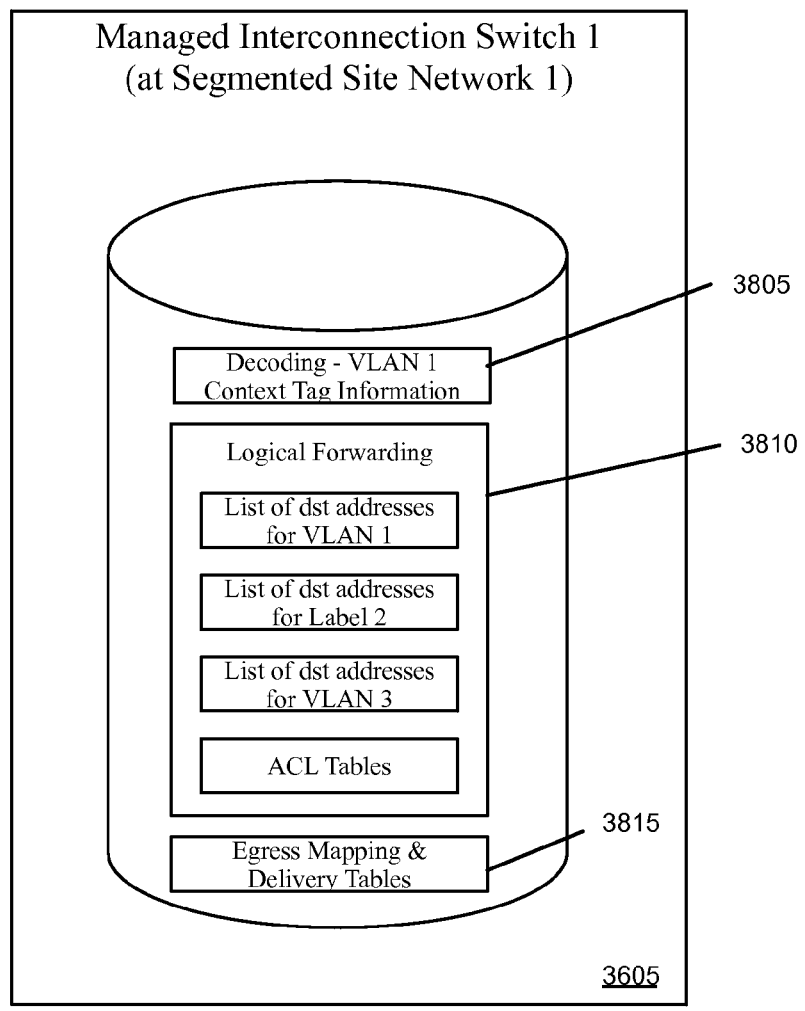
FIG. 38 conceptually illustrates information stored in a managed switching element for interconnecting segmented networks.

FIG. 38 conceptually illustrates information stored in a managed switching element for interconnecting segmented networks. Specifically, this figure shows information stored in the tables of the managed switching element 3605, at the edge of the segmented network 3505. The managed switching element tables include decoding information 3805, logical forwarding information 3810, and egress mapping information 3815.

The decoding information 3805, along with additional information (e.g., the port on which a packet arrived), enables the managed interconnection switching element to determine the logical context of a packet exiting the local segmented network (i.e., the segmented network at the edge of which the switching element is located). In this situation, the decoding information 3805 stores information regarding the VLAN 1 context tag information, which allows the interconnection switching element to identify a packet as originating at a machine in VLAN 1. In some embodiments, this decoding information also specifies how to add VLAN 1 information for packets incoming to network 3605 from a remote network, and destined for a machine on VLAN 1.

The logical forwarding information 3810 implements the logical switching element 3700, enabling the switching element 3605 to perform logical forwarding decisions between the different networks on the logical switching element. As shown, the information 3810 includes lists of destination addresses for the different segmented networks connected to the logical switching element 3700. The switching element uses this information to identify a logical port to which a packet should be forwarded (by identifying the destination address in one of the lists). In addition, any ACL tables for implementing security policy are contained within the logical forwarding tables 3810.

Finally, the switching element stores egress mapping and delivery tables 3815, which specifies how a packet with a given logical destination (e.g., VLAN 3) is delivered to a next hop. This information includes tunnel information (e.g., specifying tunnels defined across the interconnecting network between the different managed switching elements) as well as physical port mapping information to identify the physical port of the switching element through which an outgoing packet should be sent.

Figure 39:
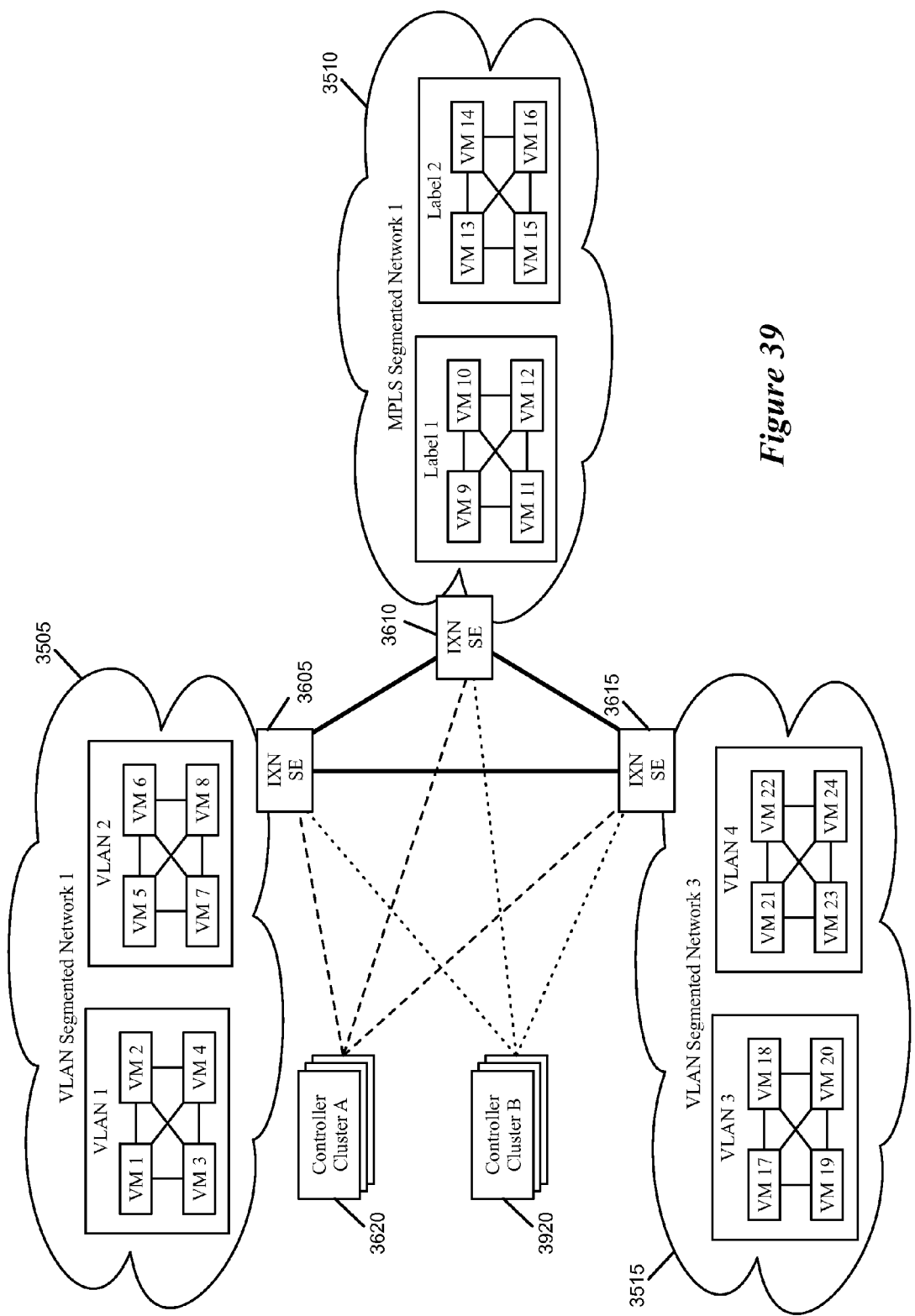
FIG. 39 illustrates a scenario for the networks in FIG. 35 in which two different network controllers generate flow entries for two different logical networks, and push the flows to the same switching elements.

Just as the physical switching elements in a data center may implement several logical switching elements simultaneously (e.g., between different users' VMs), the physical managed switching elements interconnecting different segments of networks may also implement several logical switching elements. FIG. 39 illustrates a scenario for the networks 3505-3515 in which two different network controllers 3620 and 3920 generate flow entries for two different logical networks, and push the flows to the same switching elements 3605-3615. As shown, in this case both of the controllers connect to all three switching elements, but in some embodiments a first network controller cluster might control first, second, and third switching elements at the edges of first, second, and third networks, while a second network controller cluster controls the first switching element as well as a fourth switching element at the edge of a fourth network, or other similar possibilities.

Figure 40:
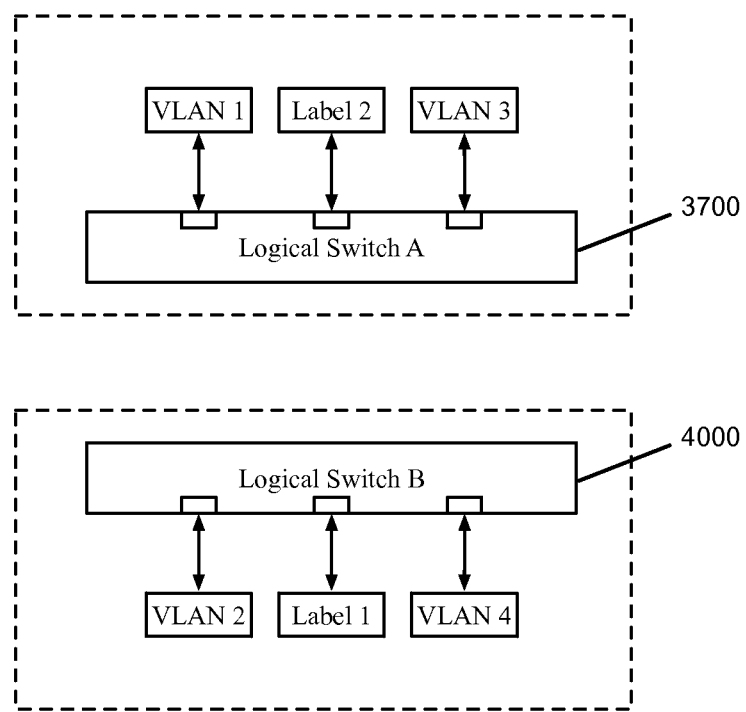
FIG. 40 conceptually illustrates logical switching elements defined by the network controller clusters, respectively, and implemented by the three interconnecting managed switching elements.

FIG. 40 conceptually illustrates the logical switching elements 3700 and 4000 defined by the network controller clusters 3620 and 3920, respectively, and implemented by the three interconnecting managed switching elements 3605-3615. The logical switching element 3700 is described above. The logical switching element 4000 also has three ports that each face a network segment from FIG. 35. In this case, the VLAN 2 3525 connects to Port 1, the MPLS Label 1 3530 connects to Port 2, and the VLAN 4 3545 connects to Port 3 of the logical switching element 4000.

Figure 41:
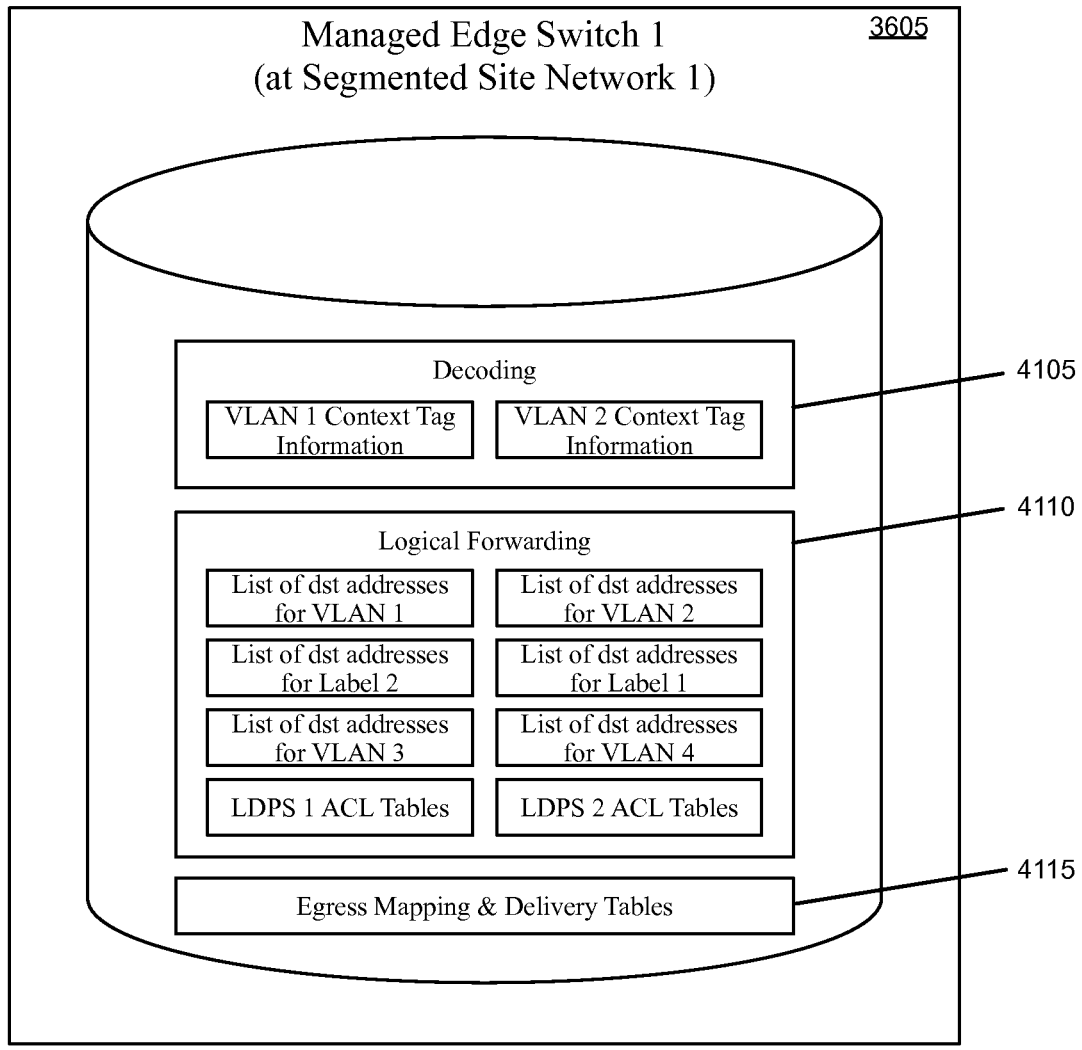
FIG. 41 conceptually illustrates information stored in a managed switching element for interconnecting the segmented networks on the two logical switching elements.

FIG. 41 conceptually illustrates information stored in the managed switching element 3605 for interconnecting the segmented networks on the two logical switching elements 3700 and 4000. In this case, the switching element essentially stores two sets of information. The decoding information 4105 includes context tag information for both of the VLANs in the network 3505, as both are on logical datapath sets. Similarly, the logical forwarding information 4110 implements both of the logical switching elements 3700 and 4000, including all of the information shown in the forwarding tables 3810 as well as corresponding information implementing the logical switching element 4000. The flow entries for these tables are received separately from the two different network controllers, and are also generated separately (from the received physical control plane data to the stored physical forwarding plane data) by the managed switching element.

Finally, the egress mapping and delivery tables 4115 includes some overlapping information used for transmitting packets on either of the two logical switching elements in some embodiments. For instance, packets may use the same tunnels between the physical switching elements irrespective of to which logical switching element the packet is assigned.

2. Several Logical Layers

The above examples illustrate a situation in which several segmented networks are connected at a single logical layer. That is, a single logical switching element is defined by a network controller cluster, and this logical switching element contains a single port for each of the network segments. In some embodiments, the principles described above in Section II, for hierarchically arranging networks using multiple levels of controller clusters and logical datapath sets, can be applied to the problem of interconnecting several segmented networks.

Figure 42:
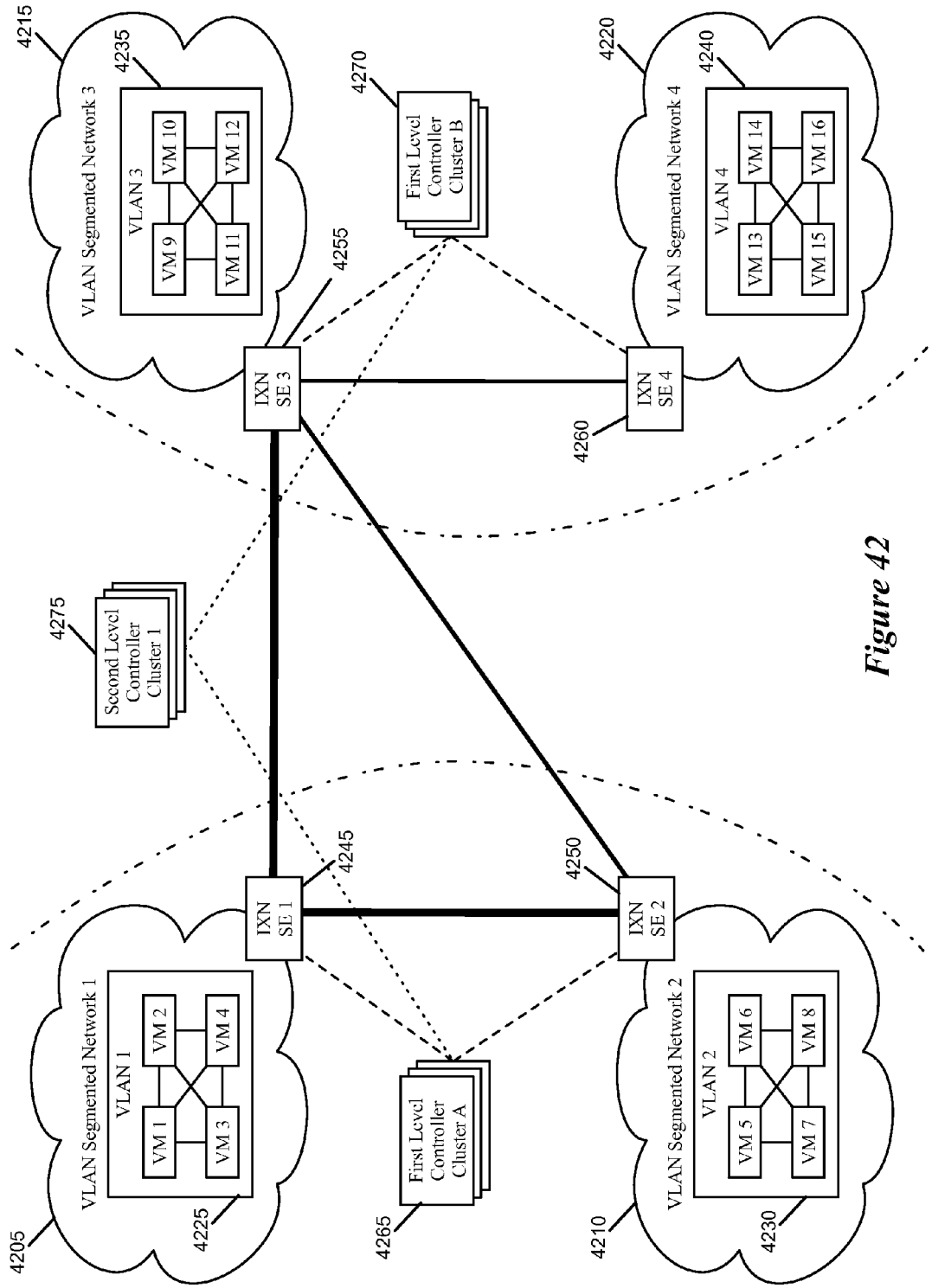
FIG. 42 conceptually illustrates four segmented networks connected using multiple logical layers.

FIG. 42 conceptually illustrates four segmented networks 4205-4220 (for simplicity, illustrating only one VLAN at each network), connected using multiple logical layers. As shown, the network 4205 contains a VLAN 1 4225, and has a managed interconnecting switching element 4245 at its edge. The network 4210 contains a VLAN 2 4230, and has a managed interconnecting switching element 4250 at its edge. The network 4215 contains a VLAN 3 4235, and has a managed interconnecting switching element 4255 at its edge. Finally, the network 4220 contains a VLAN 4 4240, and has a managed interconnecting switching element 4260 at its edge.

In this example, however, there is no single controller cluster that connects to each of the physical switching elements 4245-4260 to generate the flows for those switching elements. Instead, the first and second switching elements 4245 and 4250 are controlled by a first first-level controller cluster 4265 and the third and fourth switching elements 4255 and 4260 are controlled by a second first-level controller cluster 4270. As such, a first logical switching element routes packets between machines on VLAN 1 4225 and machines on VLAN 2 4230, while a second logical switching element routes packets between machines on VLAN 3 4235 and machines on VLAN 4 4240.

In addition, the provider of the interconnecting services (e.g., the owner of the four networks being interconnected) may want the ability to connect all four of the VLANs 4225-4240 together. As such, a second level controller cluster 4275 is introduced in order to handle connect the two logical datapath sets defined by the first level controllers. As in the case of federation between managed networks described above, the second level controller cluster 4275 generates flow entries defining the second level logical switching element, that are passed down to the two first level controller clusters 4265 and 4270, which generate their own flow entries (that implement the flows received from the second level controller cluster) and pass these flows to their respective managed interconnection switching elements.

Figure 43:
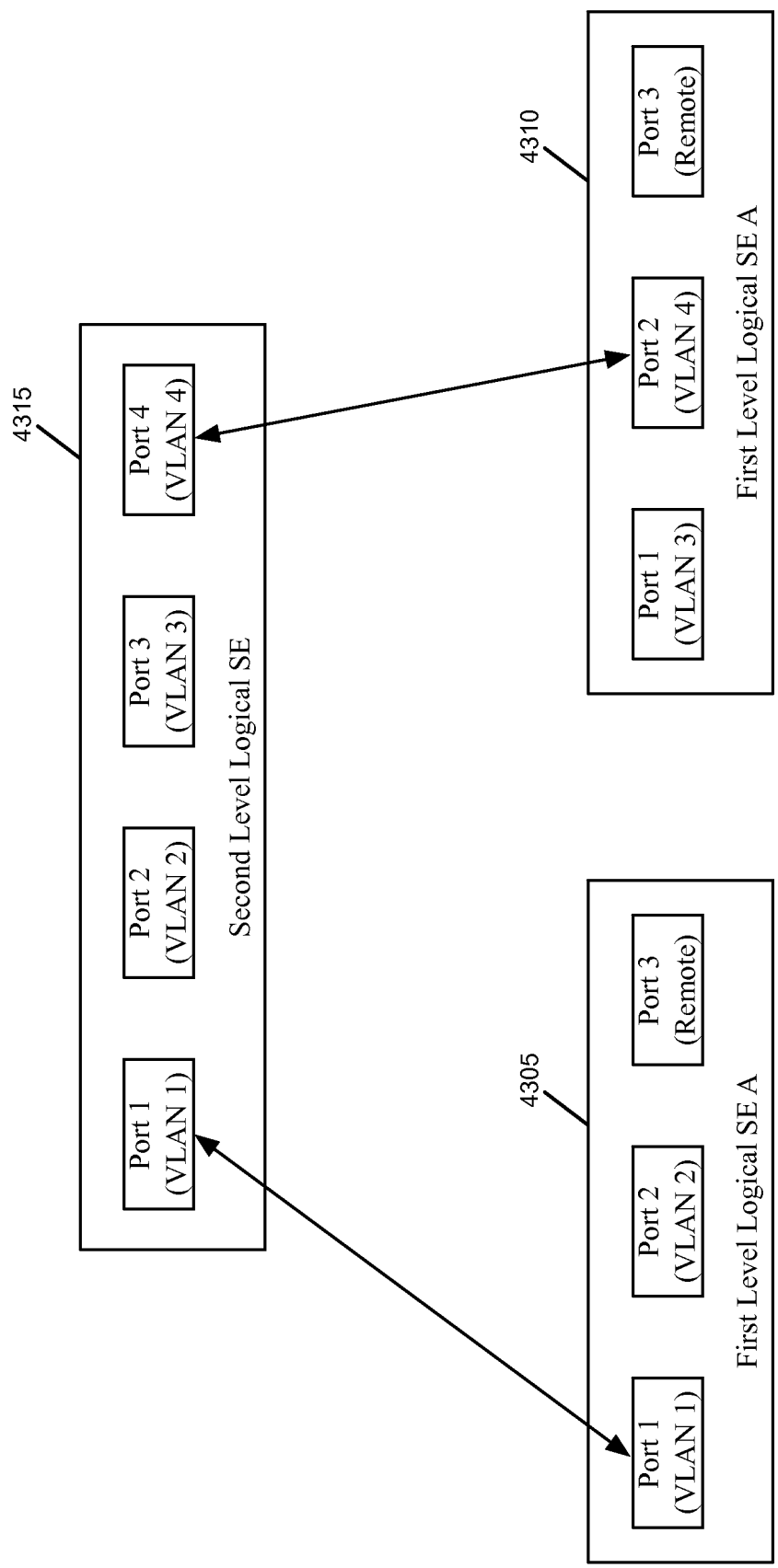
FIG. 43 conceptually illustrates the three logical datapath sets defined by the three network controller clusters of FIG. 42.

FIG. 43 conceptually illustrates the three logical datapath sets defined by the three network controller clusters of FIG. 42. Specifically, the figure illustrates two 1L logical datapath sets 4305 and 4310, with an interconnecting 2L logical datapath set 4315. The first level logical datapath set 4305 defined by the first 1L controller cluster 4265 includes three ports: one port for each of the two VLANs being connected, and a third port for the remote network segments (VLANs 4235 and 4240). Similarly, the first level logical datapath set 4310 defined by the second 1L controller cluster 4270 includes three ports as well: one for each of the VLANs connected on its half of the overall network, and a third port for the remote network segments (VLANs 1 and 2). The 2L logical datapath set 4315, meanwhile, includes only four ports, one for each of the network segments.

This second interconnection model, applying the federated network concept to the interconnecting switching elements, enables more robust traffic engineering. While not necessarily as important in the illustrated example (with only four total networks being connected, the hierarchical approach enables more intelligent traffic engineering, especially in larger-scale scenarios. In the single-level model, a full mesh of tunnels between the managed switching elements are defined, and this requires a reliable connectivity for each such connection. Especially as the number of networks being connected increases, and the networks move further apart physically, this may result in overprovisioning of the network capacity. Furthermore, as the packets are encapsulated in these tunnels, traffic engineering to enforce policies is difficult. To perform such engineering, the intermediate switching elements would need to look inside the encapsulation in order to make decisions.

In the hierarchical approach, the second level network controller cluster receives traffic engineering policies from user settings, and uses optimization routines combined with network statistics received from the lower-level controllers. In some embodiments, the lower-level controllers automatically collect information regarding their respective regions of the interconnecting network (i.e., from the switching elements implementing their lower-level logical datapath set), and pass this information upward to the second level network controller. In some embodiments, these statistics relate to the number of packets being sent out and received at various ports of the managed switching elements, the travel time of the packets along different paths, etc.

Irrespective of whether any specific policies have been set by users, the second level controller uses the statistics as an input into an optimization routine that determines in which direction traffic should be routed. For example, a packet sent from a machine at a network segment on a first 1L logical datapath set to a machine at a network segment on a second 1L logical datapath set might have several different paths it could take to arrive at the second 1L logical datapath set. Based on the network statistics, the second level controller determines an optimal one of these several different paths (which might travel through different sets of intervening 1L logical datapath sets) for packets to travel along from the first to the second 1L logical datapath set.

The optimization routine may also be affected by user settings in some embodiments. The user settings might specify that a certain quality of service (QoS) is required for packets sent from a particular machine, from a particular network segment, to a particular destination machine or network segment, etc. User settings can also specify that either packets from/to a particular source/destination should always be sent along a particular path (overriding the optimization processing) or should always receive the best connection. The user can specify different classes of traffic as well. For packets either given a lower class, or not addressed (i.e., with no guaranteed QoS), the optimization routines of some embodiments attempt to send the packets over the best connection without interrupting higher class traffic.

B. Generation of Flow Entries

In a single level interconnected network of some embodiments, flow entries are generated by the network controller and pushed down to the managed switching elements, as would be the case in a typical managed network within a data center. That is, a network controller of some embodiments includes (i) a control application that receives logical control plane data and converts this to logical forwarding plane data and (ii) a virtualization application that receives logical forwarding plane data and converts this to physical control plane data, which is pushed to the managed interconnection switching elements. In some embodiments, each of these sets of data (logical control plane, logical forwarding plane, physical control plane) are stored in the network controller as nLog tables, and the control and virtualization applications perform nLog table mapping operations to convert from one data plane to the next using an nLog rules engine. In some embodiments, in fact, the control application and virtualization application use the same rules engine to perform their table mappings. As mentioned previously, the network controller of some embodiments is described in greater detail in U.S. application Ser. No. 13/177,533, incorporated by reference above.

However, some differences do emerge to account for the fact that the logical ports correspond to network segments (which may have numerous associated addresses) rather than single machines. When a new VM is added or moved within a network, some embodiments require new logical flow entries, while other embodiments do not. This situation is described in subsection D below, regarding learning in the interconnected network of some embodiments.

When a user specifies that a new network segment be added to the interconnected network, the control application receives an event that a particular segment is at a new logical port ("Port Y"). This event is analogous to the addition of a new machine in a typical managed network, such as is described above in Section I. The control application then translates this event into an update to the logical lookup table that instructs a switching element to forward a packet to the new logical Port Y when the packet destination matches with the new network segment (i.e., when the destination address belongs to the particular network segment). The virtualization application then generates a physical forwarding plane lookup that adds another layer of matching. This new lookup states that if the 2L logical datapath set is matched (i.e., the source network segment is on the logical switching element) and that the destination address matches the new network segment, then the packet should be forwarded to the new logical Port Y. The virtualization application then pushes this lookup entry to the different interconnection switching elements.

Figure 44:
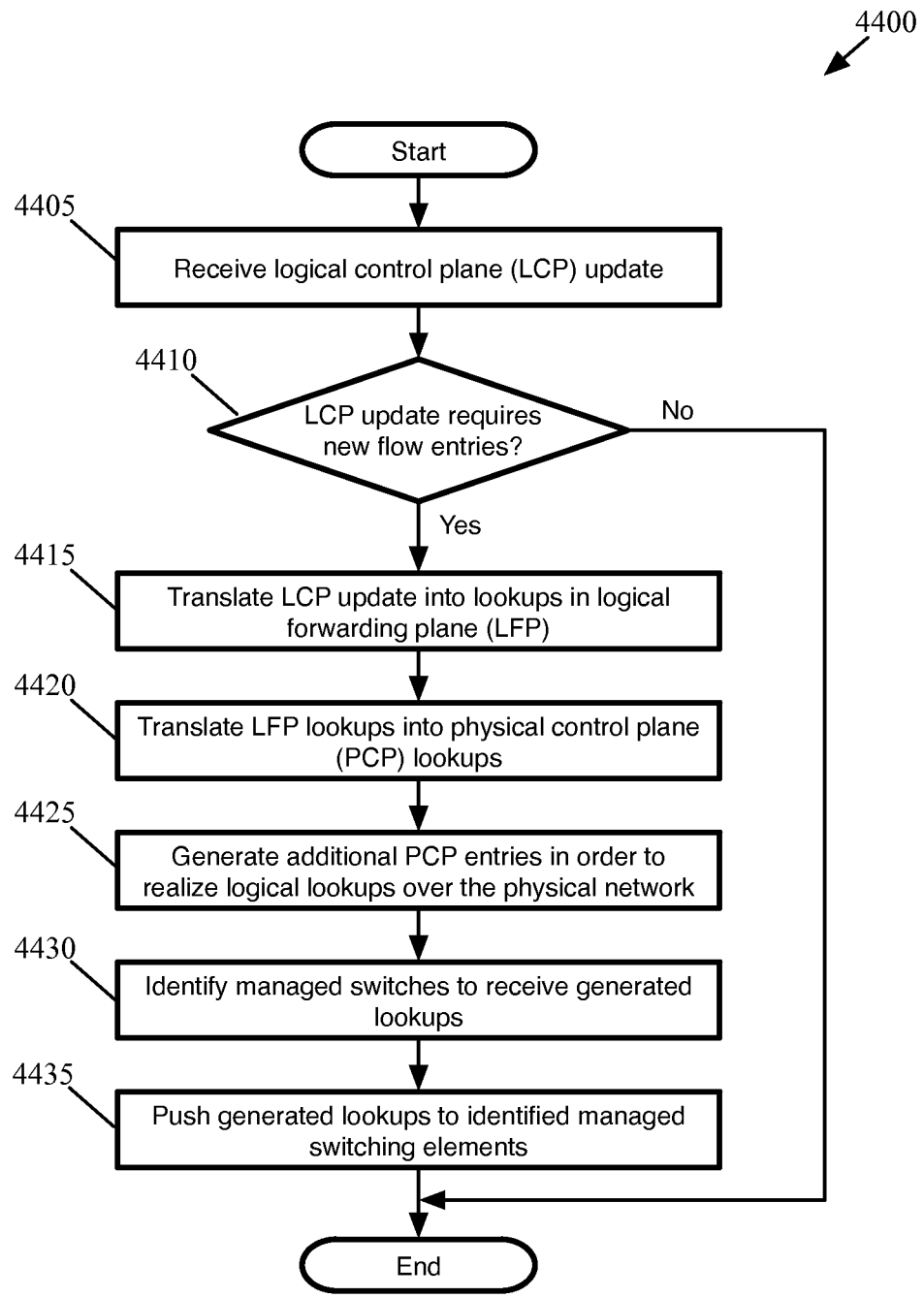
FIG. 44 conceptually illustrates a process of some embodiments performed by the network controller for an interconnecting network in order to generate new flow entries for an event detected at the logical control plane.

FIG. 44 conceptually illustrates a process 4400 of some embodiments performed by the network controller for an interconnecting network in order to generate new flow entries for an event detected at the logical control plane. As shown, the process 4400 begins by receiving (at 4405) an update to the logical control plane. Such an update may be a user entering a particular ACL policy (e.g., enabling port security or machine isolation at a particular port, requiring a particular QoS for a particular machine, etc.). In addition, updates pushed upwards from the managed switching elements may be received at the control plane. When the user configures a new network segment (e.g., a new VLAN) to attach to the network, this generates an event. In addition, when a new machine (e.g., a new MAC address) is detected within one of the network segments by one of the interconnecting switching elements, some embodiments push this information up to the network controller.

The process then determines (at 4410) whether the update to the logical control plane requires the creation of new flow entries. For instance, if the update simply indicates that the network state has not changed, then no new entries are required, and the process ends. On the other hand, if the update specifies new ACL rules, or indicates the attachment of a new network segment to the network, then the network controller will begin generating new flow entries. In addition, as described below, different embodiments use different learning models to distribute the MAC addresses associated with each port (as each port will have several possible destination MAC addresses).

Next, when the update requires new entries, the process 4400 translates (at 4415) the logical control plane update into an update to the lookups in the logical forwarding plane. In some embodiments, this translation involves turning a piece of data into a lookup entry. For instance, if a new network segment (VLAN Q) is attached to a logical Port Z of the logical switching element for the interconnecting network, then the logical control plane states "VLAN Q is at Port Z". Using tables that list the MAC addresses associated with VLAN Q, the control application translates this update into an update to the logical forwarding plane lookup table that reads "If destination matches MAC {A}→Forward to Port Z". In this case, {A} is the set of MAC addresses associated with VLAN Q. Some embodiments create this forwarding plane lookup as a separate entries for each MAC address in the set {A}

In addition, as with the multi-level network described above, the generation of ACL table entries will also be described. As with the entries in Section II, the conversions tend to be feature agnostic (again, primarily involving the addition of match conditions). Thus, at the logical control plane, the user specifies that the Port Z should be secured— that is, that network data entering and exiting the logical switching element through the particular port have only certain addresses that the switching element has restricted the port to use. However, these entries differ somewhat from the example given for the federated network above, because each port will have numerous MAC addresses/IP addresses with which it is associated. For example, if a particular VLAN has 1000 machines running on it, then the port security entry for that VLAN will need to include 1000 different MAC addresses and IP addresses as allowed. For instance, the logical forwarding plane entry for the ingress ACL will state "If received from Ingress Port Z→Allow, or Drop If ARP MAC not {A} or IP not {B}, or Drop If MAC not {A} or IP not {B}.

In this case, {A} is the set of MAC addresses associated with VLAN Q (as stated above), and {B} is the set of IP addresses at VLAN Q. The egress ACL lookup prevents packets not sent to a correct address from exiting the switching element at Port Z onto the VLAN Q, with an instruction of "If sent to Egress Port Z→Drop If dest. IP not {B}". This prevents other IP addresses from being used within the VLAN Q; by the nature of the logical forwarding, packets sent to MAC addresses not in the set {A} will not be directed to Port Z in the first place. In addition, some embodiments also mandate a match of the MAC address to the IP address in the egress ACL entry. That is, the entry requires that "If sent to Egress Port Z and match MAC $A_N$→Drop If dest. IP not $B_N$", where $A_N$ and $B_N$ are matching MAC and IP addresses. This ensures that a first VM within the VLAN Q does not use the IP address of a different VM within the same VLAN.

After translating the logical control plane update into logical forwarding plane lookups, the process then translates (at 4420) the logical forwarding plane data into physical control plane lookups. As with the logical control plane to logical forwarding plane translation, in some embodiments the conversion from logical forwarding plane to physical control plane is performed as an nLog table mapping operation (e.g., using the same table mapping engine as for the logical control plane to logical forwarding plane operation). For both the ACL lookups and the attachment of a new machine, the virtualization application adds a match of the logical datapath set to the entry. These conversions are the same as for a single level network within a datacenter. Thus, the first entry (to attach a new VLAN Q) now states "If match LDPS and If destination matches MAC {A}→Forward to Port Z". Similarly, the ingress ACL entry reads "If match LDPS and If received from Ingress Port Z→Allow, or Drop If ARP MAC not {A} or IP not {B}, or Drop If MAC not {A} or IP not {B}", and the egress ACL reads "If match LDPS and If sent to Egress Port Z→Drop If dest. IP not {B}".

In addition to translating the logical forwarding lookups to physical control plane lookups, the process 4400 also generates (at 4425) additional physical control plane entries in order to realize the logical forwarding plane over the physical network. In some embodiments, the virtualization application rules engine creates additional flow entries to handle the operations around the forwarding lookups. As described in the federating case, these lookups include ingress port integration, egress port integration, and tunnel sending and receiving entries.

In some embodiments, these lookups are generated as soon as the new network segment (e.g., VLAN Q) is added to the interconnecting network at a particular physical port. When ACL entries are subsequently generated for the particular port, these additional physical control plane entries are not affected. For the sake of the ongoing example, the physical port to which the network containing VLAN Q connects is Port W of the extender located at the edge of the segmented network. For this example, the ingress port integration entry matches the physical Port W (and the VLAN Q) to the logical ingress port Z. Thus, this entry states "If received from physical ingress Port W and match VLAN Q→Mark logical ingress as Port Z". The additional match over VLAN Q enables the interconnection switching element to differentiate between several network segments located on the same network, based on the segment context headers identified in the packet.

The egress port integration entry matches the forwarding decision at the logical level to a physical port. Specifically, the virtualization application generates an entry that states "If sent to Port Z→Run through egress pipeline then send to Port W". As for the flows described in Section II, these entries are sent to the managed interconnection switching element to which VLAN Q connects. However, for a packet to be sent out onto VLAN Q, the interconnection switching element will also need to append the VLAN context tag. Accordingly, some embodiments modify the egress port integration lookup to send to the particular interconnection switching element, so that the lookup states "If sent to Port Z Run through egress pipeline then append VLAN Q context then send to Port W". In other embodiments, the appending of the network segment context is specified in a separate lookup entry.

In addition, as with the federated network described above, some embodiments also generate lookups to handle the receipt and transmission of packets across the different interconnection switching elements. In the full mesh case, there is a separate tunnel between each pair of interconnection switching elements, and thus the only interconnection switching element that receives a packet for a tunnel is the interconnection switching element at the destination network for the packet. Thus, the other interconnection switching elements get a physical control plane lookup of "If sent to Port Z→Encapsulate with Z's context ID and output to physical port via tunnel that connects to destination switch". For the receiving side of the tunnel, at the managed switching element that contains Port W, the virtualization application generates a tunnel decapsulation lookup entry that states "If tunneled→Decapsulate to identify logical port, then Resubmit". The resubmission results in the execution of the egress port integration described above.

With all of the physical control plane entries generated, the process 4400 identifies (at 4430) the managed switching elements to receive the generated lookups. As described for some of the various lookup entries generated at 4420 and 4425, not all of the managed interconnection switching elements will receive every lookup. For example, the tunnel sending lookups will not be sent to the managed switching element to which the network segment actually connects, while the tunnel receiving and port integration lookups are only sent to that managed switching element. Furthermore, except in the rare situation that two of the network segments on the same logical switching element are also in the same segmented network (e.g., VLAN 1 and VLAN 2 of a particular VLAN-segmented network), the actual forwarding lookups will not need to be sent to the interconnection switching element to which the destination network segment is connected.

Finally, the process 4400 pushes (at 4435) the generated flow entries to the identified interconnection switching elements, then ends. In some embodiments, the network controller communicates directly with the managed interconnection switching elements. However, in other embodiments, the network controller that performs the conversion of the logical forwarding plane data into the physical control plane data sends physical control plane data to master controllers for the particular interconnection switching elements that are to receive the data, and these master controllers push the data to the switching elements. In addition, while this example describes the computation of physical control plane data customized for particular switching elements (e.g., with port numbers of the particular switching elements), some embodiments compute universal physical control plane data that is generic to any particular switching element. In this case, either the master controller or a chassis controller at the managed interconnection switching element performs the conversion to customized physical control plane data for the managed switching elements. In some embodiments, the 1L controller propagates the generated flow entries (e.g., to the master controller, from the master controller to the managed switching elements) through an object-oriented (NIB) data structure, while other embodiments use direct communication channels (e.g., RPC calls, OpenFlow entries, updates over the configuration protocol) to exchange the flow entries.

Figure 45:
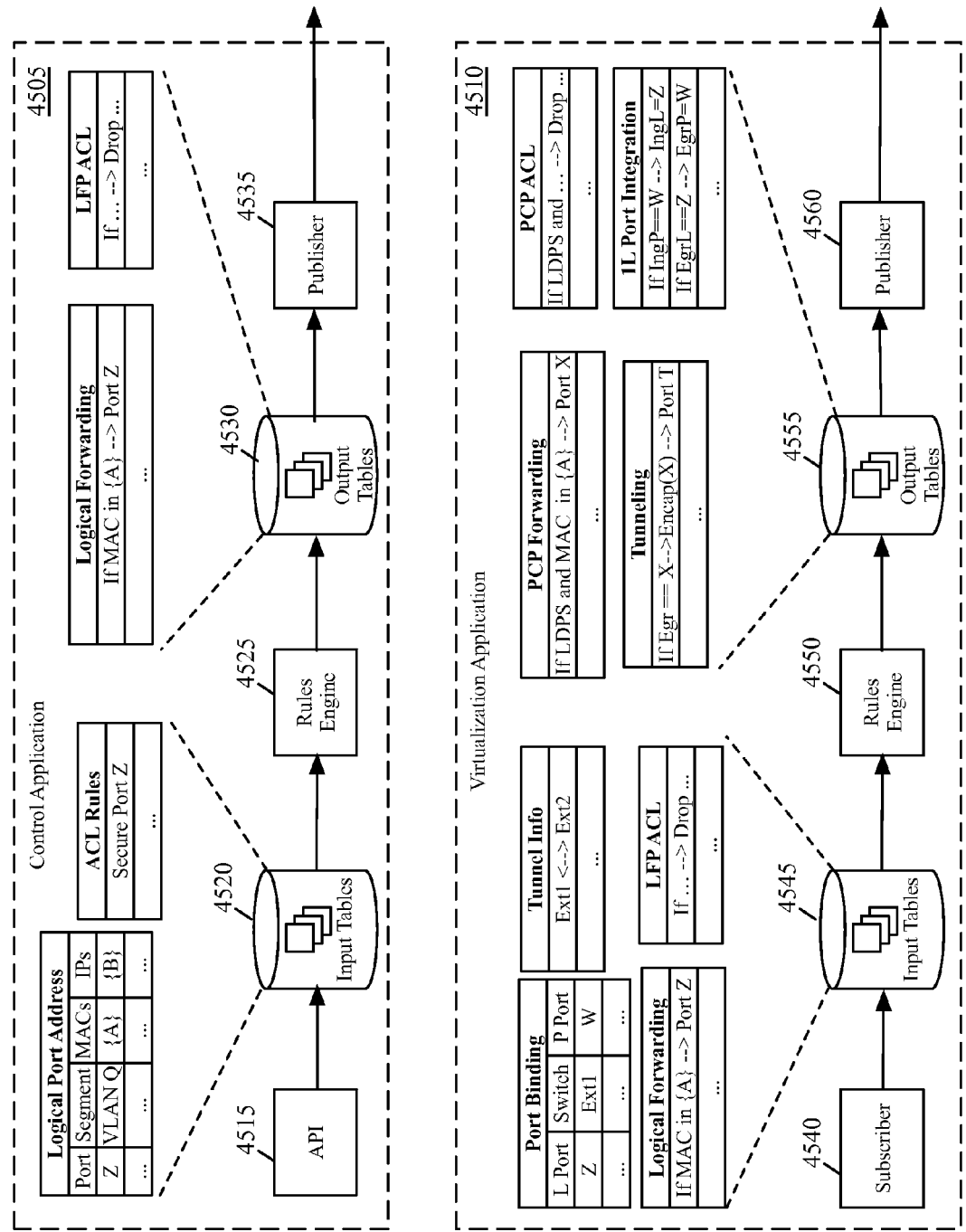
FIG. 45 conceptually illustrates input and output tables through the various flow generation operations of some embodiments.

FIG. 45 conceptually illustrates some of these input and output tables through the various flow generation operations of some embodiments. Specifically, FIG. 45 conceptually illustrates the input and output tables for a control application 4505 and a virtualization application 4510 of a network controller that manages an interconnecting network. As shown, the control application 4505 includes an API 4515, input tables 4520, a rules engine 4525, output tables 4530, and a publisher 4535.

The API 4515 provides an interface for translating input into the control plane input tables 4520. This API 4515 may be used by various types of management tools with which the user can view/and or modify the state of a logical network (in this case, network for interconnecting network segments). In some embodiments, the management tools provide a user interface such as a graphical user interface that allows a visual configuration of port bindings, ACL rules, etc. (e.g., through a web browser). Alternatively, or in conjunction with the graphical user interface, some embodiments provide the user with a command line tool or other type of user interface.

Based on the information received through the API, as well as updates to the network state received from the managed switching elements (not shown), the control application generates the input tables 4520. The input tables represent the state of the logical switching elements managed by the user in some embodiments. As shown in this figure, some of the input tables include the association of sets of MAC addresses/IP addresses that are part of a particular network segment with logical ports of the logical switching element, as well as ACL rules set by the user. In this case, the Port Z is associated with VLAN Q, which includes the MAC addresses {A} and IP addresses {B} and is secured. In some embodiments, the input tables also include information on the context tags (e.g., for VLAN Q).

The rules engine 4525 of some embodiments performs various combinations of database operations on different sets of input tables 4520 to populate and/or modify different sets of output tables 4530. As described in further detail in U.S. application Ser. No. 13/288,908, incorporated by reference above, in some embodiments the rules engine is an nLog table mapping engine that maps a first set of nLog tables into a second set of nLog tables. The output tables 4540 populated by the rules engine of the control application 4505 include logical forwarding plane lookups (e.g., mapping a set of MAC address to a destination output port) and logical forwarding plane ACL entries (e.g., securing Port X).

The publisher 4535 is also described in further detail in U.S. application Ser. No. 13/288,908, and publishes or sends the output tables 4530 to the virtualization application 4510, in order for the virtualization application to use the output tables 4530 among its input tables. In some embodiments, the publisher 4535 also outputs the tables to an object-oriented data structure (NIB) that stores network state information.

The virtualization application 4510 receives the output tables 4530 of the control application 4505, and converts this logical forwarding plane data to physical control plane data to be sent to the managed interconnection switching elements. As shown, the 2L virtualization application 4510 includes a subscriber 4540, input tables 4545, a rules engine 4550, output tables 4555, and a publisher 4560. The subscriber 4540 of some embodiments is responsible for retrieving tables published by the publisher 4535 of the control application 4505. In some embodiments, the subscriber 4540 retrieves these tables from the same object-oriented data structure to which the publisher stores the table information. In other embodiments, a change in the tables is detected by the virtualization application in order to initiate the processing.

The input tables 4545 include, in some embodiments, at least some of the output tables 4530, in addition to other tables. As shown, in addition to the logical forwarding plane data generated by the control application 4505, the input tables 4545 include additional port binding information (matching logical ports with physical ports of particular managed interconnection switching elements). In addition, some embodiments include tunnel information that describes the tunnels between the various interconnection switching elements (e.g., extenders). In some embodiments, additional pathway information is not needed, because the interconnection switching elements form a full mesh.

In some embodiments, the rules engine 4550 is the same as the rules engine 4525. That is, the control application 4505 and the virtualization application 4510 actually use the same rules engine in some embodiments. As indicated, the rules engine performs various combinations of database operations on different sets of input tables 4545 to populate and/or modify different sets of output tables 4555. In some embodiments, the rules engine is an nLog table mapping engine that maps a first set of nLog tables into a second set of nLog tables. The output tables 4555 populated by the rules engine 4550 include physical control plane lookups (e.g., mapping a set of MAC Addresses to a destination logical port when the LDPS is matched) and physical control plane ACL entries (e.g., securing Port X). In addition, the ingress and egress port integration and tunnel sending/receiving lookups are generated by the rules engine 4550 in some embodiments. In addition to the information shown in the figure, some embodiments also include in the output tables the correct managed switching elements to receive the different tables.

Finally, the publisher 4560 is similar to the publisher 4535 in some embodiments. The publisher 4560 publishes and/or sends the output tables 4555 to the managed interconnection switching elements that implement the logical network between network segments. In some embodiments, these managed interconnection switching elements are all extenders, though in other embodiments other types of managed switching elements may be included (e.g., pool nodes). In some embodiments, the publisher 4560 outputs the tables to an object-oriented data structure (NIB) that stores network state information.

One of ordinary skill in the art will recognize that the input and output tables shown in this figure are simplified conceptual representations of the actual tables, which are generated in a database language appropriate for the rules engine (e.g., nLog) and may provide additional information to that shown. Furthermore, different embodiments will use different sets of tables. For instance, the logical port address and port binding tables of some embodiments are actually a single table that binds a particular set of MAC and IP addresses in a network segment behind a particular physical port of a particular extender to a particular logical port.

The foregoing discussion in this section related to the flat full mesh interconnection network. As indicated, however, some embodiments apply the principles of federated networks to the interconnecting network. In such a scenario, the flow generation processes take place at multiple levels of controllers, as described in Section II above. In addition, the modifications related to having numerous destination MAC addresses at each of the logical ports, and the need to remove/add network segment context tags will be accounted for. Thus, the control plane (at the 2L network controller) will state that a particular network segment binds to a particular 2L port and a particular 1L port. The forwarding lookups are generated as described above, from the 2L controller to the 1L controller, resulting in a physical control plane lookup of "If match 1L LDPS and if match 2L LDPS and if destination matches Network Segment→Forward to 2L Port". In addition, the 2L controller generates entries for 1L←→2L port mapping, and for the tunnels between the 1L domains. Similarly, each 1L controller generates entries for physical←→1L port mapping, and the tunnels within its 1L domain.

In some embodiments, the pathways between 1L domains are determined by the 2L network controller. For instance, a machine in a first network segment located in a first domain might send a packet to a machine in a second network segment located in a second domain that does not have a direct connection to the first domain (i.e., there is no tunnel defined between any extender in the first domain and any extender in the second domain). In addition, in some situations, multiple possible paths through the 1L domains are possible in order for the packet to reach its destination. For example, the packet might be able to travel either through a third domain or a combination of a fourth domain and a fifth domain.

The determination as to which of these different pathways through the interconnected network a packet should travel is determined by the 2L network controller. In some embodiments, the 2L network controller performs optimization processing, in order to generate input tables that specify the optimized pathways. The virtualization application in the 2L network controller can then use these optimized pathways to generate the appropriate tunneling lookups to send packets along the correct path through the network.

Figure 46:
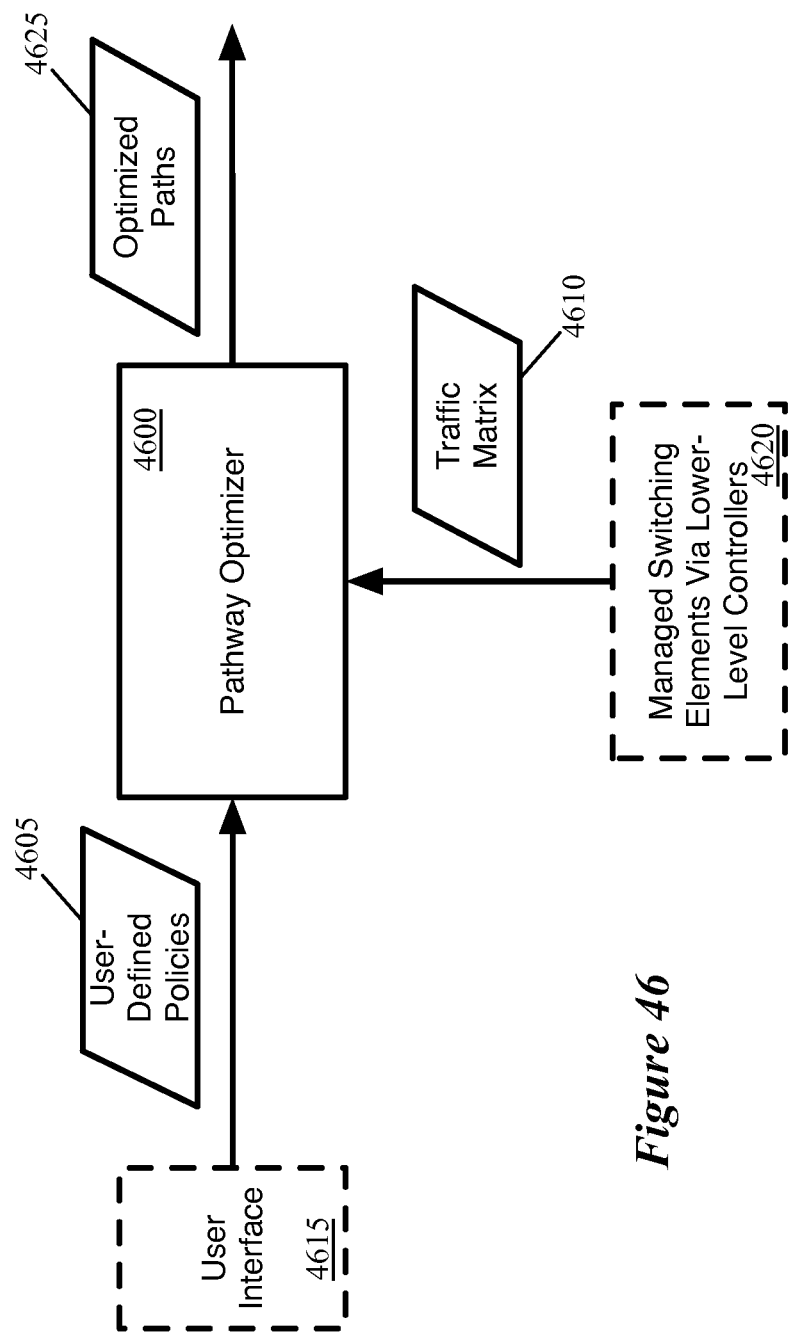
FIG. 46 conceptually illustrates optimization processing in a higher-level network controller of some embodiments.

FIG. 46 conceptually illustrates such optimization processing in a higher-level network controller of some embodiments. Specifically, FIG. 46 conceptually illustrates a pathway optimizer 4600 that receives (i) user-defined policies 4605 and (ii) a traffic matrix 4610, and outputs optimized paths for packets through the network. For instance, in a two-level network, this optimization processing would be performed in a second level network controller in order to determine pathways through the first level domains.

As shown, in some embodiments the pathway optimizer 4600 receives user-defined policies 4605 from a user interface 4615. In some embodiments, the user interface 4605 is the same user interface through which input tables to the control application are generated. The user interface may be a graphical user interface, a command line interface, or other mechanism for allowing the user to input pathway data. Through the user interface, the user may input various policies. For instance, the user settings might specify that a certain quality of service (QoS) is required for packets sent from a particular machine, from a particular network segment, to a particular destination machine or network segment, etc. User settings can also specify that packets to/from a particular source/destination should always be sent along a particular path (overriding the optimization processing) or should always receive the best connection. The user can specify different classes of traffic as well (e.g., high priority, medium priority, low priority), which has the effect of treating the packets differently from a QoS perspective.

In addition, the pathway optimizer 4610 receives a traffic matrix 4610 from the lower level controllers (collectively represented as box 4620). The traffic matrix 4610 contains statistics regarding network data within and between the various 1L domains. In various embodiments, this traffic matrix contains various information regarding the number of packets being sent out and received at various ports of the managed switching elements of the 1L networks, the travel time of the packets along various paths within and between domains, etc. In some embodiments, this data is collected by the various managed switching elements and then retrieved by the 1L network controllers (e.g., by querying the managed switching elements). The 1L network controllers may perform some processing on the data first or pass the raw data directly to the higher-level network controllers, for use in the pathway optimizer. Some embodiments collect the network statistics on a regular basis (e.g., every hour, every four hours, etc.) in order to regularly update the pathways through the network and keep the pathways optimized.

The pathway optimizer 4600 generates a set of optimized paths 4625, which may be used as an input table by the logical forwarding plane of the higher-level controller in order to determine optimized pathways through the domain. Various different optimization algorithms are used by different embodiments, such as simulated annealing, etc. The optimizer uses the policies 4605 as constraints and determines the best set of pathways given the traffic matrix 4610. The most important packets (highest QoS) are given the best pathways, while the optimizer attempts to additionally optimize the lowest QoS packets as well, without harming the high QoS packets. These optimized paths 4625 are output for use by the virtualization application for generating lookup entries for the lower-level logical forwarding plane.

C. Packet Processing

While the above section describes the generation of forwarding table entries for the interconnecting managed switching elements in a network that interconnects network segments at different network sites, the following section will describe the processing of packets by those managed switching elements using the generated flows. The subsections will describe the processing of packets by managed switching elements in both a full mesh interconnecting network with a single logical datapath set and a hierarchical logical network with multiple levels of logical datapath sets.

1. Single Logical Layer

Figure 47:
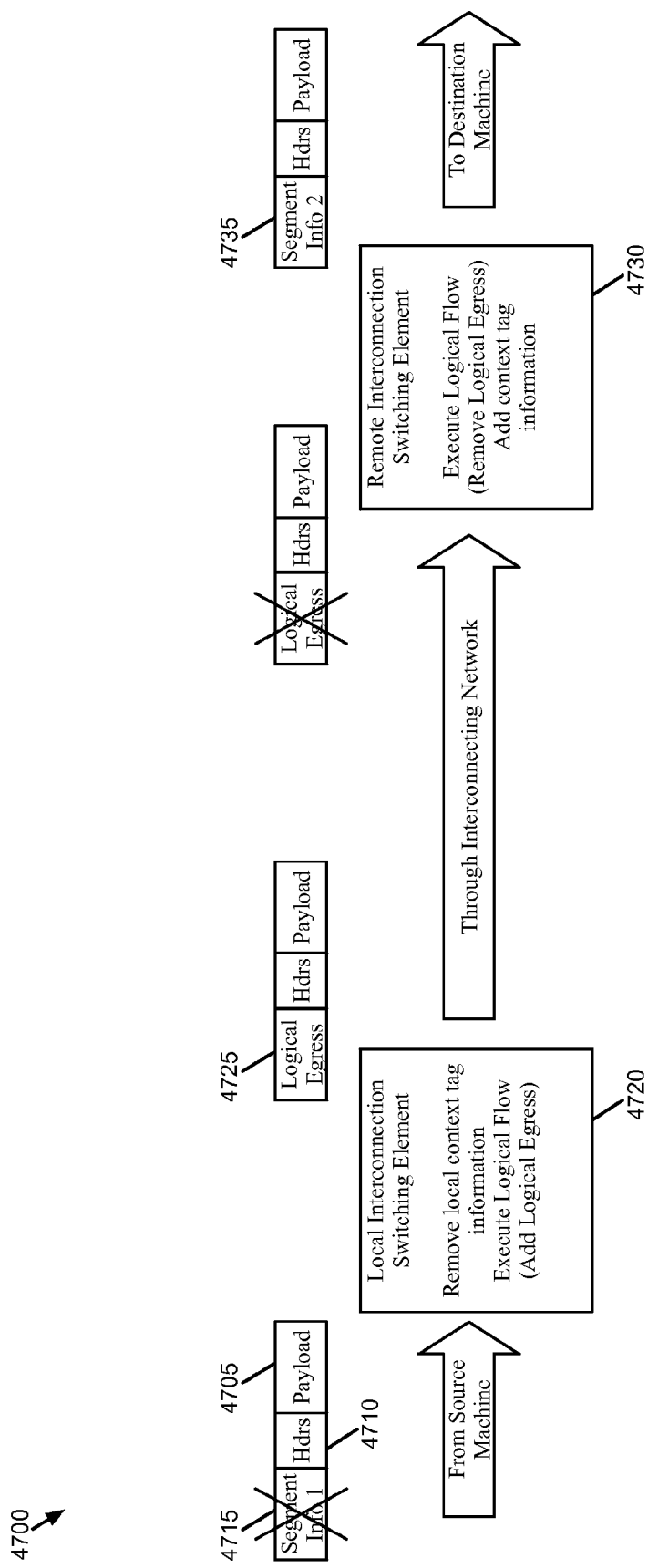
FIG. 47 conceptually illustrates the path of a packet through two managed switching elements between its source in a first network segment and its destination in a second network segment.

FIG. 47 conceptually illustrates the path of a packet 4700 through two managed switching elements between its source in a first network segment and its destination in a second network segment. The operation of the managed interconnection switching elements shown in this figure will be described in part by reference to FIGS. 48 and 50, which conceptually illustrate processes performed by some of the managed switching elements in such an interconnection network in order to process and forward packets.

As shown, the packet 4700 originates from a source machine (in a network segment) with a payload 4705, headers 4710, and segment information 4715. The payload 4705 contains the actual data intended for the destination machine, while the headers 4710 include information appended by the source machine in order to enable the packet 4700 to reach the destination machine. For instance, the headers 4710 might include the source and destination machines' physical addresses (e.g., MAC addresses) and/or network addresses (e.g., IP addresses).

The segment information 4715 is a context tag in some embodiments that indicates the local network segment of the source machine. This segment information may be a VLAN tag, MPLS header, MAC-in-MAC header, etc. In some embodiments, one or more of the network segments may be a managed network, such as those shown in Section I, and the segment info is a logical context tag for the network.

The packet 4700 is sent from the source machine through its local network (in most cases, through one or more switching elements within the local network). The local network switching elements will have learned that packets sent to the destination address in the packet header 4710 should be forwarded to the local interconnection switching element 4720. In some embodiments, the segment info 4715 includes a destination address field, with an indicator for remote destinations that the local switching elements recognize, causing them to forward the packet to the local interconnection switching element 4720.

As shown, the local interconnection switching element 4720 (e.g., an extender at the edge of the local segmented network, that faces the external interconnecting network) first removes the local context tag information (i.e., the segment info 4715). In some embodiments, the interconnection switching element 4720 uses the decoding information for the local segmented network stored in its tables. The switching element 4720 then executes the logical flow for the interconnection network, in which it adds logical egress information 4725 to the packet 4700.

Figure 48:
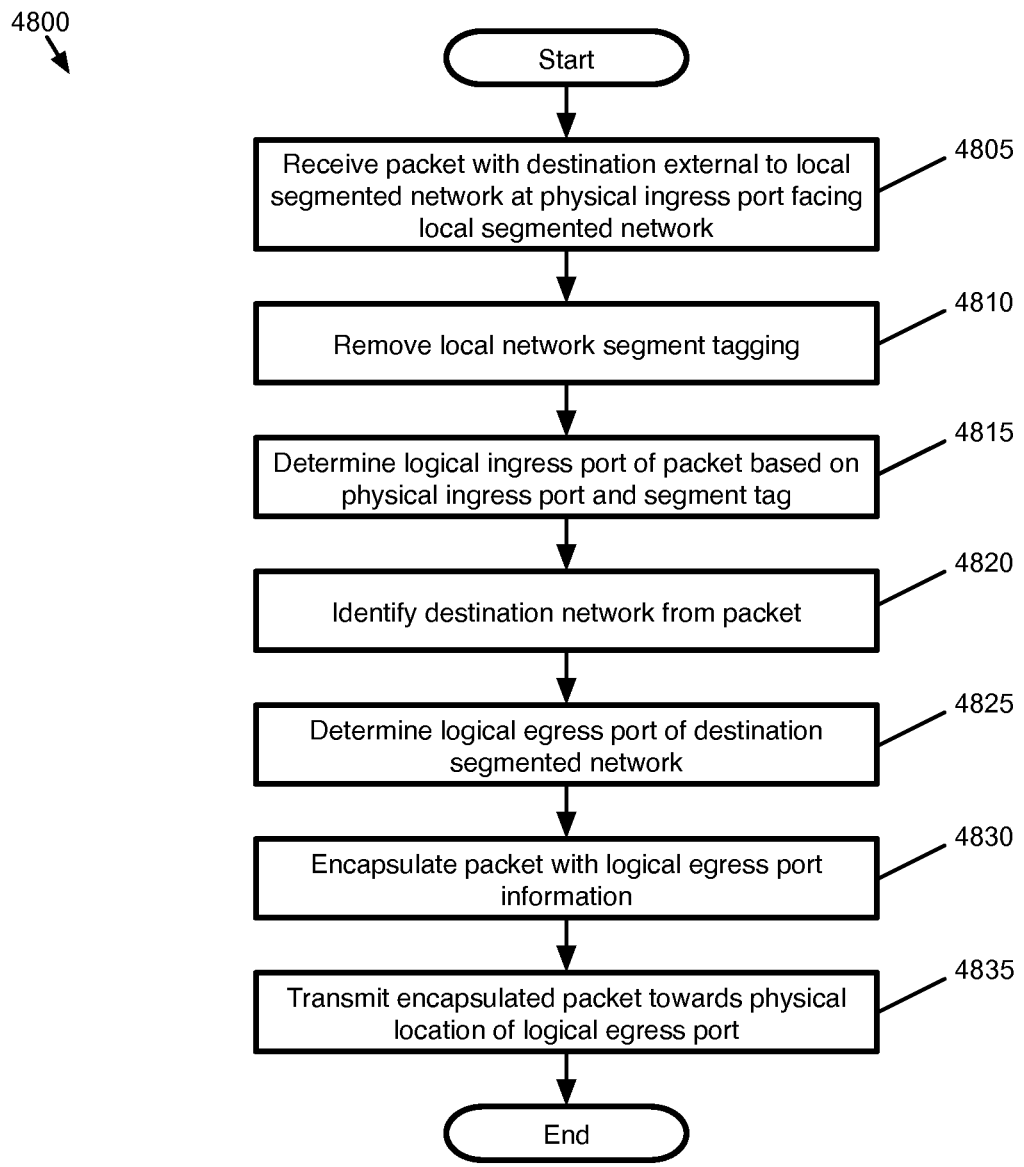
FIG. 48 conceptually illustrates a process of some embodiments for processing packets by a source network's interconnection switching element.

FIG. 48 conceptually illustrates in greater detail a process 4800 of some embodiments for processing packets by the source network's interconnection switching element. As indicated above, in some embodiments this switching element is an extender managed by a network controller cluster.

As shown, the process 4800 begins by receiving (at 4805) a packet with a destination external to the local segmented network at the physical ingress port facing the local segmented network. A switching element, whether managed or unmanaged, has several physical ports through which packets may enter or exit. In general, each port can serve as both an ingress port (for packets entering the switching element) and an egress port (for packets exiting the switching element), although in some embodiments certain ports may be reserved for either ingress or egress specifically. In general, the extender or other interconnection switching element will have a single port that connects to the local segmented network, though the switching element could have several such ports in some embodiments.

The process then removes (at 4810) the local network segment tagging. As stated, the network segment context tag may be a VLAN tag, MPLS label, MAC-in-MAC header, etc., depending on the segmenting technique used by the local network. The switching element uses its decoding information to identify the local context tag portion of the packet in some embodiments. That is, the decoding information specifies which bits of a packet will have the local context tag, and what each bit within the context tag means. As such, the switching element will not only remove the context tag, but can store any relevant information in its registers (e.g., the specific VLAN on which the source machine resides).

Next, the process determines (at 4815) the logical ingress port of the packet based on the physical ingress port and the segment tag. In some embodiments, this entails first identifying the logical datapath set to which the packet belongs. For instance, in the example of FIGS. 39 and 40, packets from either of the two VLANs 3520 and 3525 could arrive on the same physical port of the managed switching element 3605 that connects to the network 3505. As such, the physical port alone cannot be used to determine the logical datapath set and ingress port in some embodiments. Instead, the switching element uses the network segment context tag that was removed at operation 4810 to identify the logical datapath set and ingress port. In some embodiments, the switching element may also, or alternatively, use the source machine address to identify the logical datapath set and ingress port.

Next, the process 4800 identifies (at 4820) a destination network for the packet. In some embodiments, the managed switching element uses the destination address (e.g., a MAC address, IP address, etc.) stored in the packet header and matches this destination address to one of the network segments connected by the logical datapath set identified at operation 4815. As shown in FIG. 40 above, in some embodiments the managed switching element stores a list of all known addresses for each of the network segments connected by each of the logical datapath sets that the switching element implements. In some embodiments, the switching element uses a traditional flooding-based learning algorithm to handle packets for which it does not recognize the destination in order to determine on which network segment a particular machine is located.

The process next determines (at 4825) a logical egress port for the identified destination network on the logical datapath set. In some embodiments, the identification of the destination network and the subsequent identification of the logical egress port are performed as a single operation by the managed switching element. In addition to making a forwarding decision (i.e., mapping to a logical egress port), some embodiments also perform other forwarding table operations within the logical processing. For instance, some embodiments perform ACL lookups that may contain instructions to drop the packet, enqueue the packet (e.g., to enforce quality of service controls), allow a packet through, etc. In some embodiments, operations 4820 and 4825 are performed as a single operation (i.e., as a single lookup). That is, the managed switching element executes a forwarding table lookup entry that simply matches the destination network of the packet to a logical egress port, without having a separate operation for identifying the destination network.

After determining the logical egress port, the process encapsulates (at 4830) the packet with this logical egress port information. That is, the managed switching element prepends information to the packet (e.g., a logical context) that includes the egress port information. An example of such a logical context for OSI Layer 2 processing is described in detail in U.S. application Ser. No. 13/177,535, incorporated by reference above. This logical context is a 64-bit tag that includes a 32-bit virtual routing function field (for representing the logical datapath set to which the packet belongs), a 16-bit logical inport field (i.e., the ingress port of the datapath that corresponds to the local network segment), and a 16-bit logical outport field (i.e., the identified logical egress port that corresponds to the destination remote network segment).

At this point, the forwarding decisions for the packet are complete, and the process 4800 transmits (at 4835) the encapsulated packet towards the physical location of the logical egress port, and ends. This location, in some embodiments, is an interconnection switching element (e.g., extender) at the edge of the network containing the destination network segment. In some embodiments, this transmission actually involves several operations. First, the logical egress port is mapped to a physical address (e.g., the address of a port on the interconnection switching element). Next, this physical address is mapped to a physical port of the managed interconnection switching element performing the operations so that the packet can be transmitted to the next hop. While the remote interconnection switching element is the ultimate destination (as far as the logical network is concerned), there will generally be several physical switching elements in between the source interconnection switching element and the remote interconnection switching element. In some embodiments, a tunnel is defined between the two switching elements, and the packet is encapsulated with the tunnel information to be sent over the intervening network.

Figure 49:
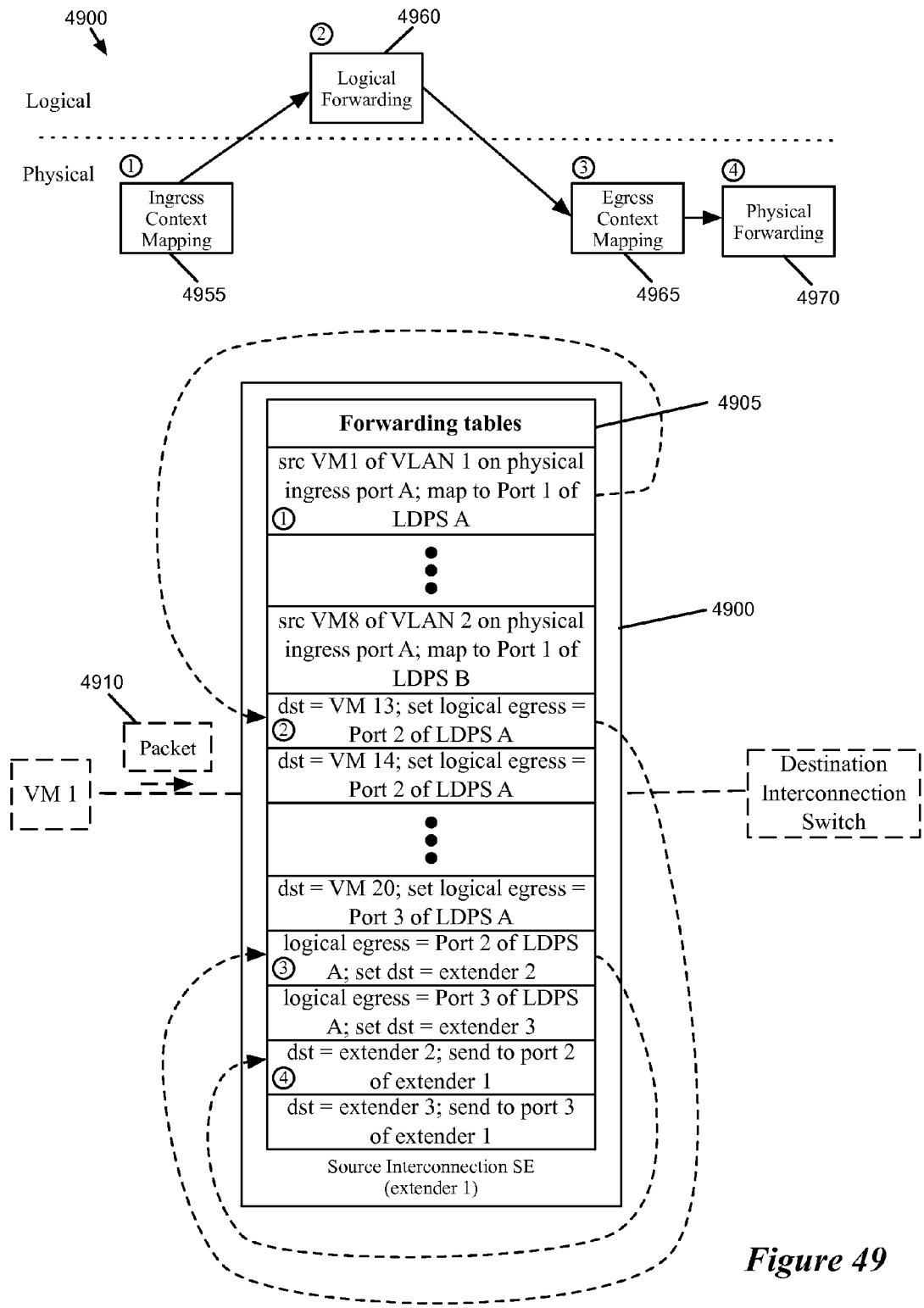
FIG. 49 conceptually illustrates an example of some of the forwarding table operations performed by a source interconnection switching element.

FIG. 49 conceptually illustrates an example of some of the forwarding table operations performed by a source interconnection switching element 4900 (i.e., the managed interconnection switching element that connects to a network containing the source of a packet). Specifically, FIG. 49 illustrates forwarding table entries 4905 for the source interconnection switching element 4900.

In conjunction with the forwarding table entries, FIG. 49 conceptually illustrates the processing pipeline 4950 performed by the source interconnection switching element 4900 of some embodiments. As shown by the numbers 1-4, when the interconnection switching element 4900 receives a packet, it uses numerous forwarding table entries to process the packet. In some embodiments, the physical and logical tables (including any ACL tables) are implemented as a single table within the managed switching element (e.g., using a dispatch port that returns a packet processed by a first entry to the forwarding table for processing by a second entry).

The VMs in this example refer to those shown in FIG. 39. As shown, VM 1 sends a packet 4910 that arrives at the source interconnection switching element 4900 (corresponding to the interconnection switching element 3605). This packet, in most cases, will not have been sent directly from the VM to the interconnection switching element, but will usually have traveled through at least one switching element within the segmented network between the VM and the interconnection switching element.

The managed switching element 4900 receives the packet 4910 through an interface of the switching element, and begins processing the packet using the forwarding tables 4905. The first stage in the processing pipeline 4950 is an ingress context mapping stage 4955 that maps a physical ingress port (i.e., the interface through which the packet was received from VM 1) and packet information (e.g., the VLAN tags) to a logical ingress port (i.e., a port of one of the logical switching elements implemented by the physical switching element that corresponds to the source VLAN).

As shown by the encircled 1, the interconnection switching element identifies a record 1 in the forwarding table that implements the ingress context mapping. Specifically, this record identifies the network segment from which the packet was sent (VLAN 1) and matches this network segment to a logical port of a particular logical datapath set (Port 1 of LDPS A). In this case, the forwarding tables 4905 include additional records for matching different source VMs on the same and different VLANs to logical ingress ports—different source VMs on the same VLAN will be matched to the same port, while source VMs on different VLANs are matched to ports of different logical switching elements. Some embodiments only store one record for each network segment for ingress port matching. That is, the forwarding tables do not care from which VM the packet originated, only using the VLAN (or other network segment) information. In this case, the record 1 specifies that the managed interconnection switching element 4900 store the logical context of the packet in a field of the packet's header, which indicates the logical inport of a particular logical datapath set for the packet. In some embodiments, the record also specifies to send the packet to the dispatch port, for additional processing by the forwarding tables 4905

The second stage in the processing pipeline 4950 is the logical forwarding lookups 4960. As in the federated network examples shown above, the forwarding lookups 4960 are illustrated here as a single forwarding table record, but may actually involve several different records performing several different functions. For instance, the tables 4905 do not illustrate any ACL tables, which might be present to enforce security policies for packets sent by VM 1 or from VLAN 1, or sent to particular VMs.

As shown by the encircled 2, the interconnection switching element 4900 identifies a record 2 in the forwarding tables 4905 that implements the logical forwarding decision. Specifically, this record identifies the packet destination (specified in the packet header) as a particular VM 13 and sets the logical egress of the packet to be a particular port (Port 2) of the already-identified logical datapath set. As shown, in some embodiments the forwarding table includes records for each of the possible destination addresses (i.e., each of the machines on the different network segments connected by the interconnection network). Thus, the forwarding table 4905 includes records for setting the logical egress to the same Port 2 of the same logical datapath set when the destination is VM 14, and a different Port 3 of the same logical datapath set when the packet destination is VM 20. In some embodiments, the record instead specifies that when a network segment (e.g., MPLS Label 2) is matched based on a list of all of the VMs on that network segment, the record maps the network segment to a particular port. The record 2 specifies that the managed switching element 4900 store the logical egress port in the packet headers (i.e., encapsulate the packet with the logical egress context), as well as send the packet to its dispatch port.

Based on the logical egress port specified at the second stage of the processing pipeline, the managed switching element performs egress context mapping 4965 that maps the logical egress port to a physical egress port for the packet within the interconnecting network. For a packet traveling from one network segment at a first site to a different network segment at a second site, this will be the physical port of a different interconnection switching element at the second site. As shown by the encircled 3, the source interconnection switching element 4900 identifies a record 3 in the forwarding tables 4905 that implements the egress context mapping. Specifically, the record 3 matches the logical egress as Port 2 of LDPS A, and sets the destination to be a particular extender 2 that faces the MPLS-segmented site containing Label 2. In some embodiments, the destination is set as the MAC address of a particular port (i.e., the port facing the interconnecting network) of the extender 2. In some embodiments, this involves encapsulating the packet in a tunnel between the managed interconnection switching element 4900 and the extender 2 specified as the physical egress port. In some embodiments, the record 3 also specifies to send the packet to its dispatch port for further processing.

Finally, the managed interconnection switching element 4900 performs the physical mapping stage 4970 that specifies a physical port of the managed switching element through which to send the (now-modified) packet 4910 in order to reach the physical egress port identified by the egress context mapping. As shown by the encircled 4, the interconnection switching element 4900 identifies a record 4 in the forwarding tables 4905 that implements this physical mapping. Specifically, the record 4 matches the destination (extender 2) and maps the packet to a port 2 of the interconnection switching element 4900 (referred to in the table as "extender 1"). This port is different from the dispatch port, and therefore the packet is now sent out this port towards the destination interconnection switching element, for eventual delivery to VM 13.

Returning to FIG. 47, the packet is sent from the local interconnection switching element 4720 through the interconnecting network to the remote interconnection switching element 4730 (i.e., through a tunnel defined between ports of the two switching elements). The remote interconnection switching element executes the logical flow for the interconnection network, which involves removing the logical egress encapsulation (as the packet has reached its destination, as far as the logical network is concerned). The interconnection switching element 4730 also adds new segment context information 4735, so that the packet can be processed by switching elements on the receiving segmented network and delivered to its destination machine.

Figure 50:
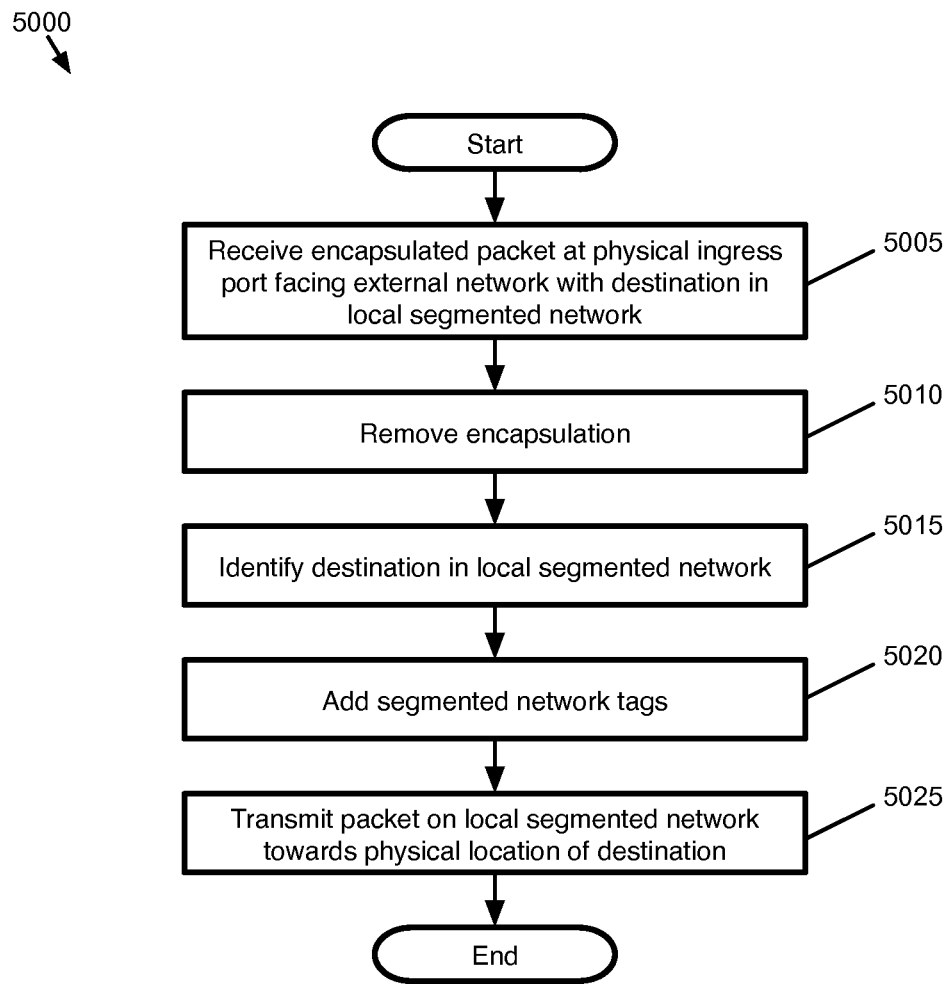
FIG. 50 conceptually illustrates in greater detail a process of some embodiments for processing packets by a destination network's interconnection switching element.

FIG. 50 conceptually illustrates in greater detail a process of some embodiments for processing packets by the destination network's interconnection switching element. As indicated above, in some embodiments this switching element is an extender managed by a network controller cluster (i.e., the same network controller cluster that manages an extender at the source site).

As shown, the process 5000 begins by receiving (at 5005) an encapsulated packet at a physical port that faces an external interconnecting network with a destination in a segmented network local to the receiving switching element. In some embodiments, however, the destination cannot yet be determined, because the actual end machine destination is hidden within the encapsulation. In many cases, the physical switching element will have several ports that face away from the local segmented network, but the tunnel between the sending interconnection switching element and the receiving interconnection switching element is defined between particular ports on each switching element.

The process then removes (at 5010) the encapsulation on the packet. In some embodiments, the encapsulation includes a tunneling protocol used to send the packet to the particular receiving interconnection switching element, as well as the logical egress context of the packet. The switching element recognizes its ingress port as the end of the tunnel, and therefore removes the tunneling encapsulation, and additionally recognizes itself as the logical egress port for the packet, removing the logical egress information. In some embodiments, the switching element stores the logical context information in registers, in case the information is needed for further processing.

Next, the process 5000 identifies (at 5015) a destination in the segmented network local to the interconnection switching element. In some embodiments, the switching element uses the removed logical context to map to a particular segmented network. The logical egress port, information about which was removed at operation 5010, corresponds to a particular network segment within the local site network. Some embodiments, on the other hand, use the address of the destination machine (e.g., the MAC address) to identify the local network segment to which the packet should be sent.

The process then adds (at 5020) the context tags for the local segmented network. These tags may be a VLAN tag, MPLS label, MAC-in-MAC header, etc., depending on the segmenting technique used by the local network. The switching element uses its decoding information, in some embodiments, to determine which bits of the packet should be used for the different portions of the context tag. These portions may include a network identifier (e.g., a VLAN ID), a destination on the VLAN, etc.

Finally, the process transmits (at 5025) the packet onto the local segmented network towards the packet's physical destination, then ends. In most cases, the packet will not be sent directly from the managed interconnection switching element to the end machine (physical machine or virtual machine) that is the packet's destination. Instead, there will likely be one or more intervening switching elements on the local network that process the packet according to its network segment context tags.

Figure 51:
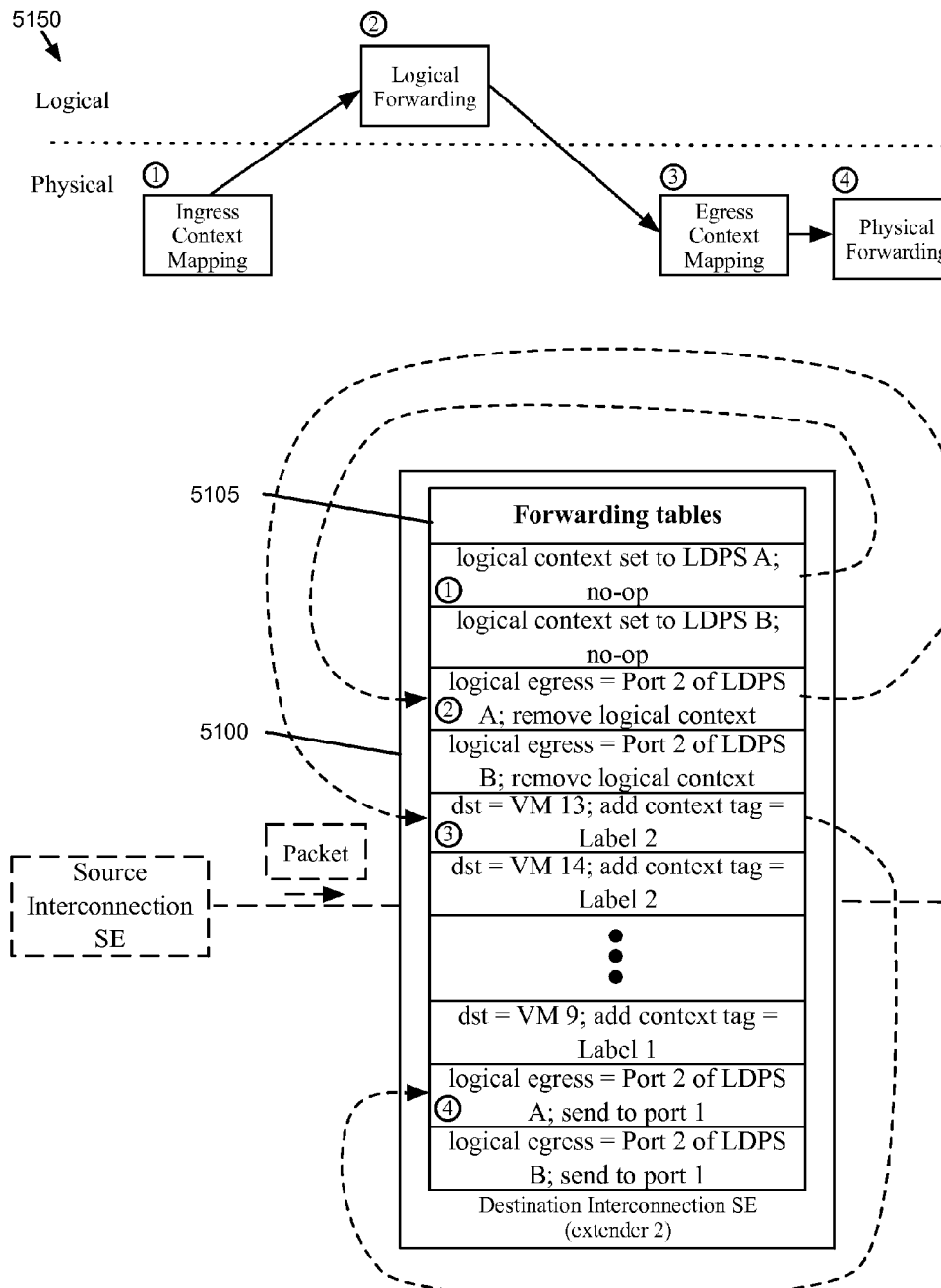
FIG. 51 conceptually illustrates an example of some of the forwarding table operations performed by a destination interconnection switch.

FIG. 51 conceptually illustrates an example of some of the forwarding table operations performed by a destination interconnection switching element 5100 (i.e., the managed interconnection switching element that connects to a network containing the destination of a packet). Specifically, FIG. 51 illustrates forwarding table entries 5105 for the destination interconnection switching element 5100.

In conjunction with the forwarding table entries, FIG. 51 conceptually illustrates the processing pipeline 5150 performed by the source interconnection switching element 5100 of some embodiments. This processing pipeline 5150 contains the same four stages as the pipeline 4950 shown in FIG. 49 for the source interconnection switch: ingress context mapping, then logical forwarding, then egress context mapping, and physical forwarding. In some embodiments, each managed switching element in a single-level logical network performs the same processing pipeline, though some of the stages may not actually involve the performance of any operations (e.g., at managed switching elements in the middle of a network that simply pass a packet onwards to the next managed switching element).

Thus, the first forwarding table record identified by the interconnection switching element 5150 implements the ingress context mapping stage. This record, shown by the encircled 1, identifies that the logical context has already been set to a particular logical datapath set, and performs no additional operation, while simply sending the packet to the dispatch port (and, in some embodiments, storing this information to a register). Next, the switching element identifies a forwarding table record that identifies that (i) the packet already includes its logical egress information and (ii) that information can be removed because the packet has now reached its logical egress. At the egress context mapping stage, the switching element identifies that logical egress corresponds to a particular network segment on its local network and that the destination is a particular machine (VM 13) on that network segment. Finally, at the physical mapping stage, the switching element identifies a particular physical port to which it sends the packet, in order for the packet to reach its destination on the segmented network.

2. Several Logical Layers

In the above scenario, only two managed switching elements are generally involved for a particular packet: the interconnection switching element at the source network and the interconnection switching element at the destination network, with a tunnel defined between the two. On the other hand, in the multi-level interconnection scenario, with at least two layers of logical datapath sets, in some cases a packet may travel through numerous such interconnection switching elements, enabling various traffic forwarding decisions. In this scenario, the second level controller can make decisions about which of several paths a packet should take to travel from a source network in a first 1L domain to a destination network in a second 1L domain (e.g., through one or the other of two possible intervening 1L domains). The second level controller pushes these decisions down to the first level controllers, which implement the decisions within their first level flows sent to the interconnection switching elements within their respective domain.

Figure 52:
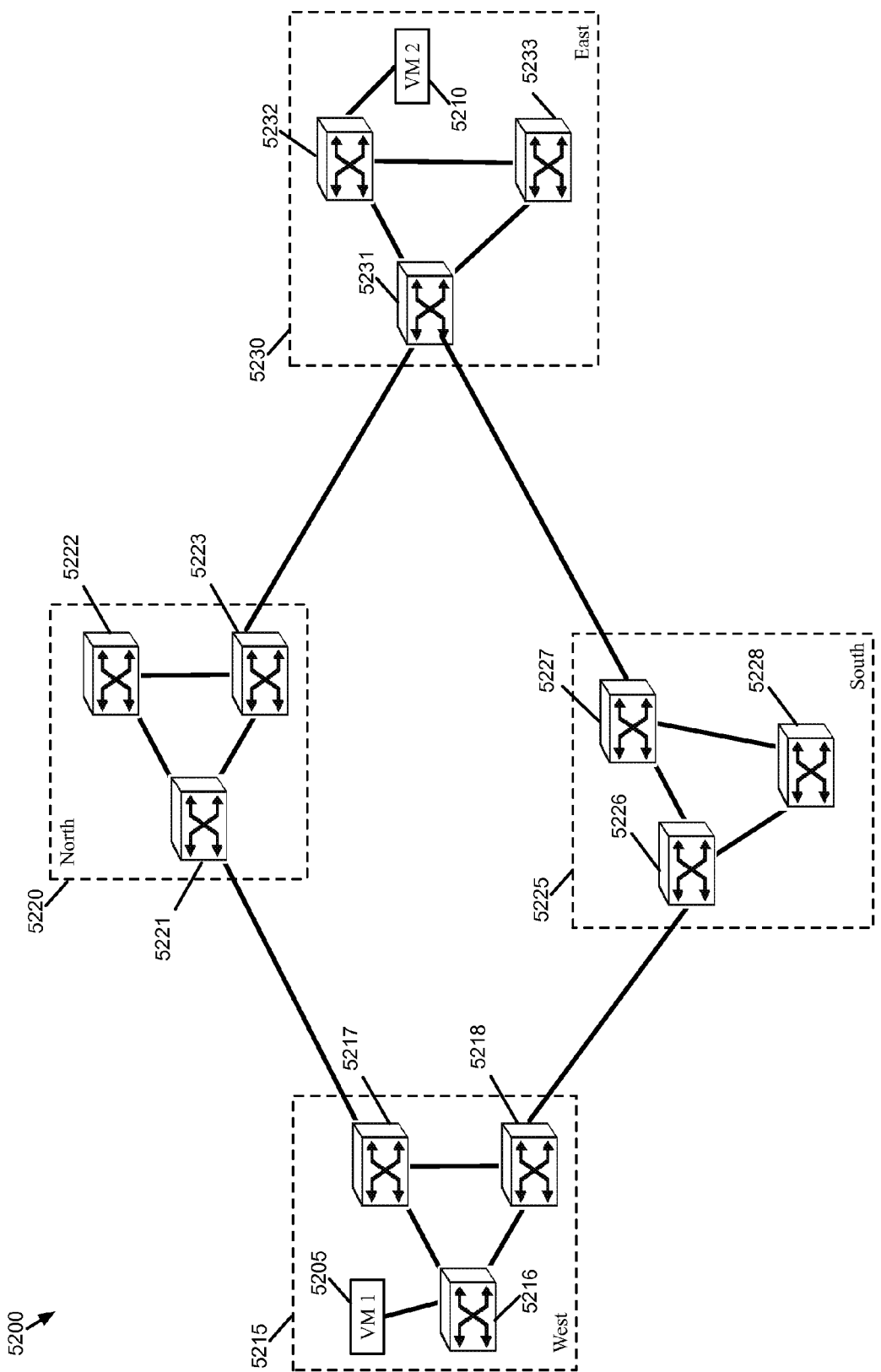
FIG. 52 conceptually illustrates a more complex network, with four separate 1L domains of three interconnected networks each.

In Subsection A of this Section, a simplistic example was illustrated for the case of interconnecting network segments via multiple levels of logical datapath set. FIG. 52 conceptually illustrates a more complex network 5200, with four separate 1L domains of three interconnected networks each. For simplicity, the segmented networks located behind the twelve interconnection switching elements are not shown in this figure. Instead, only a first VM 5205 and a second VM 5210 are illustrated, as these will be used to describe an example packet flow.

The hierarchical network 5200 includes a first 1L domain 5215 ("West") with three interconnection switching elements 5216-5218, a second 1L domain 5220 ("North") with three interconnection switching elements 5221-5223, a third 1L domain 5225 ("South") with three interconnection switching elements 5226-5228, and a fourth 1L domain 5230 ("East") with three interconnection switching elements 5231-5233. Each of these interconnection switching elements is located at the edge of a segmented network (e.g., a network segmented using VLANs, MPLS Labeling, MAC-in-MAC, etc.). In some embodiments, the segmented networks may also use the logical network virtualization as described in Section I. Each of the four 1L domains includes a 1L network controller cluster (not shown) that generates flows and pushes the flows to the interconnection switching elements within the 1L domain. These four 1L network controller clusters are all connected to a 2L network controller cluster, that generates 2L flows and pushes the flows to the 1L controller clusters for incorporation within their flows. In addition, the 2L network controller cluster may make decisions about the preferred path of several different paths through the 1L domains for packets from different source networks or machines and to different destination networks or machines.

Figure 53:
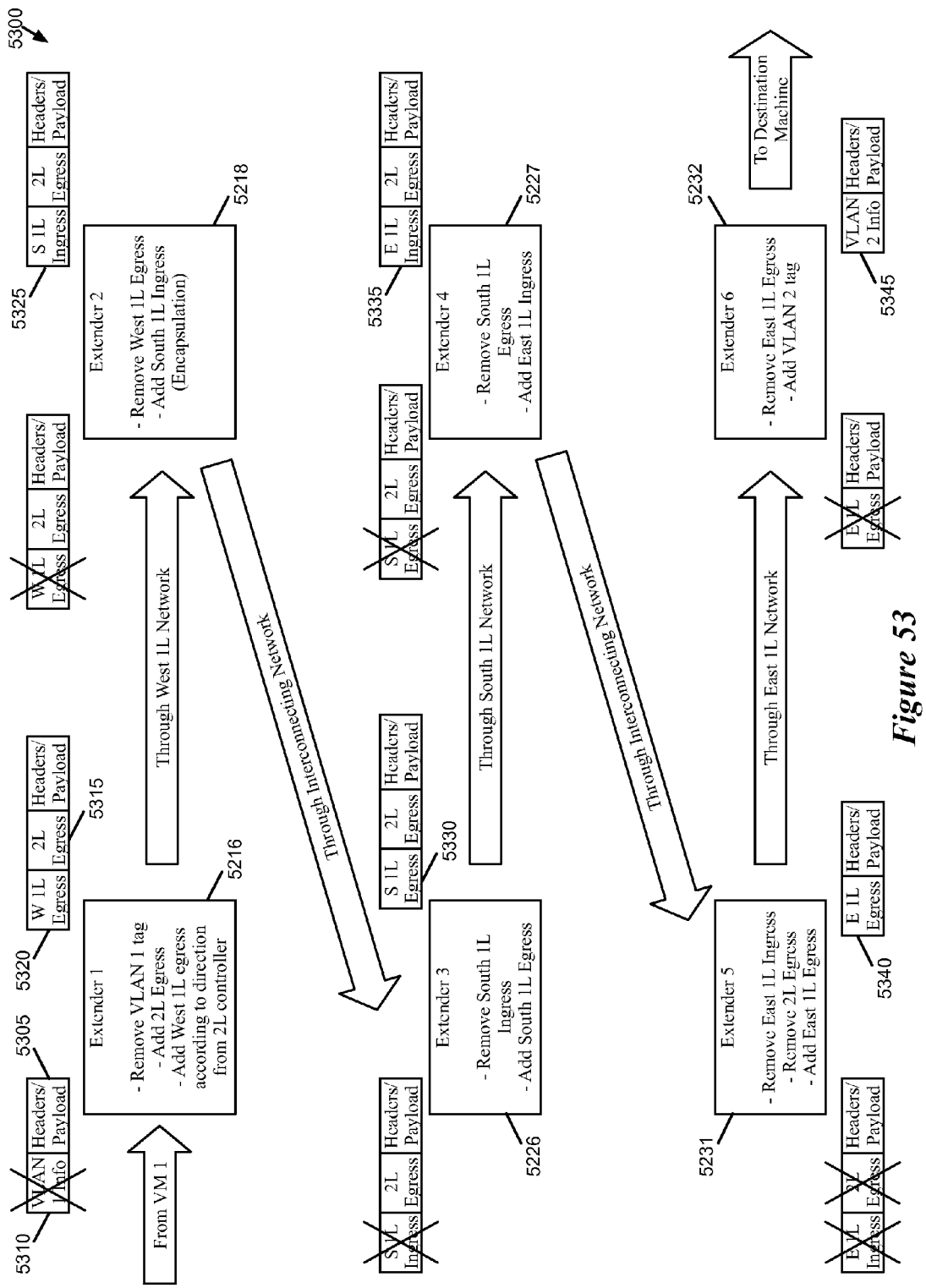
FIG. 53 illustrates an example of a packet traveling through a network from a first VM to a second VM.

FIG. 53 illustrates an example of a packet 5300 traveling through the network 5200 from VM 1 5205 to VM 2 5210. In this case, the packet travels through six of the interconnection switching elements, labeled in this figure as extenders. As shown, the packet originates at VM 1 5205 with its payload and headers 5305 (e.g., source and destination MAC address, source and destination IP address, etc.), as well as a VLAN context tag 5310 identifying the packet as belonging to VLAN 1 (the VLAN to which the source VM 1 belongs). In most cases, the packet will have traveled through at least one switching element within the segmented network that contains VLAN 1 before arriving at the first extender 5216.

Upon receiving the packet 5300, the extender 5216 first removes the VLAN context tag 5305, and identifies the 1L and then 2L logical ingress ports (performing ingress context mapping). The extender performs the 2L logical forwarding decisions, including any ACL decisions. The policy decisions implemented by the ACL flow entries may be generated by the 2L controller and then pushed down to the 1L controller and then to the managed switching elements, as described above. In addition, the 2L logical forwarding identifies an 2L egress port, which corresponds to a particular port on extender 5232 to which the destination VM 2 5210 attaches. As in the single-layer scenario from the previous subsection, the extender 5216 stores a list of the ports to which different destination addresses (e.g., MAC addresses) correspond.

After encapsulating the packet with 2L egress information 5315, the extender 5216 executes the remaining 1L processing pipeline. This includes egress context mapping of the 2L egress port to a particular 1L egress port. In this case, the packet can arrive at its destination (in the East 1L domain) via either the North domain or the South domain. In some embodiments, this decision is determined by the 2L controller, which determines which path should be taken through the 1L datapaths for packets from different source networks or machines and to different destination networks or machines. The 2L controller of some embodiments might specify that a packet from a particular source (either machine or network segment) to a particular destination (either machine or network segment) should travel along a specific set of 1L datapaths. For the originating 1L datapath, this will be implemented by specifying an egress port of the 1L datapath that sends the packet to the "next hop" 1L datapath. Upon arriving at that next 1L datapath, the 1L egress port will be determined such that the packet is again sent to the appropriate next 1L datapath. Within the 1L datapath, forwarding decisions between physical interconnection switching elements are determined by the 1L controller cluster.

In order to generate the forwarding lookups, the 2L controller cluster of some embodiments combines user input specifying policies for traffic as well as network statistics (i.e., a traffic matrix) received from the 1L controllers. In some embodiments, the lower-level controllers automatically collect information regarding their respective regions of the interconnecting network (i.e., from the switching elements implementing their lower-level logical datapath set), and pass this information upward to the second level network controller. In some embodiments, these statistics relate to the number of packets being sent out and received at various ports of the managed switching elements, the travel time of the packets along different paths, etc.

In different embodiments, the user policies might specify different classes of traffic (e.g., high, medium, and low priority packets), guarantee a particular QoS for specific packets while making no guarantees about other packets, direct specific packets to follow a particular path, etc. The packets might be classified based on source machine, source network segment, source 1L datapath, destination machine, destination network segment, destination 1L datapath, or a combination thereof, in different embodiments. For instance, a user might specify packets from a VLAN 5 at Network A to a VLAN 6 at Network B to be high priority packets, while packets from VLAN 5 at Network A to a VLAN 3 at Network C are low priority packets. As another example, the user might specify a particular guaranteed QoS for all packets from a first 1L datapath to a second 1L datapath, or from a particular source machine (irrespective of destination). One of ordinary skill in the art will recognize that many different combinations are possible for determining policy.

The 2L controller (or associated processing) performs an optimization routine (e.g., a constrained optimization algorithm) to generate the paths through the 1L datapaths. The optimization routine attempts to identify an optimal set of paths for all different possible packets that best carries out the user-set policies based on the most recent network statistics. For instance, if a particular connection to a particular 1L datapath does not appear reliable, then the optimization routine will require the higher-priority traffic to follow a different path that does not travel over the unreliable connection, so long as a better option is available. For low priority packets, the optimization routine will generally choose the best option that will not interfere with the higher priority packets.

In the case illustrated in FIG. 53, the optimization performed by the 2L controller has specified that the particular packet should be sent via the South 1L domain 5225, rather than the North 1L domain 5220. Accordingly, the extender 5216 adds the West 1L egress information 5320, which specifies the logical egress port connecting to the South 1L domain 5225. The extender 5216 maps this logical egress port to a port of the extender 5218 and transmits the packet out of its port through a tunnel to the extender 5218.

The packet travels through the West 1L network and arrives at the extender 5218, the location of the West 1L egress port towards the South 1L domain. This extender 5218 removes the West 1L egress encapsulation 5320, and executes interconnection instructions contained within its forwarding tables. The interconnection instructions specify the South 1L ingress port (corresponding to a port on extender 5226), and the switching element 5218 encapsulates the packet with this ingress information 5325 and sends the packet through the interconnecting network (e.g., through several non-managed switching elements) to the extender 5226.

The receiving interconnection switching element 5226 in the South 1L domain (and, in a more complex example, any additional intervening 1L domains between the source and destination 1L domains) does not modify the 2L encapsulation. Instead, the extender 5226 receives the packet, removes the South 1L ingress information, and maps the 2L egress port to its own 1L egress port that corresponds to a next 1L datapath. As in the extender 5216, this 1L mapping decision is governed by the lookup entries provided by the 2L controller. The extender 5226 encapsulates the packet with its South 1L egress information 5330 for transmission through the South 1L domain to the extender 5227.

The operations performed by the extender 5227 are parallel to those performed by the extender 5218 at the edge of the West 1L datapath. This interconnection switching element removes the South 1L egress information (as the packet 5300 will be exiting the South 1L domain) and adds East 1L ingress information 5335. The extender 5227 then sends the packet through the interconnecting network to the ingress port of the East 1L domain at extender 5231.

At the East 1L domain, the extender 5231 first removes the 1L ingress information. Next, the extender runs the 2L pipeline, which maps the 2L egress port to the East 1L port that corresponds to the extender 5232. As the 2L egress port now maps to a port facing a segmented network, rather than a different 1L domain, the extender 5231 removes the 2L encapsulation as well. The extender adds the 1L egress information 5340, and transmits the packet through the East 1L network to the final extender 5232.

This extender 5232 includes a port to which a segmented network, including the segment VLAN 2, connects. The destination machine VM 2 5210 belongs to this VLAN 2. Upon receiving the packet 5300, the extender 5232 removes the 1L encapsulation, and uses the information it stores for its network segments (including VLAN 2) to add a context tag 5345 for VLAN 2 to the packet. The extender then forward the packet onto the segmented network for its eventual arrival at the destination VM 2 5210.

As mentioned, the above example of a two level interconnecting network is a somewhat simplistic example, with only two possible paths between the East and West 1L domains. As with the hierarchical networks described in Section II, in some embodiments more than two levels may be used to divide a network into separate datapaths. For instance, some embodiments might use 1L datapaths to connect networks within a building or a city block, 2L datapaths to connect 1L datapaths within a city, 3L datapaths to connect 2L datapaths within a region (e.g., a state), 4L datapaths to connect 3L datapaths within a country, etc. One of ordinary skill in the art will understand that different geographic regions, or other mechanisms for grouping networks, may be used.

Within such a hierarchical network, the first hop processing at each logical datapath set of a given level will use a set of packet forwarding instructions from the higher level controller to identify the next logical datapath set at the given level. That is, just as the set of forwarding instructions from the 2L controller in the example governed the choice of a next 1L datapath each time a packet entered an 1L datapath, an 3L controller would generate a set of packet forwarding instructions to govern the choice of a next 2L datapath for packets traveling across 2L datapaths. Thus, at the first hop in a three-level interconnection network, the 3L processing would identify an 3L egress port (for this description, assumed to be located in a different 2L datapath). Based on a set of forwarding instructions from the 3L controller, this 3L egress port maps to an 2L egress port connecting to a particular next 2L datapath. The 2L network controller would also have a generated set of forwarding instructions that describes how to forward the packet internal to its 2L domain in order to get the packet from the current 1L domain to the 1L domain through which the packet exits the datapath.

D. Learning in Interconnected Network

The above examples describe situations in which the various interconnection switching elements already knew the locations of the destination machines for the packets. However, as machines are added to a network or moved from one network segment to another, in some cases the interconnection switching elements may not have the required information to make the forwarding decision to a particular logical egress port. In some embodiments, the interconnection switching elements use standard learning mechanisms, and flood the network of interconnection switching elements in order to identify behind which of the other switching elements a particular destination MAC address is located.

In some embodiments, however, alternatives to the standard learning-by-flooding may be used. A centralized solution of some embodiments uses the network controller clusters to accumulate and distribute data. In such an approach, the interconnection switching elements (e.g., extenders) at each segmented network report the addresses (e.g., MAC addresses) of the machines seen at their site networks to the virtualization application of the network controller. The virtualization application reports these addresses (via its logical datapath set abstraction) to the centralized control plane of the network controller. The network controller can then compute the necessary updates to the forwarding table (i.e., populating the lists of MAC addresses to associate with different logical ports shown in FIG. 41). In effect, in the centralized approach, the interconnection switching elements all report the MAC addresses on their different network segments to the network controller, and the network controller then distributes this information to the other extenders.

Other embodiments use a decentralized approach to learning that does not require flooding. In this approach, the interconnection switching elements communicate directly, rather than through the central network controller. The interconnection switching elements distribute, to the other interconnection switching elements, lists of the addresses they have seen at their respective network segments. The addresses may be disseminated whenever there is a change, in some embodiments (e.g., a new machine with a new address appears in a segmented network).

An additional decentralized approach of some embodiments builds on a distributed lookup service that provides an ability to execute a lookup for an address to site location binding. That is, a lookup service exists (in a distributed fashion) that stores the lists of addresses for different network segments. The interconnection switching elements can send an unresolved address to the lookup service and receive an identification of the network segment at which that address is located.

In some embodiments, the same considerations apply to replication of an address resolution protocol (ARP) database across the sites. Scaling this replication, in some embodiments, requires replacing the standard flooding-based mechanism with one of the centralized or decentralized approaches described above.

IV. Computer System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 54:
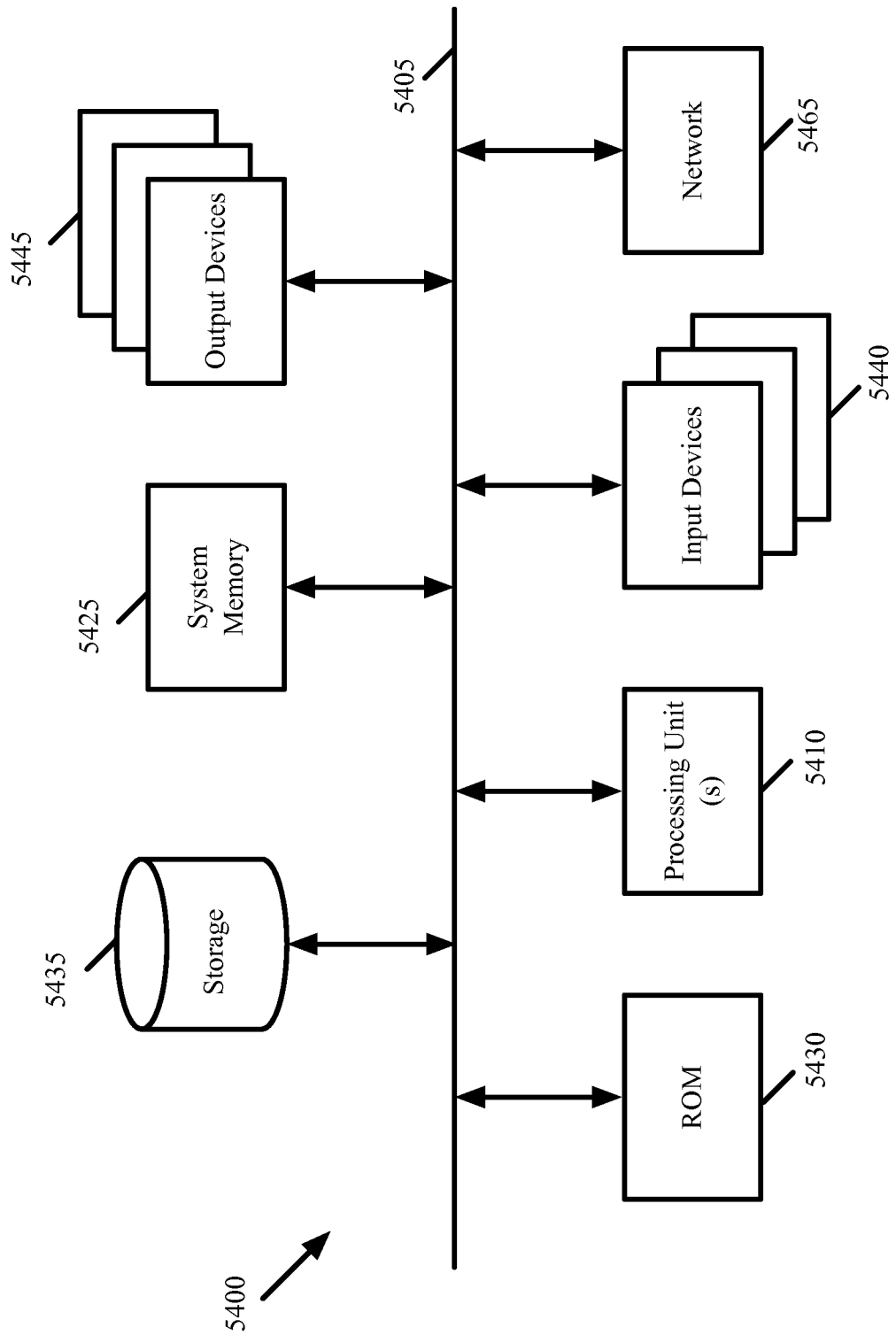
FIG. 54 conceptually illustrates a computer system with which some embodiments of the invention are implemented.

FIG. 54 conceptually illustrates a computer system 5400 with which some embodiments of the invention are implemented. The electronic system 5400 may be a computer, server, dedicated switch, phone, or any other sort of electronic device. Such an electronic system includes various types of computer readable media and interfaces for various other types of computer readable media. Electronic system 5400 includes a bus 5405, processing unit(s) 5410, a system memory 5425, a read-only memory 5430, a permanent storage device 5435, input devices 5440, and output devices 5445.

The bus 5405 collectively represents all system, peripheral, and chipset buses that communicatively connect the numerous internal devices of the electronic system 5400. For instance, the bus 5405 communicatively connects the processing unit(s) 5410 with the read-only memory 5430, the system memory 5425, and the permanent storage device 5435.

From these various memory units, the processing unit(s) 5410 retrieve instructions to execute and data to process in order to execute the processes of the invention. The processing unit(s) may be a single processor or a multi-core processor in different embodiments.

The read-only-memory (ROM) 5430 stores static data and instructions that are needed by the processing unit(s) 5410 and other modules of the electronic system. The permanent storage device 5435, on the other hand, is a read-and-write memory device. This device is a non-volatile memory unit that stores instructions and data even when the electronic system 5400 is off. Some embodiments of the invention use a mass-storage device (such as a magnetic or optical disk and its corresponding disk drive) as the permanent storage device 5435.

Other embodiments use a removable storage device (such as a floppy disk, flash drive, or ZIP® disk, and its corresponding disk drive) as the permanent storage device. Like the permanent storage device 5435, the system memory 5425 is a read-and-write memory device. However, unlike storage device 5435, the system memory is a volatile read-and-write memory, such a random access memory. The system memory stores some of the instructions and data that the processor needs at runtime. In some embodiments, the invention's processes are stored in the system memory 5425, the permanent storage device 5435, and/or the read-only memory 5430. From these various memory units, the processing unit(s) 5410 retrieve instructions to execute and data to process in order to execute the processes of some embodiments.

The bus 5405 also connects to the input and output devices 5440 and 5445. The input devices enable the user to communicate information and select commands to the electronic system. The input devices 5440 include alphanumeric keyboards and pointing devices (also called "cursor control devices"). The output devices 5445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 54, bus 5405 also couples electronic system 5400 to a network 5465 through a network adapter (not shown). In this manner, the computer can be a part of a network of computers (such as a local area network ("LAN"), a wide area network ("WAN"), or an Intranet, or a network of networks, such as the Internet. Any or all components of electronic system 5400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 16, 17, 21, 22, 23, 28, 29, 44, 48, and 50) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. A network control system for interconnecting a plurality of separate networks arranged in a plurality of domains at at least two different levels, wherein a first domain at a first level contains at least two domains at a second level, the system comprising:

a plurality of interconnection switching elements, each interconnection switching element in the plurality for connecting one of the separate networks to a common interconnecting network; and a first set of network controllers for managing a first set of the interconnection switching elements at a first set of the separate networks that form a first domain at the second level by defining a first logical datapath set, the first logical datapath set having logical ports to which networks within the first set of separate networks couple and to which at least a second logical datapath set couples, the first logical datapath set for implementation by the first set of interconnection switching elements in order for machines at the first set of separate networks to communicate with each other, wherein at least one of the network controllers in the first set of network controllers is for managing a plurality of the interconnection switching elements of the first set of interconnection switching elements;

a second set of network controllers for managing a second set of the interconnection switching elements at a second set of the separate networks that form a second domain at the second level by defining the second logical datapath set, the second logical datapath set having logical ports to which networks within the second set of separate networks couple and to which at least the first logical datapath set couples, the second logical datapath set for implementation by the second set of interconnection switching elements in order for machines at the second set of separate networks to communicate with each other, wherein at least one of the network controllers in the second set of network controllers is for managing a plurality of the interconnection switching elements of the second set of interconnection switching elements; and a third set of network controllers for managing the first and second sets of network controllers by defining a third logical datapath set having logical ports to which the networks in the first and second sets of separate networks couple, the third logical datapath set for implementation by the first and second sets of interconnection switching elements in order for machines at the first set of separate networks to communicate with machines at the second set of separate networks, wherein the first and second sets of separate networks belong to the first domain at the first level, which contains the first and second domains at the second level, wherein each network controller in the first, second, and third sets of network controllers is for execution by at least one processing unit of a server.

2. The network control system of claim 1, wherein each of the separate networks is a segmented network.

3. The network control system of claim 2, wherein each of the segmented networks is a segmented layer 2 ("L2") network and the common interconnecting network is a layer 3 ("L3") network.

4. The network control system of claim 1, wherein the plurality of interconnection switching elements are extenders.

5. The network control system of claim 1 further comprising a fourth set of network controllers for managing a third set of the interconnection switching elements at a third set of the separate networks that form a third domain at the second level by defining a fourth logical datapath set, the fourth logical datapath set having logical ports to which networks within the third set of separate networks couple and to which at least the first and second logical datapath sets couple, the fourth logical datapath set for implementation by the third set of interconnection switching elements in order for machines at the third set of separate networks to communicate with each other, wherein at least one of the network controllers in the fourth set of network controllers is for managing a plurality of the interconnection switching elements of the third set of interconnection switching elements.

6. The network control system of claim 5, wherein the third set of network controllers is further for managing the fourth set of network controllers in order for machines at networks in the third set of separate networks to communicate with machines at networks in the first and second sets of separate networks, wherein the third logical datapath set has logical ports to which the networks in the third set of separate networks couple, the third logical datapath set further for implementation by the interconnection switching elements of the third set of interconnection switching elements, wherein the third set of separate networks belongs to the first domain at the first level.

7. The network control system of claim 6 further comprising a fifth set of network controllers for managing a fourth set of interconnection switching elements at a fourth set of the separate networks that form a fourth domain at the second level by defining a fifth logical datapath set, the fifth logical datapath set having logical ports to which networks within the fourth set of separate networks couple and to which at least the first, second, and fourth logical datapath sets couple, the fifth logical datapath set for implementation by the fourth set of interconnection switching elements in order for machines at the fourth set of separate networks to communicate with each other, wherein at least one of the network controllers in the fifth set of network controllers is for managing a plurality of the interconnection switching elements of the fourth set of interconnection switching elements, wherein the third set of network controllers is further for managing the fifth set of network controllers in order for machines at the fourth set of separate networks to communicate with machines at networks in the first, second, and third sets of separate networks, wherein the third logical datapath set has logical ports to which the networks in the fourth set of separate networks couple, the third logical datapath set further for implementation by the interconnection switching elements of the fourth set of interconnection switching elements, wherein the fourth set of separate networks belongs to the first domain at the first level.

8. The network control system of claim 7, wherein the third set of controllers is for determining a path for a packet to travel from the first set of interconnection switching elements to the fourth set of interconnection switching elements.

9. The network control system of claim 1 further comprising:
a fourth set of network controllers for managing a third set of the interconnection switching elements at a third set of the separate networks that form a third domain at the second level by defining a fourth logical datapath set, the fourth logical datapath set having logical ports to which networks within the third set of separate networks couple and to which at least a fifth logical datapath set couples, the fourth logical datapath set for implementation by the third set of interconnection switching elements in order for machines at the third set of separate networks to communicate with each other, wherein at least one of the network controllers in the fourth set of network controllers is for managing a plurality of the interconnection switching elements of the third set of interconnection switching elements;
a fifth set of network controllers for managing a fourth set of the interconnection switching elements at a fourth set of the separate networks that form a fourth domain at the second level by defining the fifth logical datapath set, the fifth logical datapath set having logical ports to which networks within the fourth set of separate networks couple and to which at least the fourth logical datapath set couples, the fifth logical datapath set for implementation by the fourth set of interconnection switching elements in order for machines at the fourth set of separate networks to communicate with each other, wherein at least one of the network controllers in the fifth set of network controllers is for managing a plurality of the interconnection switching elements of the fourth set of interconnection switching elements; and
a sixth set of network controllers for managing the fourth and fifth sets of network controllers by defining a sixth logical datapath set having logical ports to which the networks in the third and fourth sets of separate networks couple, the sixth logical datapath set for implementation by the third and fourth sets of interconnection switching elements in order for machines at the third set of separate networks to communicate with machines at the fourth set of separate networks, wherein the third and fourth sets of separate networks belong to a second domain at the first level that contains the third and fourth domains at the second level.

10. The network control system of claim 9 further comprising:
a seventh set of network controllers for managing the third and sixth sets of network controllers by defining a seventh logical datapath set having logical ports to which the networks in the first, second, third, and fourth sets of separate networks couple, the seventh logical datapath set for implementation by the first, second, third, and fourth sets of interconnection switching elements in order for machines at the first and second sets of separate networks to communicate with machines at the third and fourth sets of separate networks, wherein the first, second, third, and fourth sets of separate networks belong to a domain at a third level that contains the first and second domains at the first level.

11. The network control system of claim 1, wherein the first, second, and third sets of network controllers each comprise a single controller instance.

12. The network control system of claim 1, wherein the first, second, and third sets of network controllers each comprise a plurality of controller instances acting as a distributed controller cluster.

13. A method for forwarding a packet at an interconnection switching element in a managed network of interconnection switching elements, each interconnection switching element located at one of a plurality of segmented networks, the segmented networks arranged in a plurality of domains at a plurality of different levels, wherein a plurality of the domains at a first level contains more than one domain at a next lower level, wherein the interconnection switching elements located in a particular domain at a particular level implement a logical datapath set that couples to network segments located within the particular domain as well as to other domains of the particular level within the domain at a next highest level that contains the particular domain, the method comprising:

- at a first managed interconnection switching element located at a first network in a first domain of the lowest level, receiving a packet from a machine on a first network segment in the first network, the packet having an address identifying a destination machine located on a second network segment in a second, different network, the second network located in a second domain of the lowest level, the second domain different than the first domain;
- removing a context tag that identifies the network segment within the first network;
- based on a mapping of the destination address of the packet to a particular destination network, encapsulating the packet with a first context identifier that identifies a first logical egress port of a first logical datapath set at a highest level that couples to all of the networks in all of the lowest-level domains, the first logical datapath set implemented by the interconnection switching elements at all of the lowest-level domains;
- based on a mapping of the first logical port to subsequent logical ports of logical datapath sets at each of the next lowest levels, encapsulating the packet with an additional logical context identifier for each level, each of the additional logical context identifiers identifying a logical egress port of a logical datapath set at a lower level mapped from a port of a logical datapath set at the next higher level, wherein each of the logical datapath sets has a particular level and defines mappings between (i) logical ports of a logical datapath set at the next level higher and its logical ports and (ii) logical ports of one or more logical datapath sets at the next level lower and its logical ports; and
- transmitting the packet with a plurality of encapsulations out of a port of the interconnection switching element based on a lowest-level context identifier.

14. The method of claim 13, wherein the first network segment is segmented using virtual local area network (VLAN) tagging and the second network segment is segmented using multi-protocol labeling system (MPLS) labeling.

15. The method of claim 13, wherein the first network segment is segmented using a first VLAN technique and the second network segment is segmented using a second VLAN technique.

16. The method of claim 13, wherein removing a context tag that identifies the network segment comprises using stored instructions that indicate particular bits of the packet that contain the context tag.

17. The method of claim 13 further comprising, after removing the context tag and before encapsulating the packet:
- mapping the identified network segment to a particular logical ingress port of a lowest-level logical datapath set; and
- for each particular level of logical datapath set above the lowest level, mapping an identified logical ingress port of the next lowest-level logical datapath set to a logical ingress port of the particular level logical datapath set.

18. The method of claim 17 further comprising storing each of the logical ingress ports in registers of the interconnection switching element until the packet is transmitted out of the port of the interconnection switching element.

19. The method of claim 13, wherein the destination address is one of a plurality of destination addresses that map to the particular destination network, wherein the particular destination network couples to the first logical egress port.

20. The method of claim 13, wherein each of the segmented networks has at least one of the interconnection switching elements located at the segmented network.

* * * * *